(12) United States Patent
Arai et al.

(10) Patent No.: US 12,379,497 B2
(45) Date of Patent: Aug. 5, 2025

(54) OBJECT IDENTIFICATION SYSTEM

(71) Applicants: BRIGHTWAY VISION LTD., Tirat Carmel (IL); KOITO MANUFACTURING CO., LTD., Tokyo (JP)

(72) Inventors: Kensuke Arai, Shizuoka (JP); Toru Nagashima, Shizuoka (JP); Koji Itaba, Shizuoka (JP); Jun Kano, Shizuoka (JP)

(73) Assignees: BRIGHTWAY VISION LTD., Tirat Carmel (IL); KOITO MANUFACTURING CO., LTD., Tokyo (JP)

(*) Notice: Subject to any disclaimer, the term of this patent is extended or adjusted under 35 U.S.C. 154(b) by 678 days.

(21) Appl. No.: 17/343,152

(22) Filed: Jun. 9, 2021

(65) Prior Publication Data
US 2021/0295065 A1    Sep. 23, 2021

Related U.S. Application Data

(63) Continuation of application No. PCT/JP2019/047876, filed on Dec. 6, 2019.

(30) Foreign Application Priority Data

Dec. 10, 2018  (JP) .................. 2018-231048
Dec. 20, 2018  (JP) .................. 2018-238313
(Continued)

(51) Int. Cl.
*G01S 17/18* (2020.01)
*G06N 20/00* (2019.01)
(Continued)

(52) U.S. Cl.
CPC .............. *G01S 17/18* (2020.01); *G06N 20/00* (2019.01); *G06V 10/141* (2022.01); *G06V 10/60* (2022.01);
(Continued)

(58) Field of Classification Search
CPC ......... G01S 17/18; G01S 17/89; G06N 20/00; G06N 3/045; G06N 3/08; G06V 10/141;
(Continued)

(56) References Cited

U.S. PATENT DOCUMENTS 10,390,004 B2 *  8/2019  Grauer ................. H04N 13/296
10,873,738 B2 * 12/2020  Retterath ................ G01S 17/18
(Continued)

FOREIGN PATENT DOCUMENTS

CN       101996389 A      3/2011
CN       103218621 A      7/2013
(Continued)

OTHER PUBLICATIONS

Gruber et al, Learning Super-resolved Depth from Active Gated Imaging, 2018 21st International Conference on Intelligent Transportation Systems (ITSC), Maui, Hawaii, USA, Nov. 4-7, 2018 (Year: 2018).*
(Continued)

*Primary Examiner* — Andrae S Allison
(74) *Attorney, Agent, or Firm* — Sughrue Mion, PLLC

(57) ABSTRACT

An object identification system includes a camera and a processing device. The processing device includes a classifier subjected to machine learning based on the output image of the camera so as to allow it to identify an object. A gating camera divides a field of view in the depth direction into multiple ranges, and captures an image while changing the time difference between light projection and exposure for each range. The classifier is subjected to machine learning
(Continued)

using multiple images IMG$_1$ through IMG$_N$ generated by the gating camera as the learning data.

11 Claims, 37 Drawing Sheets

(30) Foreign Application Priority Data

| Dec. 20, 2018 | (JP) | 2018-238314 |
|---|---|---|
| Feb. 28, 2019 | (JP) | 2019-036462 |
| Feb. 28, 2019 | (JP) | 2019-036463 |

(51) Int. Cl.

| G06V 10/141 | (2022.01) |
|---|---|
| G06V 10/60 | (2022.01) |
| G06V 10/764 | (2022.01) |
| G06V 10/772 | (2022.01) |
| G06V 20/40 | (2022.01) |
| G06V 20/58 | (2022.01) |
| H04N 23/73 | (2023.01) |
| H04N 23/74 | (2023.01) |
| H04N 23/80 | (2023.01) |

(52) U.S. Cl.
CPC .......... *G06V 10/764* (2022.01); *G06V 10/772* (2022.01); *G06V 20/40* (2022.01); *G06V 20/58* (2022.01); *H04N 23/73* (2023.01); *H04N 23/74* (2023.01); *H04N 23/80* (2023.01)

(58) Field of Classification Search
CPC .... G06V 10/60; G06V 10/764; G06V 10/772; G06V 20/40; G06V 20/58; H04N 23/73; H04N 23/74; H04N 23/61; H04N 23/56; H04N 23/80; G06F 18/2413; B60Q 1/085; B60Q 2300/45; B60Q 1/0023
See application file for complete search history.

(56) References Cited

U.S. PATENT DOCUMENTS

| 12,135,394 | B2* | 11/2024 | Kato | H04N 23/74 |
|---|---|---|---|---|
| 2008/0046150 | A1 | 2/2008 | Breed | |
| 2011/0043656 | A1 | 2/2011 | Tanaka | |
| 2017/0257617 | A1 | 9/2017 | Retterath | |
| 2018/0063442 | A1 | 3/2018 | Makela et al. | |
| 2018/0144202 | A1* | 5/2018 | Moosaei | G06T 7/90 |
| 2019/0004149 | A1 | 1/2019 | Mano et al. | |
| 2019/0012551 | A1* | 1/2019 | Fung | G06F 18/24 |
| 2019/0056498 | A1* | 2/2019 | Sonn | G01S 7/4865 |

FOREIGN PATENT DOCUMENTS

| CN | 104103062 | A | 10/2014 |
|---|---|---|---|
| EP | 3396410 | A1 | 10/2018 |
| JP | 2009-257983 | A | 11/2009 |
| WO | 2017/110413 | A1 | 6/2017 |
| WO | 2017/149370 | A1 | 9/2017 |

OTHER PUBLICATIONS

Bovenkamp, Ernst, and Klamer Schutte. "Laser gated viewing: An enabler for automatic target recognition?." Laser Radar Technology and Applications XV. vol. 7684. SPIE, 2010. (Year: 2010).*
International Preliminary Report on Patentability (Form PCT/IB/373) and the Written Opinion of the International Searching Authority (Form PCT/ISA/237) issued on Jun. 8, 2021, in corresponding International Application No. PCT/JP2019/047876. (14 pages).
International Search Report (Form PCT/ISA/210) issued on Feb. 25, 2020, in corresponding International Application No. PCT/JP2019/047876. (4 pages).
Extended European Search Report dated Dec. 15, 2021, issued in corresponding European Application No. 19895263.2. (10 pages).
Grauer, "Active Gated Imaging in Driver Assistance System", Advanced Optical Technologies, vol. 3, No. 2, Mar. 29, 2014, pp. 151-160, XP055434969.
Grauer et al., "Active Gated Imaging for Automotive Safety Applications", Proceedings of SPIE, IEEE, US, vol. 9407, Mar. 4, 2015, pp. 94070F-1 94070F-18, XP060046467.
Giesemann et al., "Chapter 6: 'Deep Learning for Advances Driver Assistance Systems", Towards a Common Software/Hardware Methodology for Future Advanced Driver Assistance Systems: The DESERVE Approach, 2017, River Publishers, Aalborg, pp. 105-132, XP055869503.
Communication dated Mar. 26, 2024, issued by the State Intellectual Property Office of People's Republic of China in Chinese Application No. 201980081906.1.
Nguyen et al., "Real-Time Face Detection and Lip Feature Extraction Using Field-Programmable Gate Arrays", IEEE Transactions on Systems, Man, and Cybernetics—Part B: Cybernetics, 2006, vol. 36, No. 4, pp. 902-912 (11 pages total).
Zhang, "Research on Vehicle Recognition System under Foggy Weather", Graduate School of Tianjin University, 2014, pp. 1-74 (84 pages total).

* cited by examiner

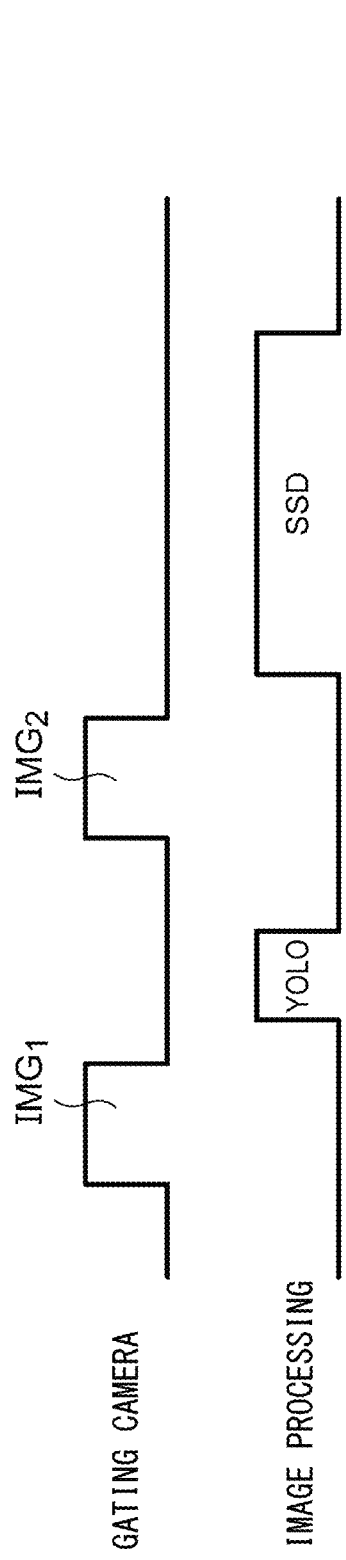
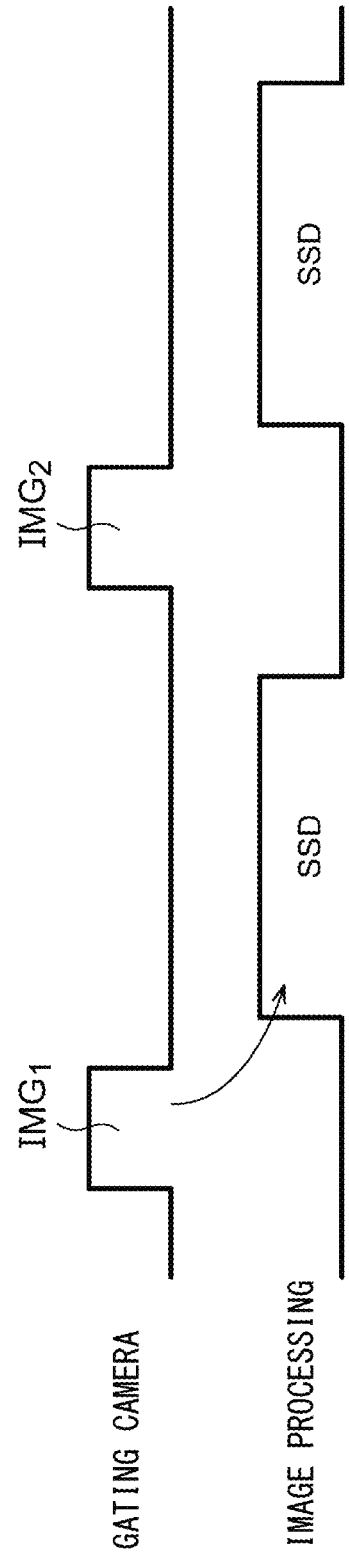

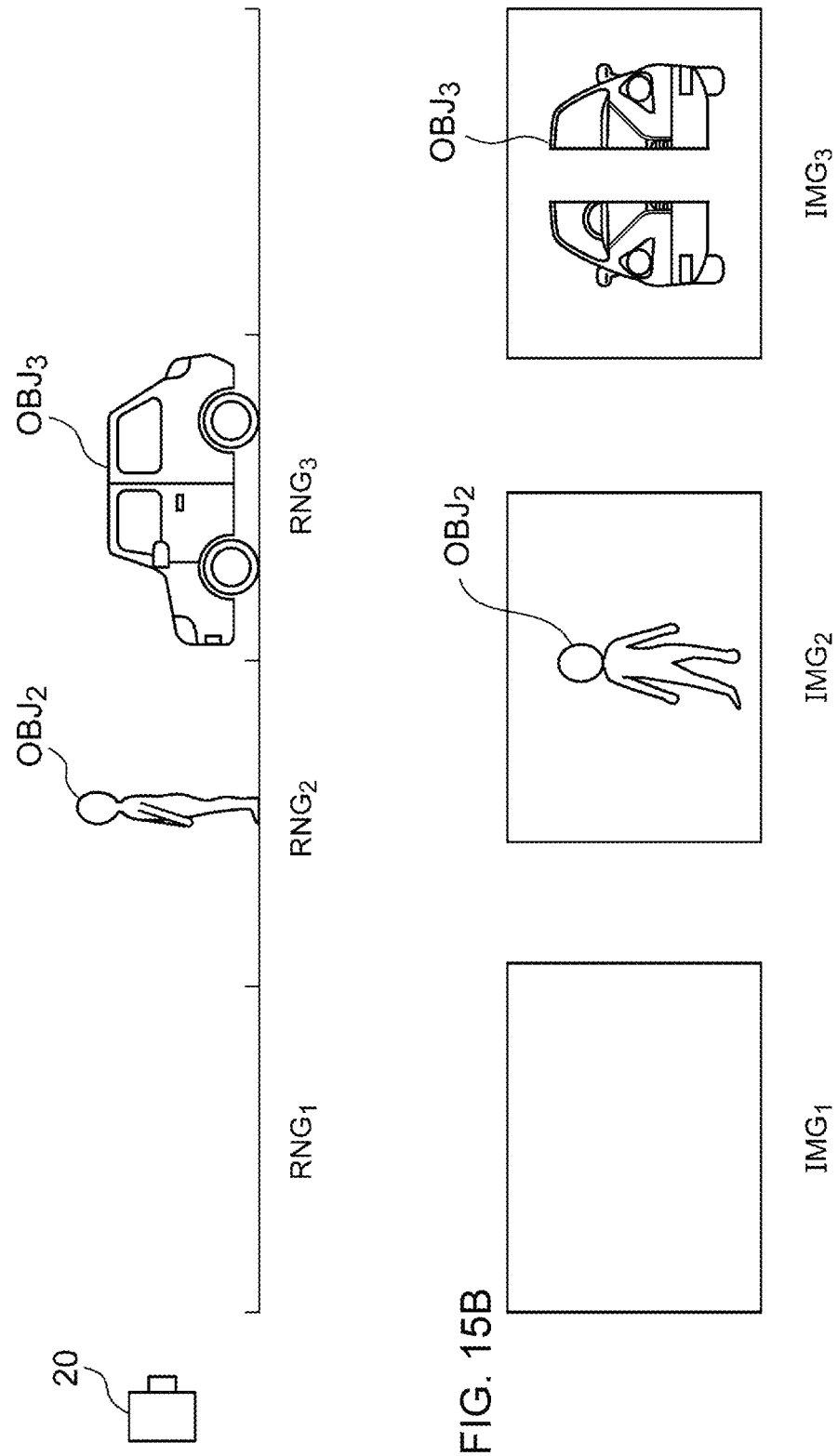

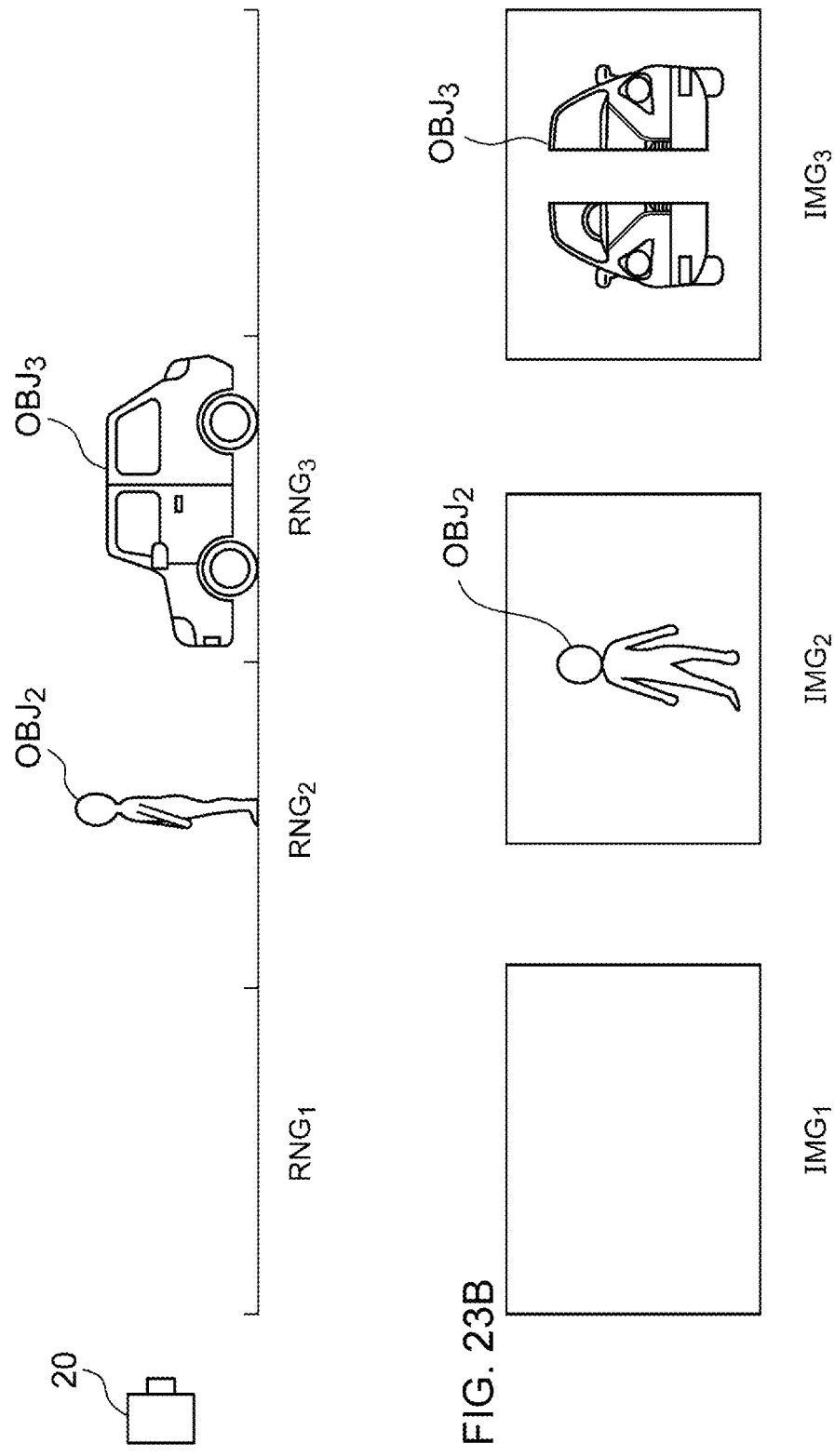

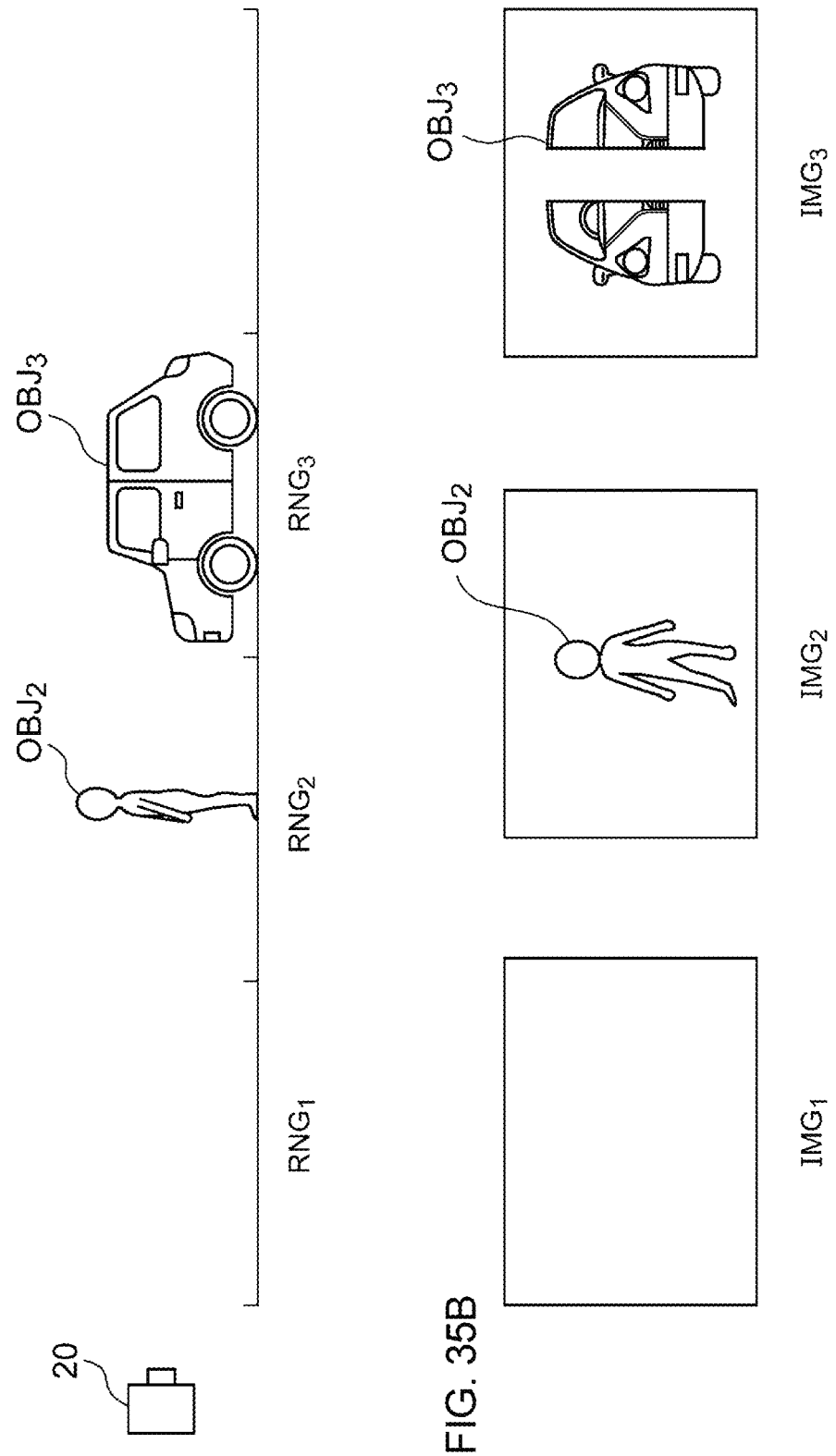

OBJECT IDENTIFICATION SYSTEM

BACKGROUND

1. Technical Field

The present disclosure relates to an object identification system.

2. Description of the Related Art

In order to support autonomous driving or autonomous control of the light distribution of a headlamp, an object identification system is employed for sensing the position and the kind of an object that exists in the vicinity of a vehicle. The object identification system includes a sensor and a processing device configured to analyze the output of the sensor. As such a sensor, a desired one is selected from among a camera, LiDAR (Light Detection and Ranging, Laser Imaging Detection and Ranging), millimeter-wave radar, ultrasonic sonar, etc., giving consideration to the usage, required precision, and cost.

Typical monocular cameras are not capable of acquiring depth information. Accordingly, in a case in which there is overlap between multiple objects positioned at different distances, it is difficult to separate individual objects.

As a camera that is capable of acquiring the depth information, TOF cameras are known. A TOF (Time Of Flight) camera is configured to emit infrared light by means of a light-emitting device, to measure the time of flight up to the time point at which the reflected light returns to the image sensor, and to convert the time of flight into distance information in the form of an image.

Item 1

The processing device includes a classifier. The classifier is optimized by machine learning using learning data (which is also referred to as "training data"). The identification rate of the classifier is greatly affected by the learning data thus selected.

Items 2, 3

The present applicant has proposed a sensor (which will be referred to as a "gating camera" or "gated camera" in the present specification) employed as an alternative to a TOF camera (see Japanese Patent Application Laid Open No. 2009-257983, International Publication WO 2017/110413A1). The gaging camera is configured to divide its image capture range into multiple ranges, and to capture multiple images for respective ranges at different exposure timings and different exposure periods. With this, an image is acquired for each target range. Each image includes only an object in the corresponding range.

SUMMARY

1. An embodiment of the first aspect of the present disclosure relates to an object identification system. The object identification system includes: a camera; and a processing device including a classifier subjected to machine learning so as to be capable of identifying an object based on an output image of the camera. The classifier is subjected to machine learning based on learning data configured as multiple images generated by a gating camera structured to divide a field of view (FOV) in the depth direction into multiple ranges, and to capture an image while changing the time difference between light projection and exposure for each range.

2. An embodiment of the second aspect of the present disclosure relates to an object identification system. The object identification system includes: a gating camera structured to divide a field of view in the depth direction into multiple ranges, and to capture an image while changing the time difference between light projection and exposure for each range; and a processing device structured to be capable of identifying the kind of an object based on multiple images that correspond to the multiple ranges generated by the gating camera. The processing device includes multiple classifiers structured to have different algorithms, and to select the classifier that corresponds to the range so as to identify an object.

3. An embodiment of the third aspect of the present disclosure relates to an object identification system. The object identification system includes: a gating camera structured to divide a field of view in the depth direction into multiple ranges, and to capture an image while changing the time difference between light projection and exposure for each range; a scaler structured to scale multiple images that correspond to multiple ranges generated by the gating camera with a coefficient defined for each range; and a classifier structured to be capable of identifying the kind of an object based on the multiple images thus scaled.

4. An embodiment of the fourth aspect of the present disclosure relates to an object identification system. The object identification system includes: a gating camera structured to divide a field of view in the depth direction into multiple ranges, and to capture an image while changing the time difference between light projection and exposure for each range, so as to generate multiple images that correspond to multiple ranges; and a processing device structured to be capable of identifying the kind of an object included in each of the multiple images under a constraint that the position at which each object can exist is limited to a unique region of interest for each of the multiple images.

Another embodiment of the fourth aspect of the present disclosure relates to a processing device. The processing device is used together with a gating camera, and forms an object identification system. The gating camera is configured to divide a field of view in the depth direction into multiple ranges, and to capture an image while changing the time difference between light projection and exposure for each range, so as to generate multiple images that correspond to the multiple ranges. The processing device is configured to be capable of identifying the kind of an object included in each of the multiple images under a constraint that the position at which each object can exist is limited to a unique region of interest determined for each of the multiple images.

5. An embodiment of the fifth aspect of the present disclosure relates to an object identification system. The object identification system includes: a gating camera structured to divide a field of view in the depth direction into multiple ranges, and to capture an image while changing the time difference between light projection and exposure for each range, so as to generate multiple images that correspond to the multiple ranges; and a processing device structured to be capable of identifying the kind of an object image included in each of the multiple images based on an allowable range determined for each range with respect to the size of the object image included in the corresponding image.

Another embodiment of the fifth aspect of the present disclosure relates to a processing device. The processing device is used together with a gating camera configured to divide a field of view in the depth direction into multiple ranges, and to capture an image while changing the time difference between light projection and exposure for each range, so as to generate multiple images that correspond to the multiple ranges. The processing device forms an object identification system. The processing device includes: a classifier structured to detect the kind and the size of an object image included in each of the multiple images, and to generate multiple items of detection data that correspond to the multiple images; and a post-processing unit configured to receive the multiple items of detection data, and to judge whether or not the size of an object image included in each item of detection data is included within an allowable range determined for each range with respect to the size of an object image included in the corresponding image.

Yet another embodiment of the fifth aspect of the present disclosure also relates to a processing device. The processing device is used together with a gating camera configured to divide a field of view in the depth direction into multiple ranges, and to capture an image while changing the time difference between light projection and exposure for each range, so as to generate multiple images that correspond to the multiple ranges. The processing device forms an object identification system. The processing device includes: a pre-processing unit configured to divide each of multiple images into sub-images defined for each included object image thereof; and a classifier configured to judge the kind of an object image included in the sub-image when the sub-image thus divided by the pre-processing unit has the size included within an allowable range determined for each range with respect to the size of an object image included in the corresponding image.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 10A is a time chart for explaining the operation of the object identification system shown in FIG. 8, and FIG. 10B is a time chart for explaining the operation of an object identification system according to a comparison technique;

FIGS. 15A and 15B are diagrams for explaining images generated by the gating camera;

FIGS. 23A and 23B are diagrams for explaining images generated by the gating camera;

FIGS. 35A and 35B are diagrams for explaining images generated by the gating camera;

DETAILED DESCRIPTION FIRST ASPECT OF THE PRESENT DISCLOSURE

I-1. Overview

Figure 1:
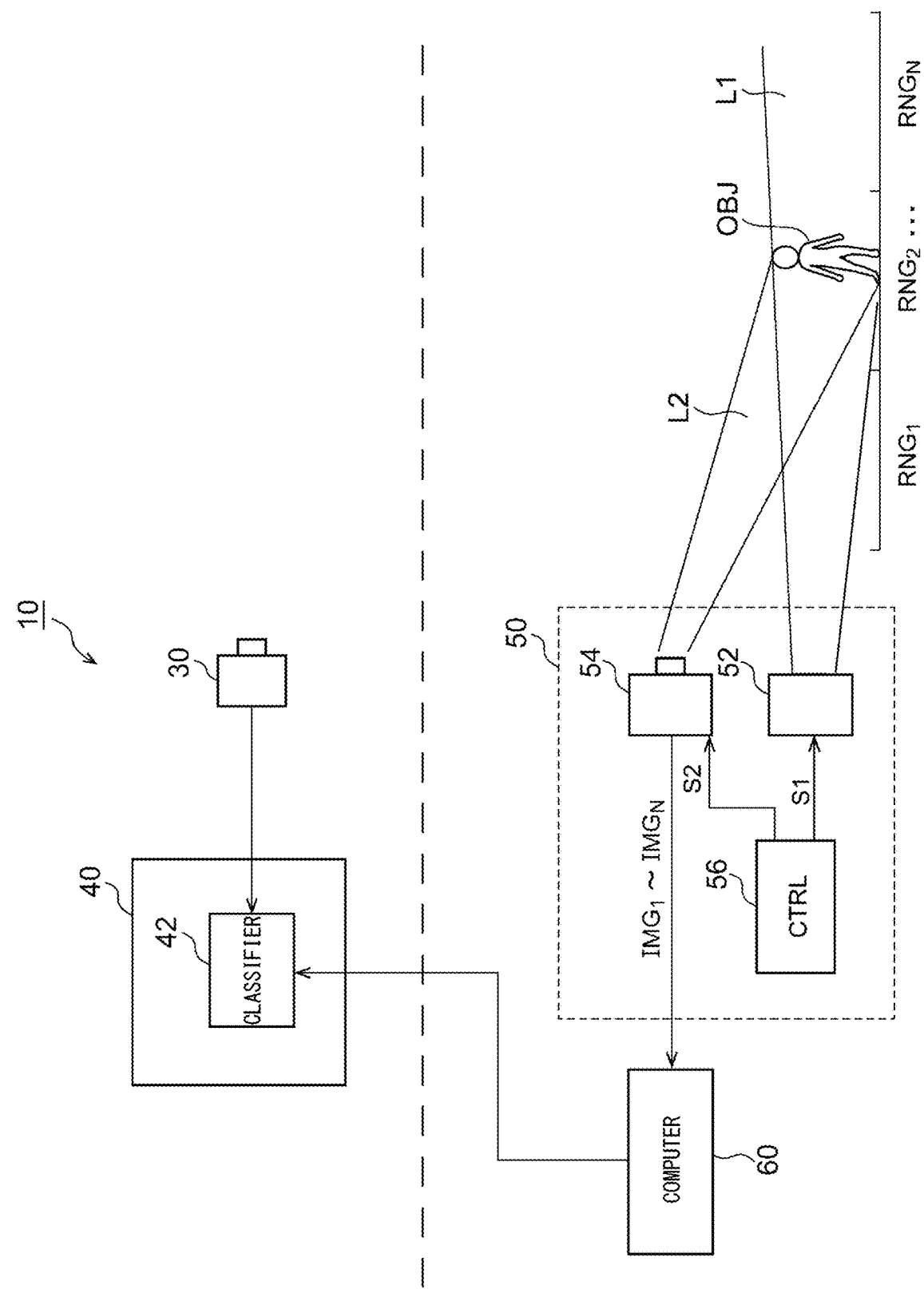
FIG. 1 is a block diagram showing an object identification system according to an embodiment 1.

An embodiment of the first aspect of the present disclosure relates to an object identification system. The object identification system includes: a camera; and a processing device including a classifier subjected to machine learning so as to be capable of identifying an object based on an output image of the camera. The classifier is subjected to machine learning based on learning data configured as multiple images generated by a gating camera structured to divide a field of view in the depth direction into multiple ranges, and to capture an image while changing the time difference between light projection and exposure for each range.

With such an arrangement employing the gating camera, this arrangement is capable of acquiring multiple images in the form of separate object images although they overlap in the depth direction. By employing the multiple images thus acquired as the learning data, this provides an improved identification rate for each object. Furthermore, such an arrangement provides a so-called "data augmentation effect", thereby allowing the learning cost to be reduced.

Also, the camera may be configured as a monocular camera. Also, the camera may be configured as a gating camera.

I-2 Detailed Description

Description will be made below regarding the first aspect of the present disclosure based on preferred embodiments with reference to the drawings. In the present specification, the same or similar components, members, and processes are denoted by the same reference numerals, and redundant description thereof will be omitted as appropriate. The embodiments have been described for exemplary purposes only, and are by no means intended to restrict the present invention. Also, it is not necessarily essential for the present invention that all the features or a combination thereof be provided as described in the embodiments.

FIG. 1 is a block diagram showing an object identification system 10 according to an embodiment 1. The object identification system 10 is mounted on a vehicle such as an automobile, motorcycle, or the like. The object identification system 10 judges the kind (category) of an object OBJ that exists in the vicinity of the vehicle.

The object identification system 10 mainly includes a camera 30 and a processing device 40. The camera 30 is configured as a monocular camera that captures an image of the surroundings of the vehicle. The processing device 40 includes a classifier 42. The classifier 42 is implemented based on a learned model generated by machine learning so as to allow the object OBJ to be identified based on an input image IMG of the camera 30. The algorithm employed by the classifier 42 is not restricted in particular. Examples of algorithms that can be employed include You Only Look Once (YOLO), Single Shot MultiBox Detector (SSD), Region-based Convolutional Neural Network (R-CNN), Spatial Pyramid Pooling (SPPnet), Faster R-CNN, Deconvolution-SSD (DSSD), Mask R-CNN, etc. Also, other algorithms that will be developed in the future may be employed.

FIG. 1 shows a setup system for supporting machine learning in addition to the object identification system 10. In the machine learning for the classifier 42, a gating camera (gated camera) 50 is used. The gating camera 50 is configured to divide a field of view in the depth-direction into a plurality of N (N≥2) ranges $RNG_1$ through $RNG_N$, and to capture an image for each range while changing the time difference between the light projection and the exposure. The gating camera 50 generates multiple images $IMG_1$ through $IMG_N$ that correspond to the multiple ranges $RNG_1$ through $RNG_N$. The gating camera 50 captures an image while changing the kind or the orientation of the object OBJ. With such an arrangement in which the images are captured by the gating camera 50, a set of multiple images $IMG_1$ through $IMG_N$ are acquired for each kind of object OBJ.

The set of the multiple images $IMG_1$ through $IMG_N$ thus acquired are associated with the kind of the object OBJ, and are input to a computer 60. The computer 60 executes machine learning for the classifier 42 with the set of multiple images $IMG_1$ through IMG as learning data (training data). As the method for machine learning employed by the computer 60, known techniques may preferably be employed. Accordingly, description thereof will be omitted. The learning results finally generated by the computer 60 are supplied to the processing device 40, thereby configuring the classifier 42.

The gating camera 50 includes a light projector 52, an image sensor 54, and a controller 56. The gating camera 50 captures images for a plurality of N (N≥2) ranges $RNG_1$ through $RNG_N$ divided in the depth direction. The ranges may be designed such that adjacent ranges overlap at their boundaries in the depth direction.

The light projector 52 irradiates probe light L1 in front of the vehicle in synchronization with a light projection timing signal S1 supplied from the controller 56. As the probe light L1, infrared light is preferably employed. However, the present invention is not restricted to such an arrangement. Also, as the probe light L1, visible light having a predetermined wavelength may be employed.

The image sensor 54 is configured to support exposure control in synchronization with an image capture timing signal S2 supplied from the controller 56, and to be capable of generating an image IMG. The image sensor 54 is sensitive to the same wavelength as that of the probe light L1. The image sensor 54 captures an image of reflected light (returned light) L2 reflected by the object OBJ.

The controller 56 changes the light projection timing signal S1 and the image capture timing signal S2 for each range RNG, so as to change the time difference between the light projection by the light projector 52 and the exposure of the image sensor 54. The camera 30 generates multiple images $IMG_1$ through $IMG_N$ that correspond to the multiple ranges $RNG_1$ through $RNG_N$. As the i-th image $IMG_i$, only an image of an object included in the corresponding range $RNG_i$ is acquired.

Figure 2:
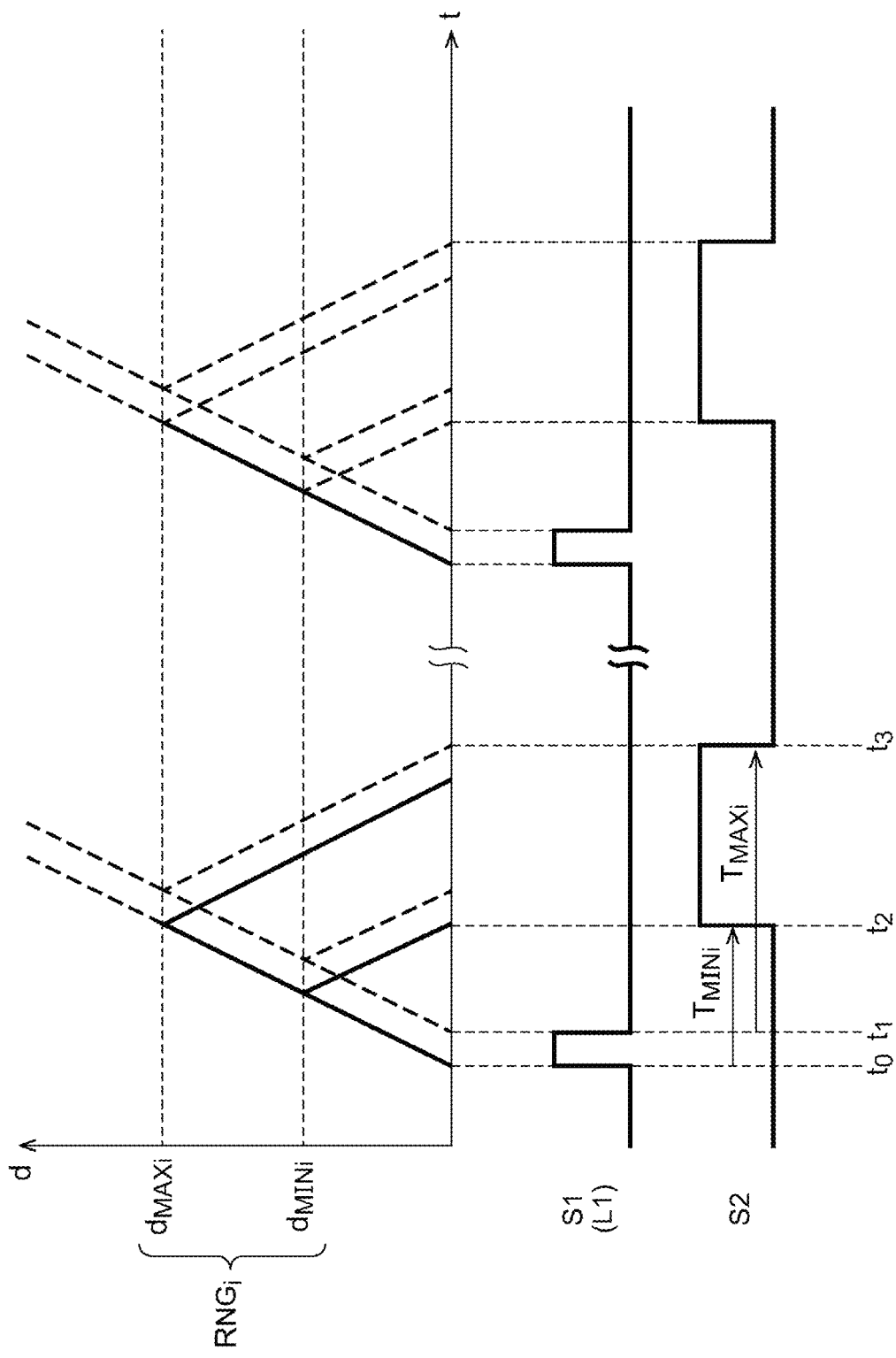
FIG. 2 is a diagram for explaining the operation of a gating camera.

FIG. 2 is a diagram for explaining the operation of the gating camera 50. FIG. 2 shows the operation when the i-th range $RNG_i$ is measured. The light projector 52 emits light during a light projection period $\tau_1$ between the time points $t_0$ and $t_1$ in synchronization with the light projection timing signal S1. In the upper diagram, a light beam diagram is shown with the horizontal axis as time and with the vertical axis as distance. The distance between the camera 30 and the near-distance boundary of the range $RNG_i$ is represented by $d_{MINi}$. The distance between the camera 30 and the far-distance boundary of the range $RNG_i$ is represented by $d_{MAXi}$.

The round-trip time $T_{MINi}$, which is a period from the departure of light from the light projector 52 at a given time point, to the arrival of the light at the distance $d_{MINi}$, up to the return of the reflected light to the image sensor 54, is represented by $T_{MINi}=2\times d_{MINi}/C$. Here, c represents the speed of light.

Similarly, the round-trip time $T_{MAXi}$, which is a period from the departure of light from the light projector 52 at a given time point, to the arrival of the light at the distance $d_{MAXi}$, up to the return of the reflected light to the image sensor 54, is represented by $T_{MAXi}=2\times d_{MAXi}/C$.

When only an image of an object OBJ included in the range $RNG_i$ is to be captured, the controller 56 generates the image capture timing signal S2 so as to start the exposure at the time point $t_2=t_0+T_{MINi}$, and so as to end the exposure at the time point $t_3=t_1+T_{MAXi}$. This is a single exposure operation.

When an image is captured for the i-th range $RNG_i$, the exposure may be executed multiple times. In this case, preferably, the controller 56 may repeatedly execute the above-described exposure operation multiple times with a predetermined period $\tau_2$.

The above is the configuration of the object identification system 10. Next, description will be made regarding the machine learning employed for the object identification system 10.

Figure 3A:
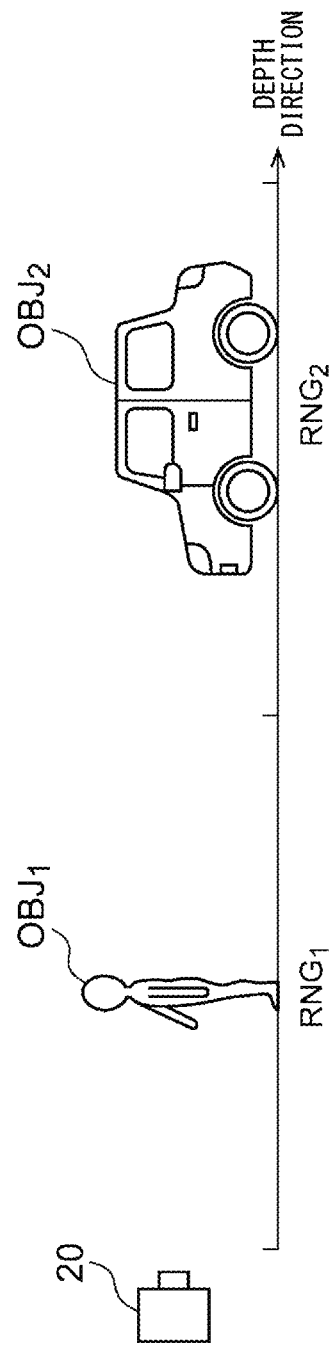
FIGS. 3A and 3B are diagrams for explaining acquisition of learning data using the gating camera.
Figure 3B:
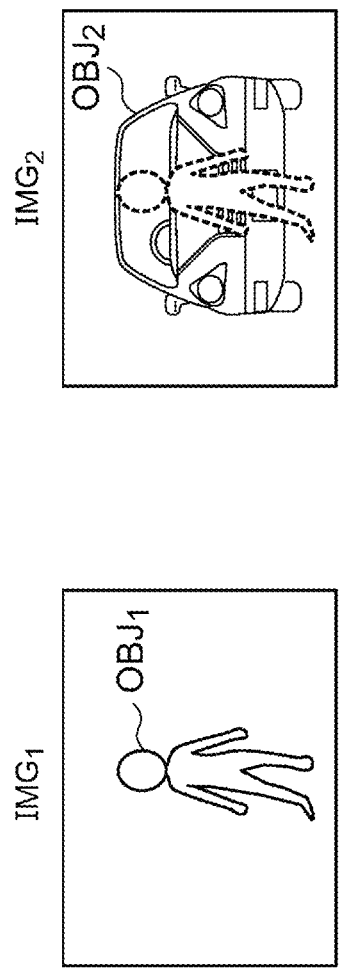

FIGS. 3A and 3B are diagrams for explaining the acquisition of the learning data using the gating camera. Description will be made regarding an example in which N=2. Let consider a situation in which, when the learning data is acquired, multiple objects $OBJ_1$ and $OBJ_2$ are positioned in different ranges $RNG_1$ and $RNG_2$ as shown in FIG. 3A. In this example, $OBJ_1$ represents a pedestrian, and $OBJ_2$ represents an automobile.

FIG. 3B shows multiple images $IMG_1$ and $IMG_2$ acquired in the situation shown in FIG. 3A. The image $IMG_1$ includes only the object $OBJ_1$ included in the near-distance range $RNG_1$. On the other hand, the image $IMG_2$ includes only the far-distance object $OBJ_2$. That is to say, the multiple objects $OBJ_1$ and $OBJ_2$ can be separated although they overlap as viewed from the camera 30 of the object identification system 10. Subsequently, the multiple images $IMG_1$ and $IMG_2$ are input to the computer 60 as separate items of learning data. This allows the classifier 42 to be configured to be capable of identifying the objects $OBJ_1$ and $OBJ_2$ as separate objects.

Figure 4A:
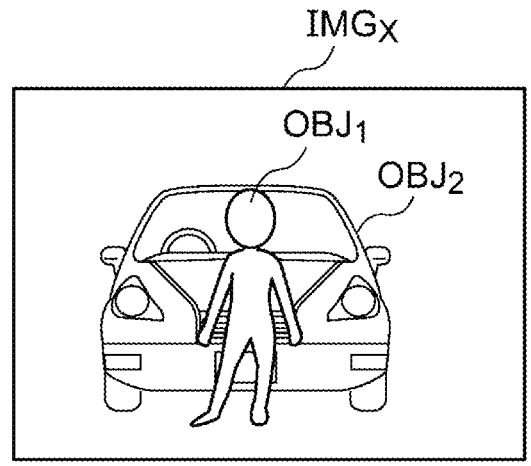
FIG. 4A is a diagram showing an image IMGx captured by a monocular camera.

The advantages of the present embodiment can be clearly understood in comparison with a comparison technique. In the comparison technique, an image IMGx to be used as the learning data is captured by a monocular camera that is the same kind as that of the camera 30 included in the object identification system 10. FIG. 4A is a diagram showing the image IMGx captured by such a monocular camera. As shown in FIG. 4A, the image IMGx includes two objects $OBJ_1$ and $OBJ_2$ in a state in which they overlap.

Figure 4B:
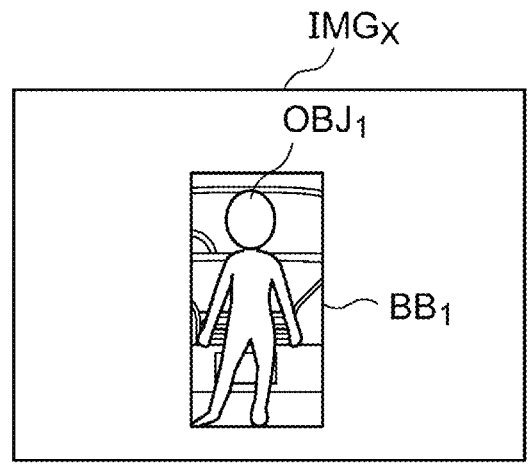
FIG. 4B is a diagram showing a bounding box including a pedestrian.

FIG. 4B shows a bounding box $BB_1$ including a pedestrian ($OBJ_1$). The image within the bounding box $BB_1$ includes information with respect to a vehicle ($OBJ_2$) as a background image in addition to the pedestrian ($OBJ_1$). Accordingly, in a case in which the image IMGx shown in FIG. 4A is used as the learning data, the learning is conducted so as to allow the pedestrian $OBJ_1$ to be identified in a state in which a given image includes vehicle information. In other words, such an arrangement has the potential to involve a problem in that it is difficult to identify a pedestrian alone in a state in which a given image includes only the pedestrian and includes no vehicle as a background image.

Figure 4C:
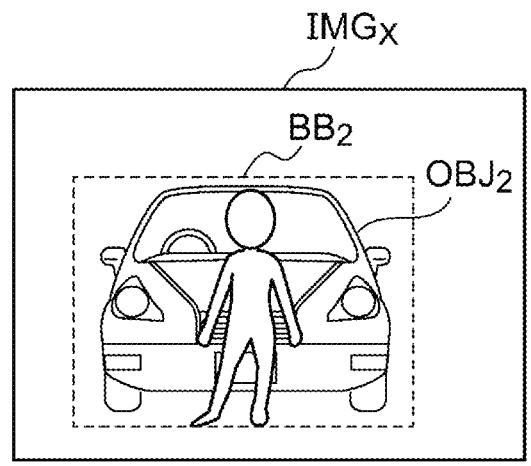
FIG. 4C is a diagram showing a bounding box including a vehicle.

FIG. 4C shows a bounding box $BB_2$ including a vehicle ($OBJ_2$). The image within the bounding box $BB_2$ includes information with respect to the pedestrian ($OBJ_1$) in the foreground in addition to the vehicle ($OBJ_2$). Accordingly, in a case in which the image IMGx shown in FIG. 4A is used as the learning data, the learning is conducted so as to allow the vehicle $OBJ_2$ to be identified in a state in which a given image includes pedestrian information. In other words, such an arrangement has the potential to involve a problem in that it is difficult to identify a vehicle alone in a state in which a given image includes only the vehicle and includes no pedestrian in the foreground.

In contrast, with the learning method according to the present embodiment, the foreground object $OBJ_1$ and the background object $OBJ_2$ are separated using the gating camera. Furthermore, the learning is conducted using the separated images. Accordingly, the learning is conducted so as to allow each object OBJ #(#=1, 2) to be identified based on the information with respect to only the corresponding object $OBJ_1$. With this, such an arrangement allows each object $OBJ_i$ to be correctly identified in various kinds of situations including a situation in which a given object $OBJ_i$ exists alone, and a situation in which a given object $OBJ_i$ overlaps another object $OBJ_j$ (i≠j).

Such machine learning requires an enormous amount of learning data. Accordingly, in a case in which images are captured for each object in different situations and different conditions, this leads to an increase in the learning cost. In order to solve such a problem, as a typical technique, "data augmentation" is executed so as to increase a single basic image into multiple images. Examples of typical "data augmentation" include: horizontal inversion of a basic image, rotation thereof, image enlargement/reduction thereof, change of brightness thereof, change of contrast thereof, etc. Assuming that the image shown in FIG. 4A is used as the basic image, image capture using a gating camera can be regarded as an increase of the image data based on the basic image into two images. That is to say, such an arrangement employing a gating camera also provides an effect of "data augmentation".

Figure 5:
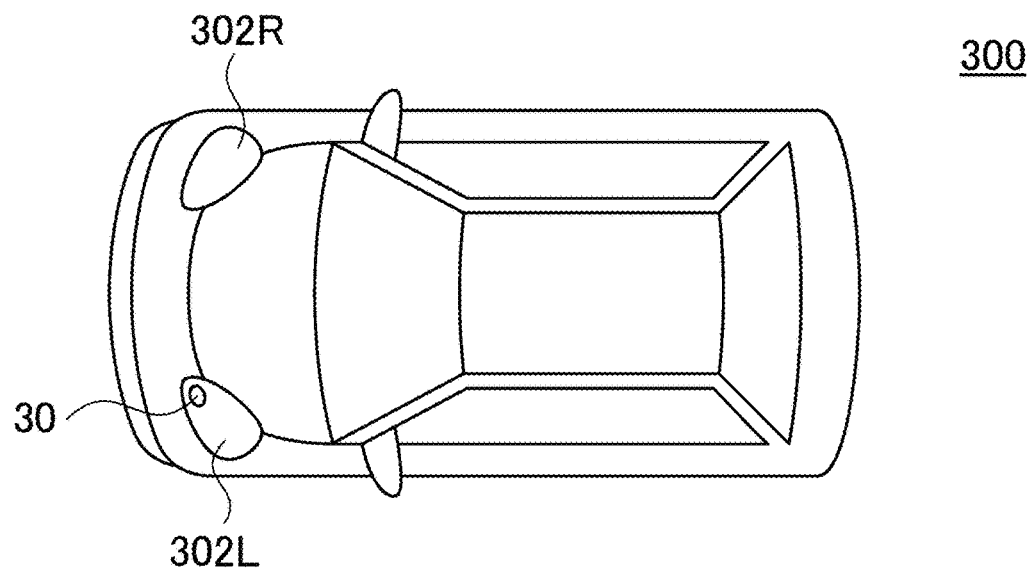
FIG. 5 is a block diagram showing an automobile including the object identification system.

FIG. 5 is a block diagram showing an automobile provided with the object identification system 10. An automobile 300 is provided with headlamps 302L and 302R. The object identification system 10 is built into at least one from among the headlamps 302L and 302R. Each headlamp 302 is positioned at a frontmost end of the vehicle body, which is most advantageous as a position where the camera 30 is to be installed for detecting an object in the vicinity.

Figure 6:
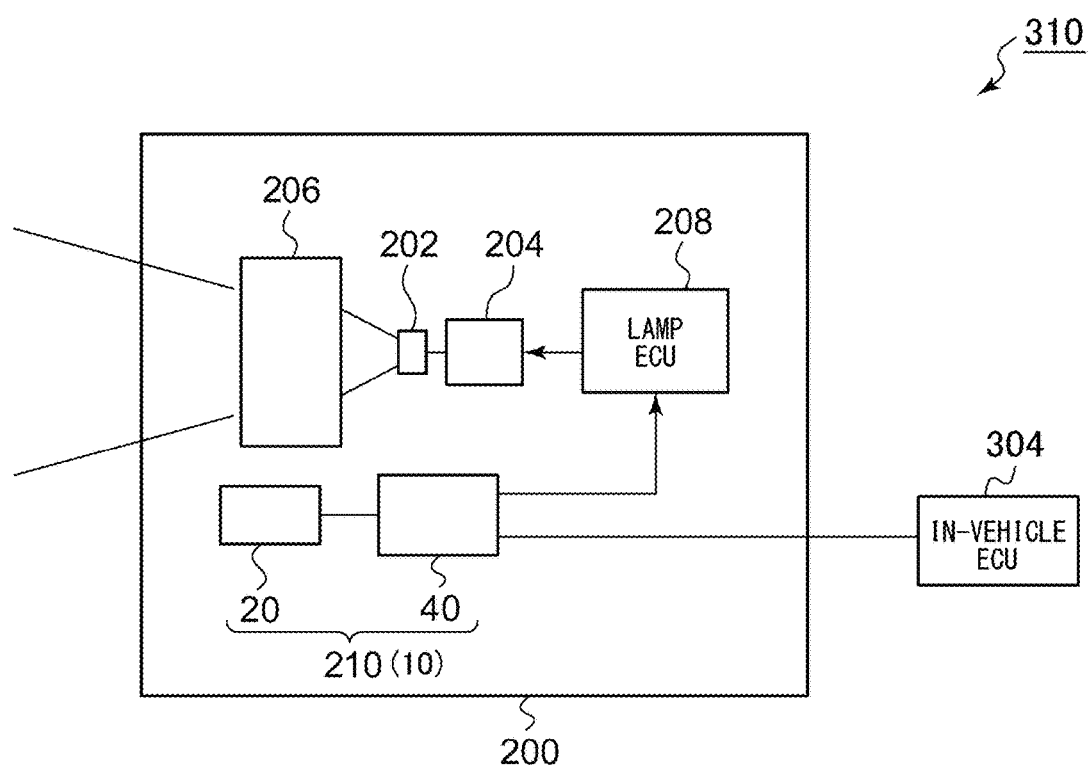
FIG. 6 is a block diagram showing an automotive lamp including an object detection system.

FIG. 6 is a block diagram showing an automotive lamp 200 provided with an object detection system 210. The automotive lamp 200 forms a lamp system 310 together with an in-vehicle ECU 304. The automotive lamp 200 includes a light source 202, a lighting circuit 204, and an optical system 206. Furthermore, the automotive lamp 200 includes the object detection system 210. The object detection system 210 corresponds to the object identification system 10 described above. The object detection system 210 includes the camera 30 and the processing device 40.

Also, the information with respect to the object OBJ detected by the processing device 40 may be used to support the light distribution control operation of the automotive lamp 200. Specifically, a lamp ECU 208 generates a suitable light distribution pattern based on the information with respect to the kind of the object OBJ and the position thereof generated by the processing device 40. The lighting circuit 204 and the optical system 206 operate so as to provide the light distribution pattern generated by the lamp ECU 208.

Also, the information with respect to the object OBJ detected by the processing device 40 may be transmitted to the in-vehicle ECU 304. The in-vehicle ECU may support autonomous driving based on the information thus transmitted.

Next, description will be made regarding a modification relating to the embodiment 1.

Modification 1

Figure 7:
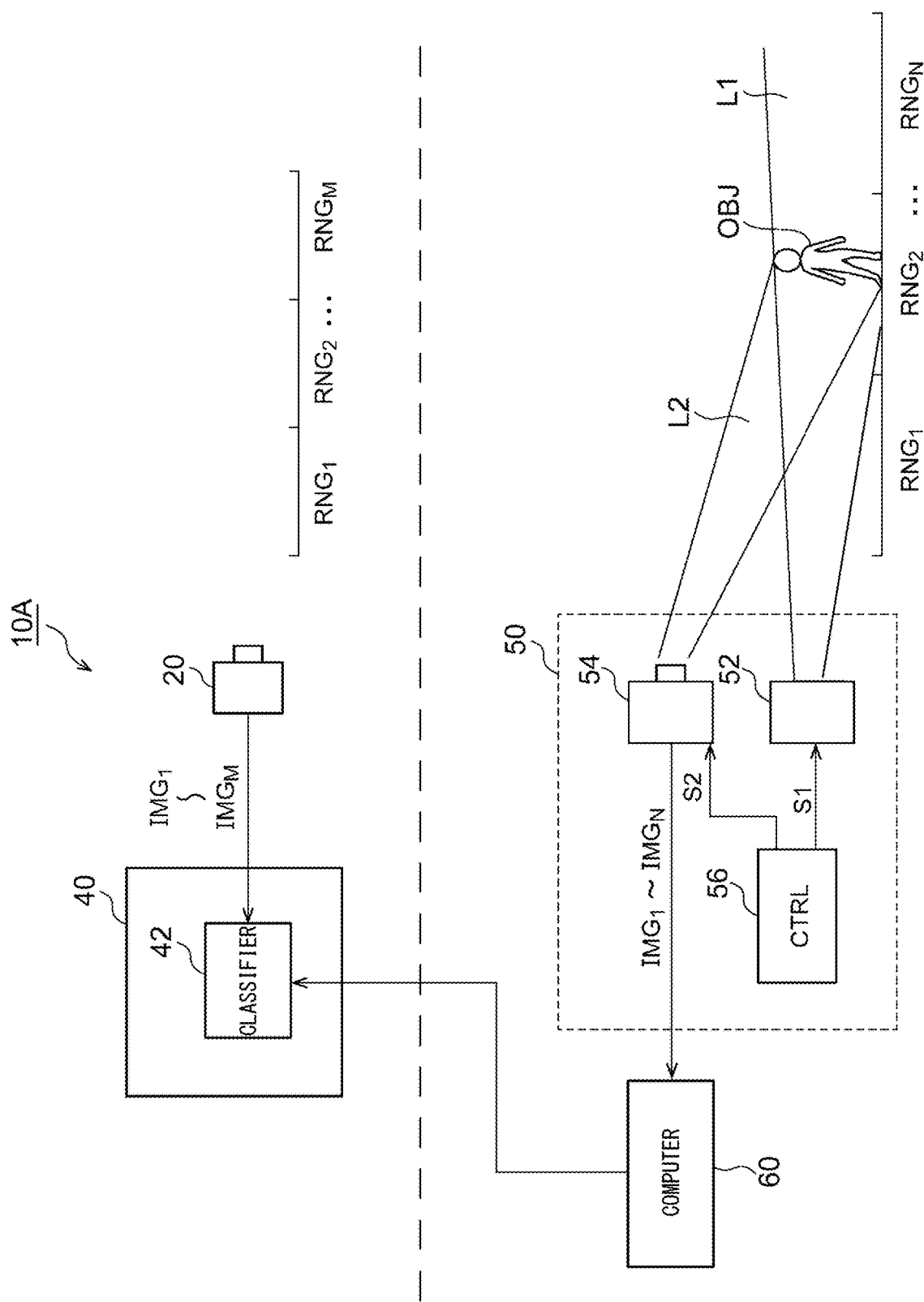
FIG. 7 is a block diagram showing an object identification system according to a modification 1.

FIG. 7 is a block diagram showing an object identification system 10A according to a modification 1. The object identification system 10A includes a gating camera 20 instead of the camera 30 shown in FIG. 1. The gating camera 20 has the same configuration as that of the gating camera 50 shown in FIG. 1. The gating camera 20 is configured to divide a field of view in the depth-direction into a plurality of M (M≥2) ranges $RNG_1$ through $RNG_M$, and to capture an image for each range while changing the time difference between the light projection and the exposure. The gating camera 20 generates multiple images $IMG_1$ through $IMG_M$ that correspond to the multiple ranges $RNG_1$ through $RNG_M$.

The classifier 42 receives the multiple images $IMG_1$ through $IMG_M$ that correspond to the plurality of M (M≥2) ranges $RNG_1$ through $RNG_M$ from the gating camera 20. The classifier 42 is configured to be capable of identifying the kind of an object included in each image based on the multiple images $IMG_1$ through IMG. The classifier 42 is learned using the multiple images $IMG_1$ through $IMG_M$ generated by the gating camera 50. The number N of the ranges supported by the gating camera 50 may be the same as the number M of the ranges supported by the gating camera 20. Also, there may be a difference between them.

II Second Aspect of the Present Disclosure

II-1. Overview

An embodiment relating to the second aspect of the present disclosure relates to an in-vehicle object identification system. The object identification system includes: a gating camera structured to divide a field of view in the depth direction into multiple ranges, and to capture an image while changing the time difference between light projection and exposure for each range; and a processing device structured to be capable of identifying the kind of an object based on multiple images that correspond to multiple ranges generated by the gating camera. The processing device includes multiple classifiers structured to have different algorithms, and to select the classifier that corresponds to the range so as to identify an object.

With such an embodiment, there is a difference in the algorithm to be applied between a near-distance object and a far-distance object. This provides an improved identification rate.

Also, the processing device employs a classifier with a You Only Look Once (YOLO) algorithm for image processing in a near-distance range. The YOLO algorithm is unsuitable for identifying an object having a small size. However, the YOLO algorithm has an advantage of a high processing speed. As the distance to the object becomes shorter, the size of the object included in the image becomes larger. Accordingly, in this case, by employing the YOLO algorithm, this arrangement is capable of detecting an object included in a near-distance range with high precision and high speed.

Also, the processing device may employ a classifier with a Single Shot MultiBox Detector (SSD) algorithm for image processing in a far-distance range. The SSD algorithm has a disadvantage of poor processing speed. However, the SSD algorithm has an advantage of being capable of detecting an object with high precision even if the object has a small size. As the distance to the object becomes longer, the size of the object included in the image becomes smaller. Accordingly, in this case, by employing the SSD algorithm, this arrangement is capable of detecting and identifying an object included in a far-distance range with high precision.

Also, the processing device may employ a classifier with a relatively high-speed algorithm for image processing in a relatively near-distance range.

Also, the processing device may employ a classifier with a relatively high-precision algorithm for image processing in a relatively far-distance range.

II-2. Detailed Description

Figure 8:
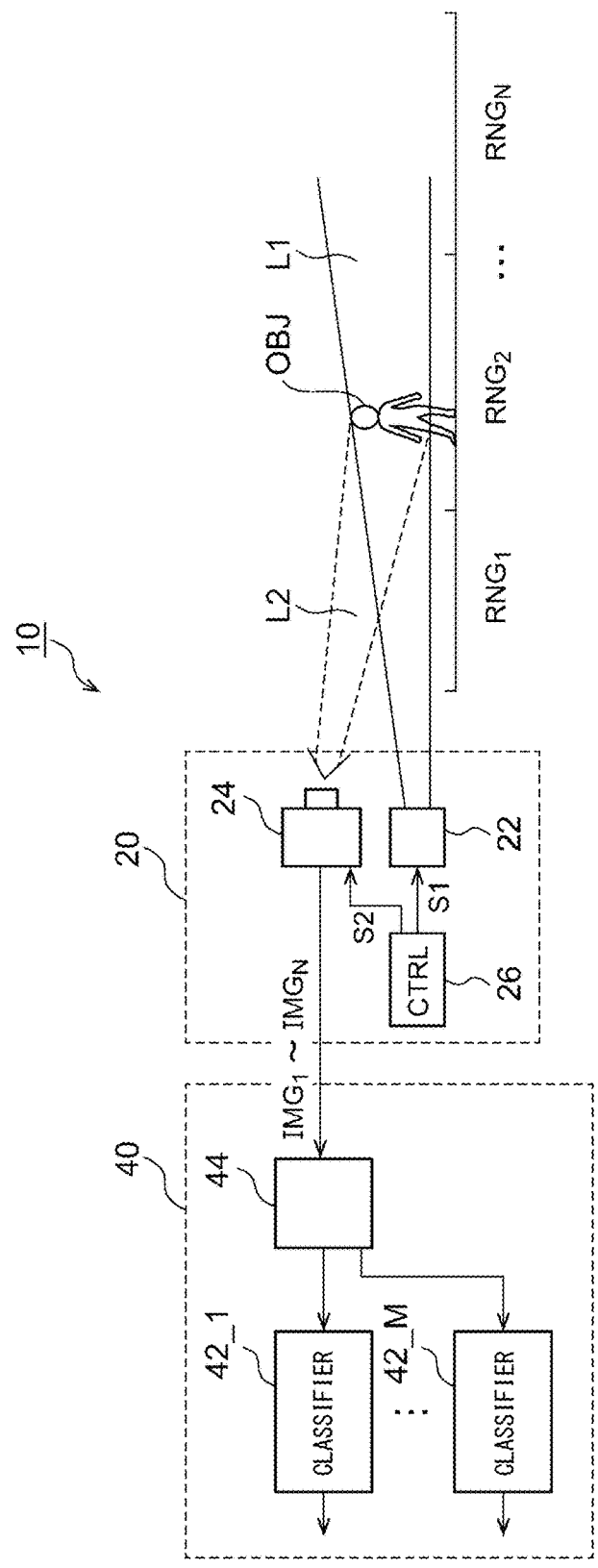
FIG. 8 is a block diagram showing an object identification system according to an embodiment 2.

FIG. 8 is a block diagram showing an object identification system 10 according to an embodiment 2. The object identification system 10 is mounted on a vehicle such as an automobile, motorcycle, or the like. The object identification system 10 judges the kind (category) of an object OBJ that exists in the vicinity of the vehicle.

The object identification system 10 mainly includes the gating camera 20 and the processing device 40. The gating camera 20 includes a light projector 22, an image sensor 24, and a controller 26. The gating camera 20 captures images for a plurality of N (N≥2) ranges $RNG_1$ through $RNG_N$ divided in the depth direction. The ranges may be designed such that adjacent ranges overlap at their boundaries in the depth direction.

The light projector 22 irradiates probe light L1 in front of the vehicle in synchronization with a light projection timing signal S1 supplied from the controller 26. As the probe light L1, infrared light is preferably employed. However, the present invention is not restricted to such an arrangement. Also, as the probe light L1, visible light having a predetermined wavelength may be employed.

The image sensor 24 is configured to support exposure control in synchronization with an image capture timing signal S2 supplied from the controller 26, and to be capable of generating an image IMG. The image sensor 24 is sensitive to the same wavelength as that of the probe light L1. The image sensor 24 captures an image of reflected light (returned light) L2 reflected by the object OBJ.

The controller 26 changes the light projection timing signal S1 and the image capture timing signal S2 for each range RNG, so as to change the time difference between the light projection by the light projector 22 and the exposure of the image sensor 24. The gating camera 20 generates multiple images $IMG_1$ through $IMG_N$ that correspond to the multiple ranges $RNG_1$ through $RNG_N$. As the i-th image $IMG_i$, only an image of an object included in the corresponding range $RNG_i$ is acquired.

Figure 9:
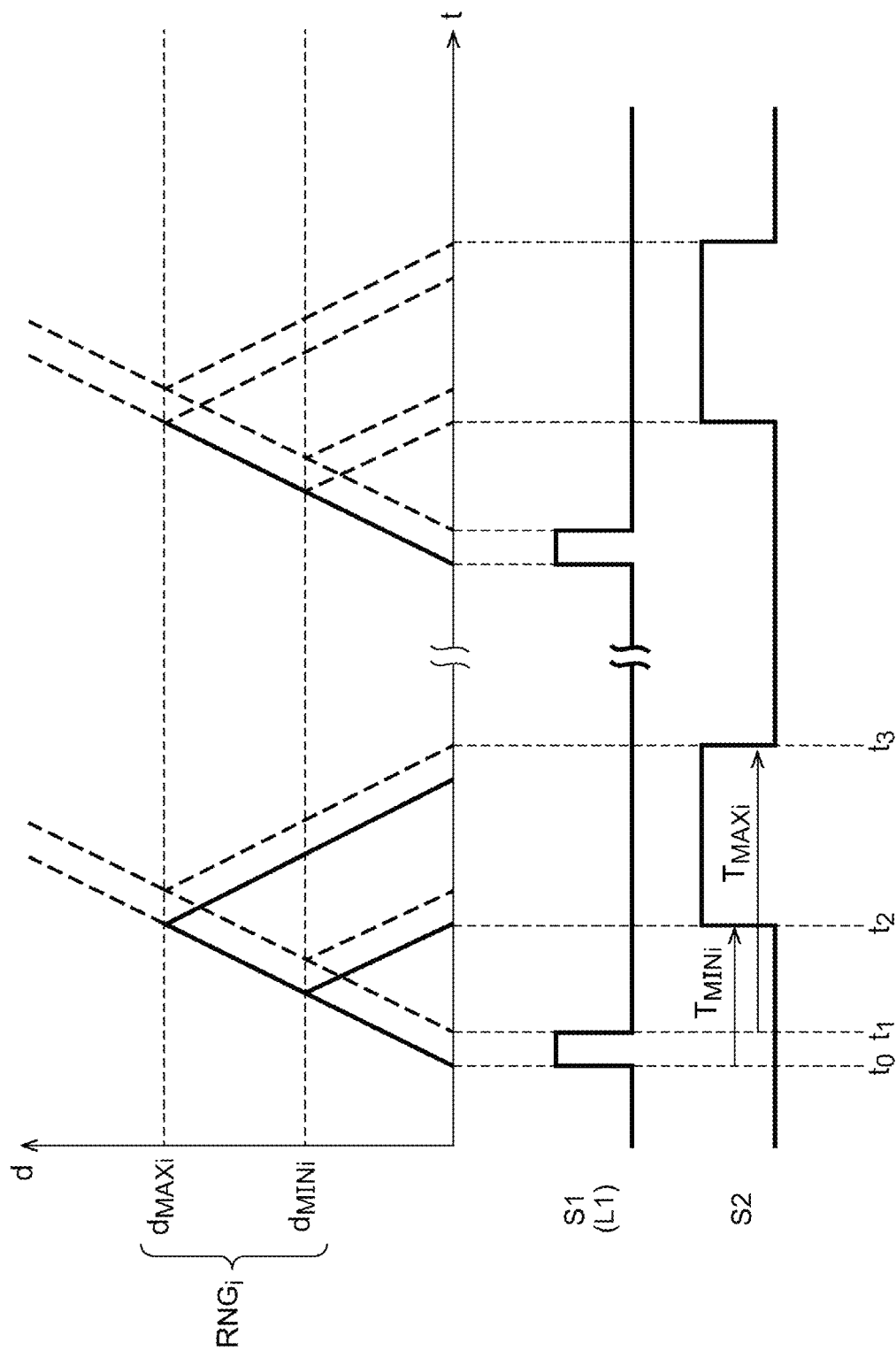
FIG. 9 is a diagram for explaining the operation of the gating camera.

FIG. 9 is a diagram for explaining the operation of the gating camera 20. FIG. 9 shows the operation when the i-th range $RNG_i$ is measured. The light projector 22 emits light during a light projection period $\tau_1$ between the time points $t_0$ and $t_1$ in synchronization with the light projection timing signal S1. In the upper diagram, a light beam diagram is shown with the horizontal axis as time and with the vertical axis as distance. The distance between the gating camera 20 and the near-distance boundary of the range $RNG_i$ is represented by $d_{MINi}$. The distance between the gating camera 20 and the far-distance boundary of the range $RNG_i$ is represented by $d_{MAXi}$.

The round-trip time $T_{MINi}$, which is a period from the departure of light from the light projector 22 at a given time point, to the arrival of the light at the distance $d_{MINi}$, up to the return of the reflected light to the image sensor 24, is represented by $T_{MINi}=2\times d_{MINi}/C$. Here, c represents the speed of light.

Similarly, the round-trip time Taxi, which is a period from the departure of light from the light projector 22 at a given time point, to the arrival of the light at the distance $d_{MAXi}$, up to the return of the reflected light to the image sensor 24, is represented by $T_{MAXi}=2\times d_{MAXi}/C$.

When only an image of an object OBJ included in the range $RNG_i$ is to be captured, the controller 26 generates the image capture timing signal S2 so as to start the exposure at the time point $t_2=t_0+T_{MINi}$, and so as to end the exposure at the time point $t_3=t_1+T_{MAXi}$. This is a single exposure operation.

When an image is captured for the i-th range $RNG_i$, the exposure may be executed multiple times. In this case, preferably, the controller 26 may repeatedly execute the above-described exposure operation multiple times with a predetermined period $\tau_2$.

Returning to FIG. 8, the processing device 40 is configured to identify the kind of an object based on multiple images $IMG_1$ through $IMG_N$ that correspond to the multiple ranges $RNG_1$ through $RNG_N$ generated with the gating camera 20. The processing device 40 may be configured as a combination of a processor (hardware component) such as a Central Processing Unit (CPU), Micro Processing Unit (MPU), microcontroller, or the like, and a software program to be executed by the processor (hardware). Also, the processing device 40 may be configured as a combination of multiple processors. Alternatively, the processing device 40 may be configured as a hardware component only.

The processing device 40 includes a plurality of M (M≥2) classifiers 42_1 through 42_M with different algorithms. A selector 44 supplies each image IMG to the corresponding classifier 42 selected according to the range RNG. Each classifier 42 processes the image IMG thus supplied, so as to detect an object included in the image IMG and to classify (identify) the kind of the object thus detected.

The number M of the classifiers 42 may be the same as the number N of the ranges RNG. Also, the number M of the classifiers 42 may be smaller than the number N of the ranges RNG.

At least one from among the multiple algorithms may be configured as a high-speed algorithm with low precision (i.e., with low detection precision with respect to a small object). Also, at least another one from among the multiple algorithms may be configured as a low-speed algorithm with high precision (i.e., with high detection precision for a small object).

The processing device 40 may preferably use a classifier that supports an algorithm with relatively high speed and low precision for image processing for a range at a relatively near distance. Also, the processing device 40 may preferably use a classifier that supports an algorithm with relatively high precision and low speed for image processing for a range at a relatively far distance.

For example, as one from among the multiple algorithms, the You Only Look Once (YOLO) algorithm is preferably employed. Also, as another one from among the multiple algorithms, the Single Shot MultiBox Detector (SSD) algorithm is preferably employed.

The above is the configuration of the object identification system 10. Next, description will be made regarding the operation thereof.

FIG. 10A is a time chart for explaining the operation of the object identification system 10 shown in FIG. 8. Description will be made below assuming that M=2, N=2, the classifier 42_1 with the YOLO algorithm is assigned to the processing of the image $IMG_1$ of the first range $RNG_1$, and the classifier 42_2 with the SSD algorithm is assigned to the image $IMG_2$ of the second range $RNG_2$.

The image $IMG_1$ of the range $RNG_1$ is generated by the gating camera 20, and is subjected to the processing by the classifier 42_1 with the YOLO algorithm. Subsequently, the image $IMG_2$ of the range $RNG_2$ is generated by the gating camera 20, and is subjected to the processing by the classifier 42_2 with the SSD algorithm.

The above is the operation of the object identification system 10. With the object identification system 10 employing two or more classifiers with algorithms that have a complementary relation, the corresponding classifier is assigned to each image capture range. This allows an object to be detected with high precision in a short period of time regardless of whether the object is at a near distance or a far distance.

More specifically, the YOLO algorithm has an advantage of supporting high-speed processing although it is unsuitable for identifying a small object. As the distance to an object included in an image becomes smaller, the size of the object image becomes larger. Accordingly, with such an arrangement in which the YOLO algorithm is used for image processing for the near-distance range $RNG_1$, this allows an object included in such a near-distance range to be detected and identified with high precision and with high speed.

In contrast, the SSD algorithm supports high-precision detection even if a small object is to be detected although it exhibits poor processing speed as compared with the YOLO algorithm. As the distance to an object included in an image becomes larger, the size of the object image becomes smaller. Accordingly, by using the SSD algorithm for detecting such an object, this allows an object included in a far-distance range to be detected and identified with high precision.

The advantages of the object identification system 10 shown in FIG. 8 can be clearly understood in comparison with a comparison technique. With the comparison technique, the processing is handled by a classifier that has a high-precision algorithm (SSD) regardless of the range. FIG. 10B is a time chart for explaining the operation of an object identification system according to the comparison technique. With such an arrangement in which the SSD algorithm is applied to all the images $IMG_1$ and $IMG_2$, such an arrangement is capable of supporting high-precision detection regardless of the distance to an object. However, in order to identify the objects for all the ranges, such an arrangement requires a detection time that is longer than that shown in FIG. 10A. In other words, this means that such a comparison technique has a problem of a reduced frame rate. In order to support a high frame rate in such a comparison technique, the processing device 40 is required to be configured employing a high-speed CPU or microcontroller, leading to an increased cost for the object identification system 10.

In contrast, with the object identification system 10 according to the embodiment 2 employing a combination of multiple algorithms, such an arrangement is capable of supporting both high-precision detection and a high frame rate without employing such a high-cost (high-speed) hardware component.

Figure 11:
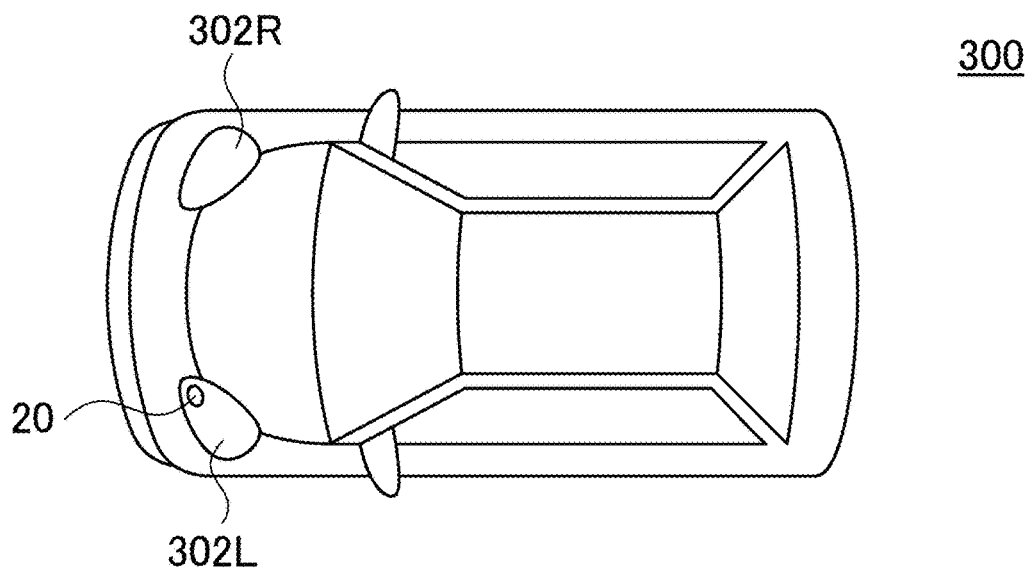
FIG. 11 is a block diagram showing an automobile including the object identification system.

FIG. 11 is a block diagram showing an automobile provided with the object identification system 10. An automobile 300 is provided with headlamps 302L and 302R. The object identification system 10 is built into at least one from among the headlamps 302L and 302R. Each headlamp 302 is positioned at a frontmost end of the vehicle body, which is most advantageous as a position where the gating camera 20 is to be installed for detecting an object in the vicinity.

Figure 12:
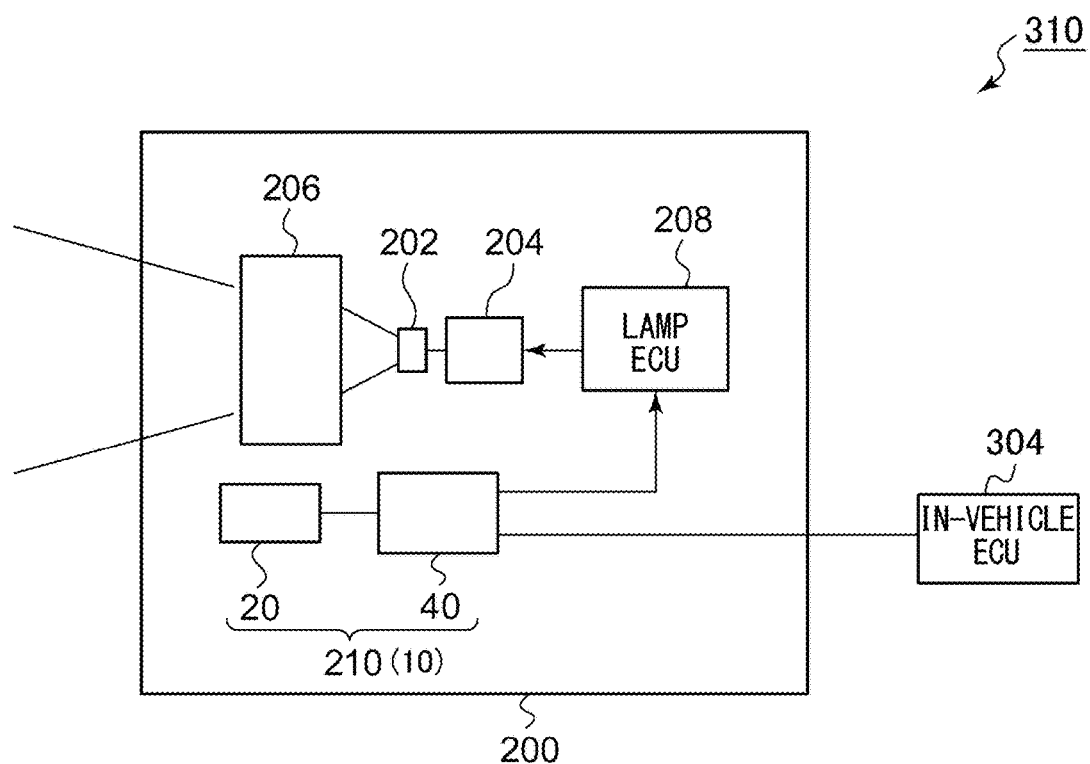
FIG. 12 is a block diagram showing an automotive lamp including the object detection system.

FIG. 12 is a block diagram showing an automotive lamp 200 provided with an object detection system 210. The automotive lamp 200 forms a lamp system 310 together with an in-vehicle ECU 304. The automotive lamp 200 includes a light source 202, a lighting circuit 204, and an optical system 206. Furthermore, the automotive lamp 200 includes the object detection system 210. The object detection system 210 corresponds to the object identification system 10 described above. The object detection system 210 includes the gating camera 20 and the processing device 40.

Also, the information with respect to the object OBJ detected by the processing device 40 may be used to support the light distribution n control operation of the automotive lamp 200. Specifically, a lamp ECU 208 generates a suitable light distribution pattern based on the information with respect to the kind of the object OBJ and the position thereof generated by the processing device 40. The lighting circuit 204 and the optical system 206 operate so as to provide the light distribution pattern generated by the lamp ECU 208.

Also, the information with respect to the object OBJ detected by the processing device 40 may be transmitted to the in-vehicle ECU 304. The in-vehicle ECU may support autonomous driving based on the information thus transmitted.

Next, description will be made regarding a modification relating to the embodiment 2.

Modification 1

In a case in which M=2 and N≥3, the classifier 42_1 with the YOLO algorithm may preferably be assigned to the processing of the images $IMG_1$ through $IMG_k$ of the first through k-th ranges $RNG_1$ through $RNG_k$. Also, the classifier 42_2 with the SSD algorithm may preferably be assigned to the images $IMG_k+1$ through $IMG_N$ of the (k+1)-th through N-th ranges $RNG_{k+1}$ through $RNG_N$.

Modification 2

Description has been made in the embodiment 2 regarding an arrangement employing the YOLO algorithm and the SSD algorithm as the multiple algorithms. However, the present invention is not restricted to such an arrangement. Known examples of object identification algorithms include the Region-Based Convolutional Neural Network (R-CNN) algorithm, Spatial Pyramid Pooling (SPPnet) algorithm, Faster R-CNN algorithm, Deconvolution-SSD (DSSD) algorithm, Mask R-CNN algorithm, etc. A desired one from among the known examples of the object identification algorithms may be employed. Alternatively, other algorithms that will be developed in the future may be employed.

III Third Aspect of the Present Disclosure

III-1. Overview

An embodiment relating to the third aspect of the present disclosure relates to an object identification system. The object identification system includes: a gating camera structured to divide a field of view in the depth direction into multiple ranges, and to capture an image while changing the time difference between light projection and exposure for each range; a scaler structured to scale multiple images that correspond to multiple ranges generated by the gating camera with a coefficient defined for each range; and a classifier structured to be capable of identifying the kind of an object based on the multiple images thus scaled.

With this embodiment, the size of the same object can be aligned in the multiple images input to the classifier. This provides the classifier with improved identification capability. Alternatively, this allows the learning cost to be reduced.

Also, as the range becomes nearer, the coefficient may be reduced. Also, as the range becomes farther, the coefficient may be increased.

Also, one from among the multiple ranges may be employed as a reference range with a coefficient of 1. Also, the coefficient of a given range on a nearer side than the reference range may be set to a value that is smaller than 1. Also, the coefficient of a given range on a farther side than the reference range may be set to a value that is larger than 1. This allows the operation of the scaler to be simplified. Furthermore, the learning may preferably be executed mainly using an image of an object arranged in the reference range. This allows the number of times images of objects arranged outside the reference range are captured to be reduced.

III-2. Detailed Description

Description will be made with reference to the drawings regarding a third aspect of the present disclosure based on a preferred embodiment.

Figure 13:
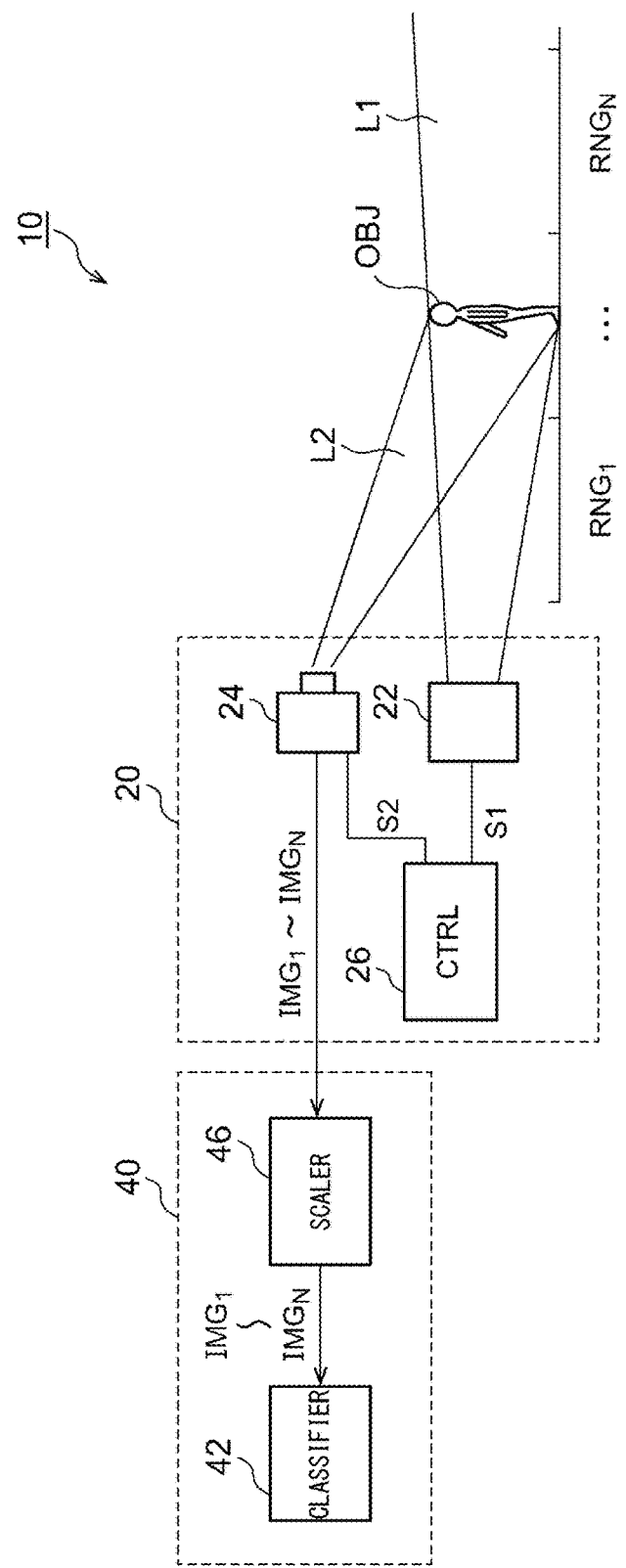
FIG. 13 is a block diagram showing an object identification system according to an embodiment 3.

FIG. 13 is a block diagram showing an object identification system 10 according to an embodiment 3. The object identification system 10 is mounted on a vehicle such as an automobile, motorcycle, or the like. The object identification system 10 judges the kind (category) of an object OBJ that exists in the vicinity of the vehicle.

The object identification system 10 mainly includes the gating camera 20 and the processing device 40. The gating camera 20 includes a light projector 22, an image sensor 24, and a controller 26. The gating camera 20 captures images for a plurality of N (N≥2) ranges $RNG_1$ through $RNG_N$ divided in the depth direction. The ranges may be designed such that adjacent ranges overlap at their boundaries in the depth direction.

The light projector 22 irradiates probe light L1 in front of the vehicle in synchronization with a light projection timing signal S1 supplied from the controller 26. As the probe light L1, infrared light is preferably employed. However, the present invention is not restricted to such an arrangement. Also, as the probe light L1, visible light having a predetermined wavelength may be employed.

The image sensor 24 is configured to support exposure control in synchronization with an image capture timing signal S2 supplied from the controller 26, and to be capable of generating an image IMG. The image sensor 24 is sensitive to the same wavelength as that of the probe light L1. The image sensor 24 captures an image of reflected light (returned light) L2 reflected by the object OBJ.

The controller 26 changes the light projection timing signal S1 and the image capture timing signal S2 for each range RNG, so as to change the time difference between the light projection by the light projector 22 and the exposure of the image sensor 24. The gating camera 20 generates multiple images $IMG_1$ through $IMG_N$ that correspond to the multiple ranges $RNG_1$ through $RNG_N$. As the i-th image $IMG_i$, only an image of an object included in the corresponding range $RNG_i$ is acquired.

Figure 14:
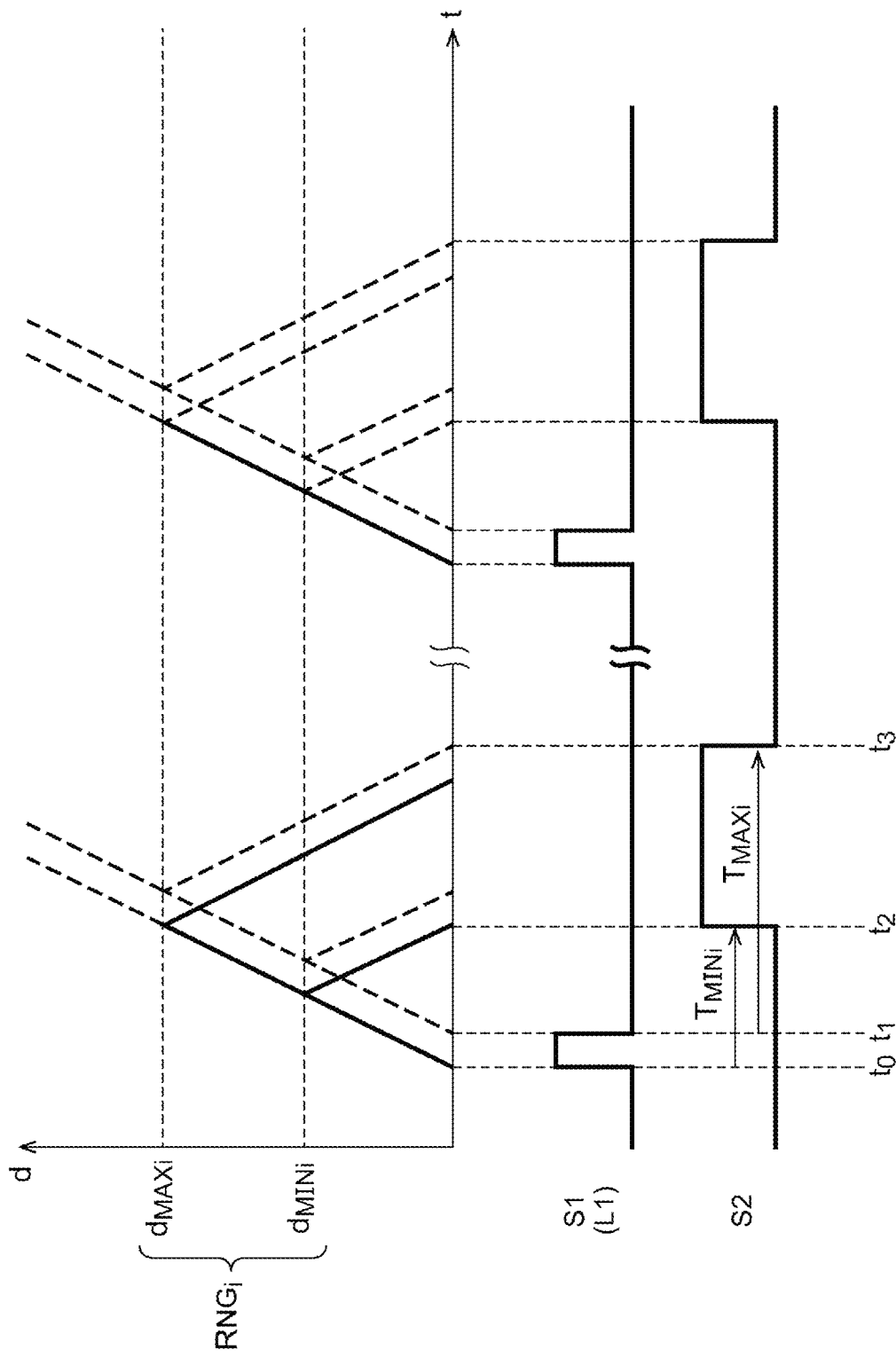
FIG. 14 is a diagram for explaining the operation of the gating camera.

FIG. 14 is a diagram for explaining the operation of the gating camera 20. FIG. 14 shows the operation when the i-th range $RNG_i$ is measured. The light projector 22 emits light during a light projection period $\tau_1$ between the time points $t_0$ and $t_1$ in synchronization with the light projection timing signal S1. In the upper diagram, a light beam diagram is shown with the horizontal axis as time and with the vertical axis as distance. The distance between the gating camera 20 and the near-distance boundary of the range $RNG_i$ is represented by $d_{MINi}$. The distance between the gating camera 20 and the far-distance boundary of the range $RNG_i$ is represented by $d_{MAXi}$.

The round-trip time $T_{MINi}$, which is a period from the departure of light from the light projector 22 at a given time point, to the arrival of the light at the distance $d_{MINi}$, up to the return of the reflected light to the image sensor 24, is represented by $T_{MINi}=2\times d_{MINi}/C$. Here, c represents the speed of light.

Similarly, the round-trip time Taxi, which is a period from the departure of light from the light projector 22 at a given time point, to the arrival of the light at the distance $d_{MAXi}$, up to the return of the reflected light to the image sensor 24, is represented by $T_{MAXi}=2\times d_{MAXi}/C$.

When only an image of an object OBJ included in the range $RNG_i$ is to be captured, the controller 26 generates the image capture timing signal S2 so as to start the exposure at the time point $t_2=t_0+T_{MINi}$, and so as to end the exposure at the time point $t_3=t_1+T_{MAXi}$. This is a single exposure operation.

When an image is captured for the i-th range $RNG_i$, the exposure may be executed multiple times. In this case, preferably, the controller 26 may repeatedly execute the above-described exposure operation multiple times with a predetermined period $\tau_2$.

FIGS. 15A and 15B are diagrams for explaining an image generated by the gating camera 20. FIG. 15A shows an example in which an object (pedestrian) $OBJ_2$ exists in the range $RNG_2$, and an object (vehicle) $OBJ_3$ exists in the range $RNG_3$. FIG. 15B shows multiple images $IMG_1$ through $IMG_3$ acquired in the situation shown in FIG. 15A. When the image $IMG_1$ is captured, the image sensor is exposed by only the reflected light from the range $RNG_1$. Accordingly, the image $IMG_1$ includes no object image.

When the image $IMG_2$ is captured, the image sensor is exposed by only the reflected light from the range $RNG_2$. Accordingly, the image $IMG_2$ includes only the object $OBJ_2$. Similarly, when the image $IMG_3$ is captured, the image sensor is exposed by only the reflected light from the range $RNG_3$. Accordingly, the image $IMG_3$ includes only the object $OBJ_3$. As described above, with the gating camera 20, this arrangement is capable of capturing object images in the form of separate images for the respective ranges.

Returning to FIG. 13, the processing device 40 is configured to identify the kind of an object based on multiple images $IMG_1$ through $IMG_N$ that correspond to the multiple range $RNG_1$ through $RNG_N$ generated with the gating camera 20. The processing device 40 is provided with a classifier 42 implemented based on a model generated by machine learning. The algorithm employed by the classifier 42 is not restricted in particular. Examples of the algorithms that can be employed include You Only Look Once (YOLO), Single Shot MultiBox Detector (SSD), Region-based Convolutional Neural Network (R-CNN), Spatial Pyramid Pooling (SPPnet), Faster R-CNN, Deconvolution-SSD (DSSD), Mask R-CNN, etc. Also, other algorithms that will be developed in the future may be employed.

The processing device 40 may be configured as a combination of a processor (hardware component) such as a Central Processing Unit (CPU), Micro Processing Unit (MPU), microcontroller, or the like, and a software program to be executed by the processor (hardware component). Also, the processing device 40 may be configured as a combination of multiple processors. Alternatively, the processing device 40 may be configured as a hardware component alone.

As a result of investigating the training of the classifier 42, the present inventor has recognized the following problem.

In the training of the classifier 42, an enormous amount of learning data (training data) is used. As the learning data, image data captured by a gating camera or an ordinary camera is used.

Figure 16A:
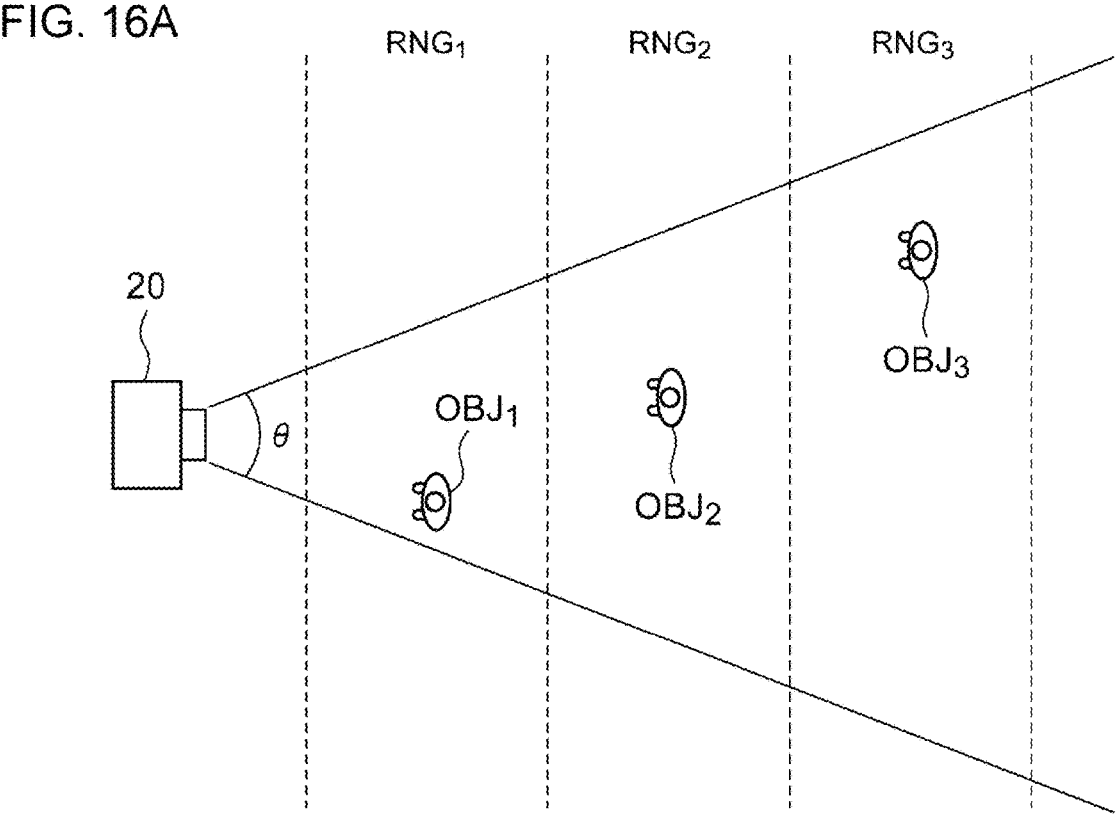
FIGS. 16A and 16B are diagrams for explaining images generated by the gating camera.
Figure 16B:
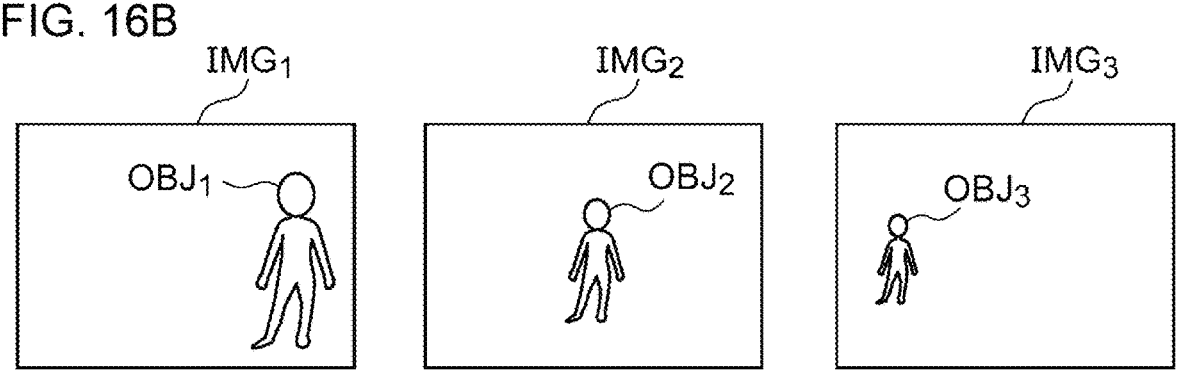

FIGS. 16A and 16B are diagrams for explaining images generated by the gating camera 20. As shown in FIG. 16A, let us consider a situation in which the same object (assumed to be a pedestrian in this example) OBJ exists in different ranges. The gating camera 20 has a horizontal angle of view (viewing angle) θ and vertical angle of view determined by its sensor size and the optical system. The gating camera 20 captures an image with the same angle of view regardless of the range. Accordingly, when the gating camera 20 captures an image of the same object at different distances, there is a difference in the image capture magnification depending on the distance to the object. That is to say, as shown in FIG. 16B, as the distance to the object becomes larger, the object image size becomes smaller. Conversely, as the distance to the object becomes smaller, the object image size becomes larger. It should be noted that such a feature is not restricted to a gating camera. The same can be said of a case of using an ordinary camera to capture an image.

The processing device 40 is required to be capable of identifying all the objects $OBJ_1$ through $OBJ_3$ included in the images $IMG_1$ through $IMG_3$ as a pedestrian. In order to satisfy this requirement, a method described below is employed. That is to say, images of a given category of an object are captured at different distances, and the images thus prepared are employed as the learning data. Also, another method is also employed. That is to say, an image of a given object is captured as a basic image at a predetermined distance. The basic image is enlarged or reduced so as to generate multiple images. The multiple images thus generated are employed as the learning data (which is referred to as "data augmentation").

However, such methods can lead to increased learning costs. In addition, it is conceivable that such a method has the potential to cause a situation in which a satisfactory identification rate cannot be obtained.

In order to solve such a problem, in the present embodiment 3, as shown in FIG. 13, the processing device 40 is provided with a scaler 46 configured as its upstream stage. The scaler 46 scales the multiple images $IMG_1$ through $IMG_N$ that correspond to the multiple ranges $RNG_1$ through $RNG_N$ generated by the gating camera 20, with a coefficient K #defined for each range $RNG_\#$ ("#" represents 1, 2, . . . , N). The relation between the range and the coefficient may be held in the form of a table. Also, the relation between them may be held in the form of a calculation expression.

Figure 17A:
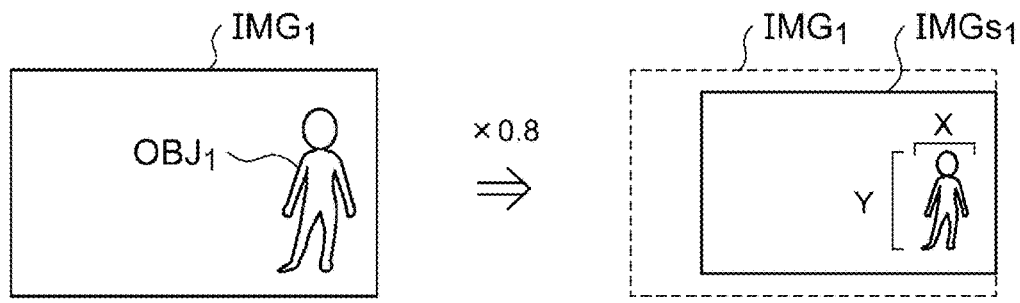
FIGS. 17A through 17C are diagrams for explaining an example of scaling processing by a scaler.
Figure 17B:
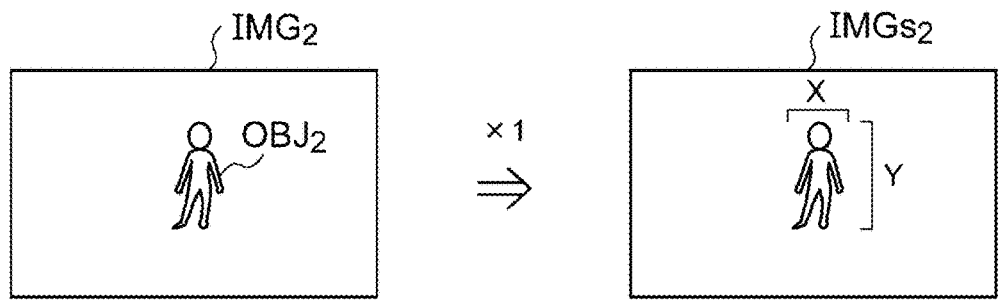
Figure 17C:
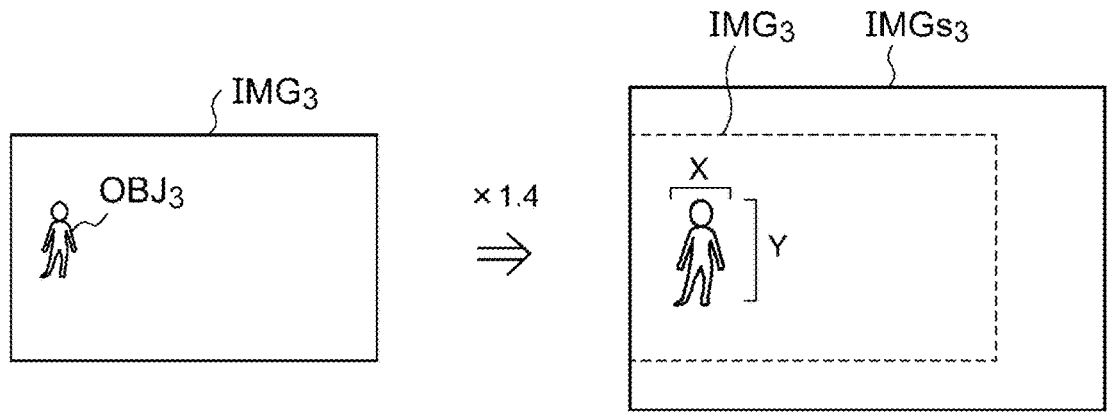

FIGS. 17A through 17C are diagrams for explaining an example of scaling processing by the scaler 46. Description will be made regarding an arrangement in which N=3. The coefficients $K_1$ through $K_3$ are determined such that, after scaling processing, the sizes (pixel values x and y in the horizontal direction and the vertical direction) of the objects OBJ included in the images $IMGs_1$ through $IMGs_3$ thus subjected to scaling processing approach each other.

A reference range may be selected from among the multiple ranges. In this case, the coefficient for the reference range is determined to be 1 or a value in the vicinity of 1. In a case in which the range $RNG_\#$ is selected as the reference range, and the coefficient $K_\#$ is set to 1, the image may be scaled such that the relation $IMG_\# = IMGs_\#$ holds true. In this example, the central range $RNG_2$ is selected as the reference range with the coefficient $K_2$ of 1.

With respect to a range at a distance from the gating camera 20 that is smaller than that of the reference range, the coefficient K is set to a value that is smaller than 1. In a case in which $K_\# < 1$, the original image $IMG_\#$ is reduced. In the image reducing processing, pixel thinning may be employed. As a result, the image $IMGs_\#$ has a number of pixels that is smaller than that of the original image $IMG_\#$. In the example shown in FIG. 17A, the coefficient $K_1$ is set to 0.8.

With respect to a range at a distance from the gating camera 20 that is larger than that of the reference range, the coefficient K is set to a value that is larger than 1. In a case in which $K_\# > 1$, the original image $IMG_\#$ is enlarged. In the image enlargement processing, pixel interpolation may be employed. As a result, the number of pixels of the image $IMGs_\#$ is larger than that of the original image $IMG_\#$. In the example shown in FIG. 17C, the coefficient $K_3$ is set to 1.4.

Returning to FIG. 13, the classifier 42 receives the input of the image data $IMGs_1$ through $IMGs_N$ subjected to scaling processing by the scaler 46. The classifier 42 identifies the kind of the object OBJ included in each image data based on the corresponding one from among the image data $IMGs_1$ through $IMGs_N$.

The above is the configuration of the object identification system 10. With the object identification system 10, the image input to the classifier 42 is subjected to scaling such that the size of the same object approaches the same size (the same number of pixels). Accordingly, such an arrangement allows the classifier 42 to detect an object and identify the category of the object thus detected independent of the distance to the object. This provides the classifier 42 with an improved identification rate (correct detection rate).

By employing the object identification system 10, such an arrangement also has an advantage of a reduced learning cost for the classifier 42. That is to say, in the learning, preferably, objects may be arranged in ranges with scaling coefficients that are in the vicinity of 1 as the prioritized ranges. The images generated in this step may preferably be used as the learning data to optimize a parameter to be employed in the classifier 42. Accordingly, such an arrangement allows the number of image capturing operations to be reduced for a range with a scaling coefficient that is largely away from 1.

Figure 18:
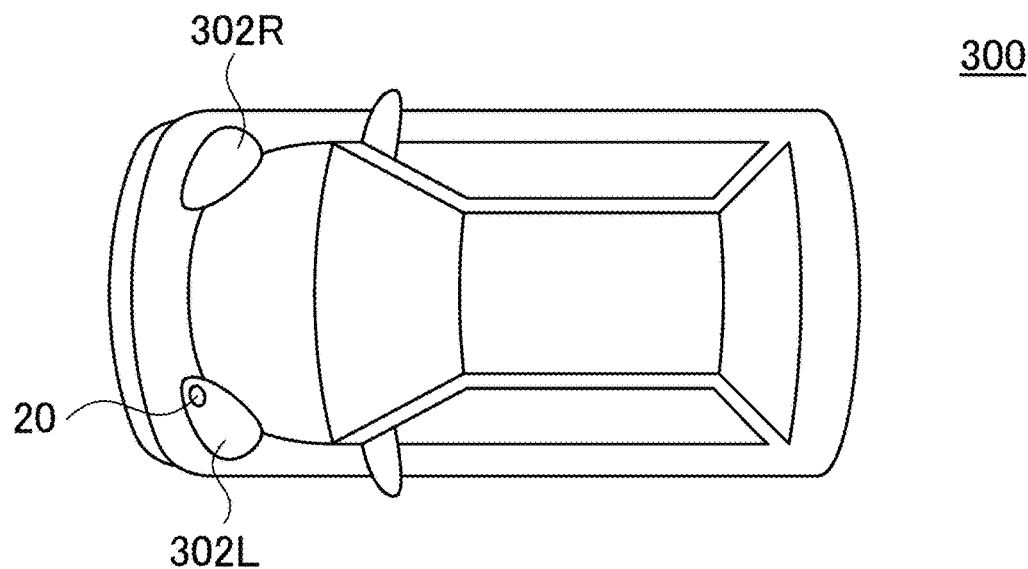
FIG. 18 is a block diagram showing an automobile including the object identification system.

FIG. 18 is a block diagram showing an automobile provided with the object identification system 10. An automobile 300 is provided with headlamps 302L and 302R. The object identification system 10 is built into at least one from among the headlamps 302L and 302R. Each headlamp 302 is positioned at a frontmost end of the vehicle body, which is most advantageous as a position where the gating camera 20 is to be installed for detecting an object in the vicinity.

Figure 19:
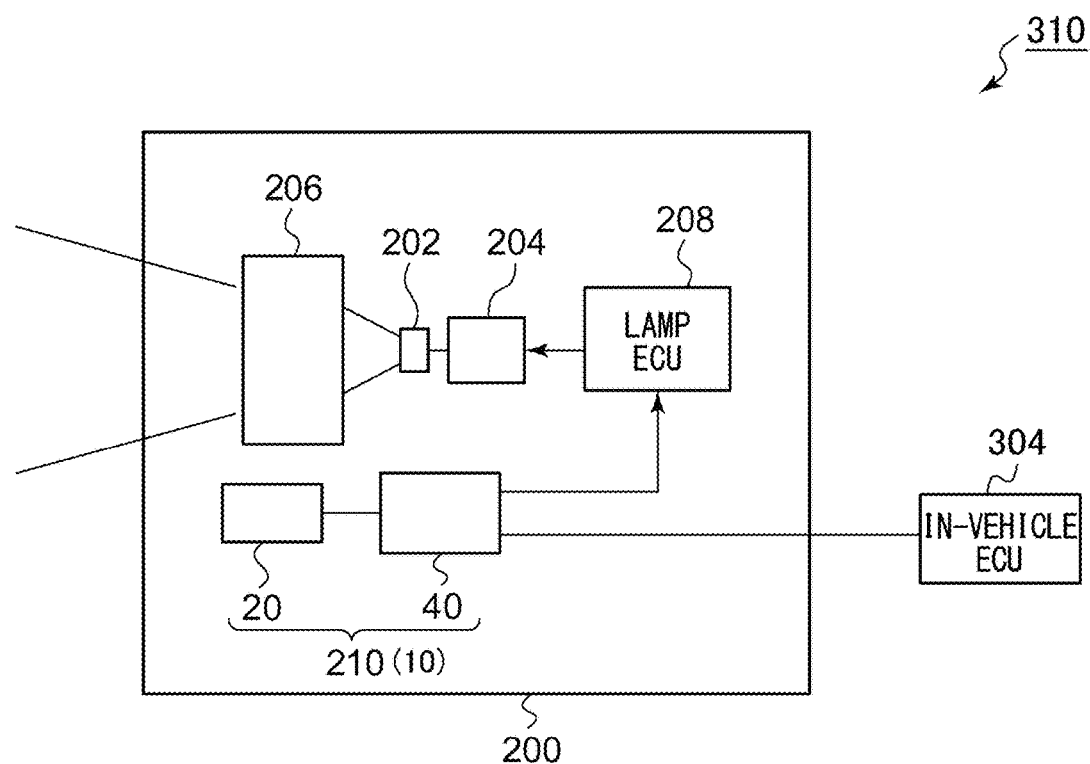
FIG. 19 is a block diagram showing an automotive lamp including the object identification system.

FIG. 19 is a block diagram showing an automotive lamp 200 provided with an object detection system 210. The automotive lamp 200 forms a lamp system 310 together with an in-vehicle ECU 304. The automotive lamp 200 includes a light source 202, a lighting circuit 204, and an optical system 206. Furthermore, the automotive lamp 200 includes the object detection system 210. The object detection system 210 corresponds to the object identification system 10 described above. The object detection system 210 includes the gating camera 20 and the processing device 40.

Also, the information with respect to the object OBJ detected by the processing device 40 may be used to support the light distribution control operation of the automotive lamp 200. Specifically, a lamp ECU 208 generates a suitable light distribution pattern based on the information with respect to the kind of the object OBJ and the position thereof generated by the processing device 40. The lighting circuit 204 and the optical system 206 operate so as to provide the light distribution pattern generated by the lamp ECU 208.

Also, the information with respect to the object OBJ detected by the processing device 40 may be transmitted to the in-vehicle ECU 304. The in-vehicle ECU may support autonomous driving based on the information thus transmitted.

Next, description will be made regarding a modification relating to the embodiment 3.

Modification 1

Description has been made in the embodiment regarding an arrangement in which, from among the multiple ranges, a range in the vicinity of the center is selected as a reference range with a coefficient of 1, and the coefficients of the other ranges are set to a value that is smaller than or larger than 1. However, the present invention is not restricted to such an arrangement. For example, a range on the near side may be selected as a reference range, and the coefficients of the ranges on the far side may be set to a value that is larger than 1. Conversely, the farthest range may be selected as a reference range, and the coefficients of the ranges on the side nearer than the reference range may be set to a value that is smaller than 1.

Modification 2

Figure 20A:
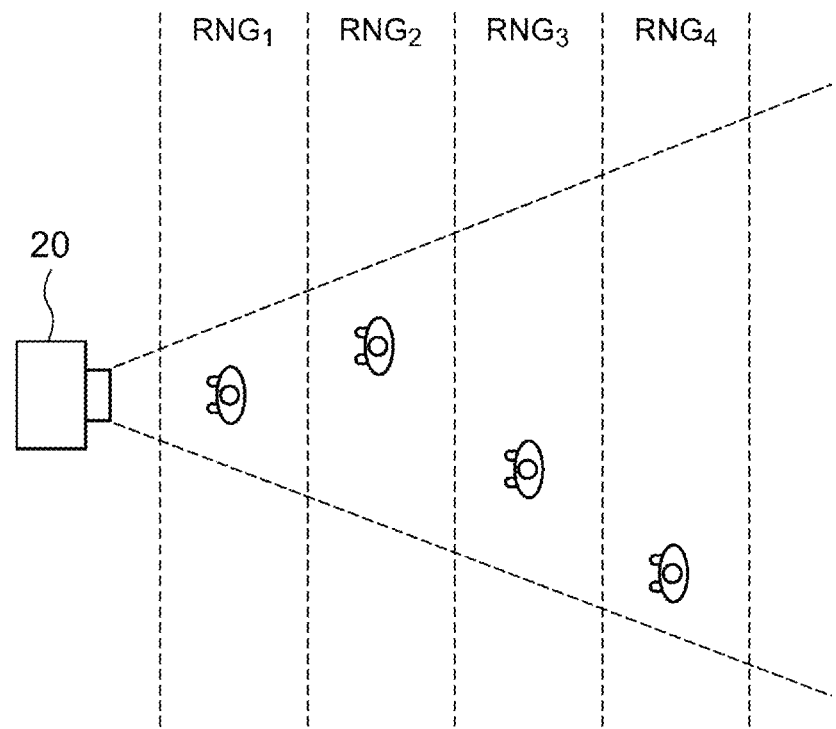
FIGS. 20A and 20B are diagrams for explaining images generated by the gating camera.
Figure 20B:
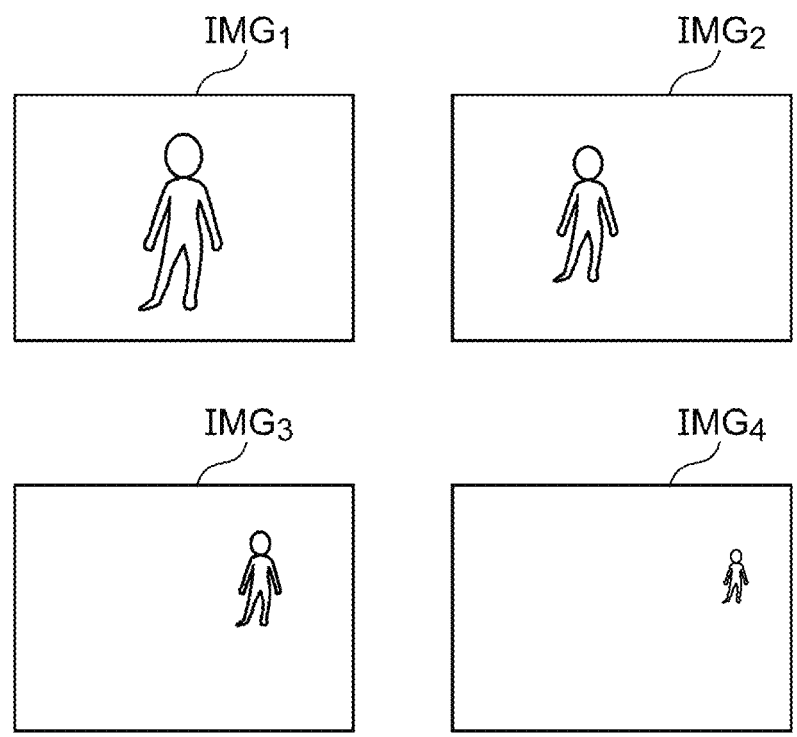

Description has been made regarding an arrangement employing one reference range. Also, multiple reference ranges may be employed. Description will be made with reference to FIG. 20 regarding a modification 2. FIGS. 20A and 20B are diagrams for explaining the images generated by the gating camera 20. Here, description will be made regarding an arrangement in which the number N of the ranges is four. The multiple ranges are divided into multiple sets. Each set includes at least one range. A reference range is provided for each range. For example, the ranges $RNG_1$ and $RNG_2$ are assigned to a first set, and the ranges $RNG_3$ and $RNG_4$ are assigned to a second set. Directing attention to the first set, one from among the ranges $RNG_1$ and $RNG_2$ included in the first set may preferably be determined as the reference range. Also, the coefficients for the remaining ranges may preferably be determined such that the sizes of the corresponding objects approach that of the reference range.

Similarly, directing attention to the second set, one from among the ranges $RNG_3$ and $RNG_4$ included in the second set may preferably be determined as the reference range. Also, the coefficients for the remaining ranges may preferably be determined such that the sizes of the corresponding objects approach that of the reference range.

In the modification 2, the machine learning may preferably be executed for each set of ranges mainly using the images acquired in a situation in which the object is positioned in the reference range.

IV Fourth Aspect of the Present Disclosure

IV-1. Overview

An embodiment relating to the fourth aspect of the present disclosure relates to an object identification system. The object identification system includes: a gating camera structured to divide a field of view in the depth direction into multiple ranges, and to capture an image while changing the time difference between light projection and exposure for each range, so as to generate multiple images that correspond to multiple ranges; and a processing device structured to be capable of identifying the kind of an object included in each of the multiple images under a constraint that the position at which each object can exist is limited to a unique region of interest for each of the multiple images.

An object to be identified exists at a position in a limited range defined for each kind of object. For example, traffic participants such as pedestrians or automobiles exist on the ground, not in the air. That is to say, in each image, traffic participants or the like exist in a limited region in the vicinity of the ground. In a case in which multiple images are captured with the same angle of view by means of the gating camera, there is a difference in the region in the vicinity of the ground for each distance from the camera, i.e., for each image.

Accordingly, with an embodiment, a unique region of interest is determined for each image so as to limit the region to be subjected to the image processing by the classifier. This allows the amount of processing to be reduced.

Also, the object identification system may include: a pre-processing unit structured to trim an image within the region of interest for each of the multiple images; and a classifier structured to process the output of the pre-processing unit. In this case, the size of the image supplied to the classifier is reduced, thereby allowing the amount of processing to be reduced.

Also, the object identification system may include: a pre-processing unit structured to mask an image outside the region of interest for each of the multiple images; and a classifier structured to process the output of the pre-processing unit. The pre-processing unit may fill a region outside the region of interest with a single color.

Also, with another embodiment, in a downstream stage of or an internal component of the classifier, judgment of the kind of an object may reflect the position information with respect to the object.

Also, the processing device may include: a classifier structured to detect the kind and the position of an object included in each of the multiple images, and to generate multiple items of detection data that correspond to the multiple images; and a post-processing unit structured to receive the multiple items of detection data, and to judge whether or not the position of the object included in each detection data is included within a unique region of interest set in an original image.

Also, as the range becomes nearer, the size of the region of interest may be increased. Also, as the range becomes farther, the size of the region of interest may be reduced.

Also, as the range becomes farther, the height of the region of interest may be reduced. This allows the amount of processing for detecting an object in the vicinity of the ground to be reduced.

Also, as the range becomes farther, the width of the region of interest may be reduced.

IV-2. Detailed Description

Description will be made with reference to the drawings regarding a fourth aspect of the present disclosure based on a preferred embodiment.

Embodiment 4-1

Figure 21:
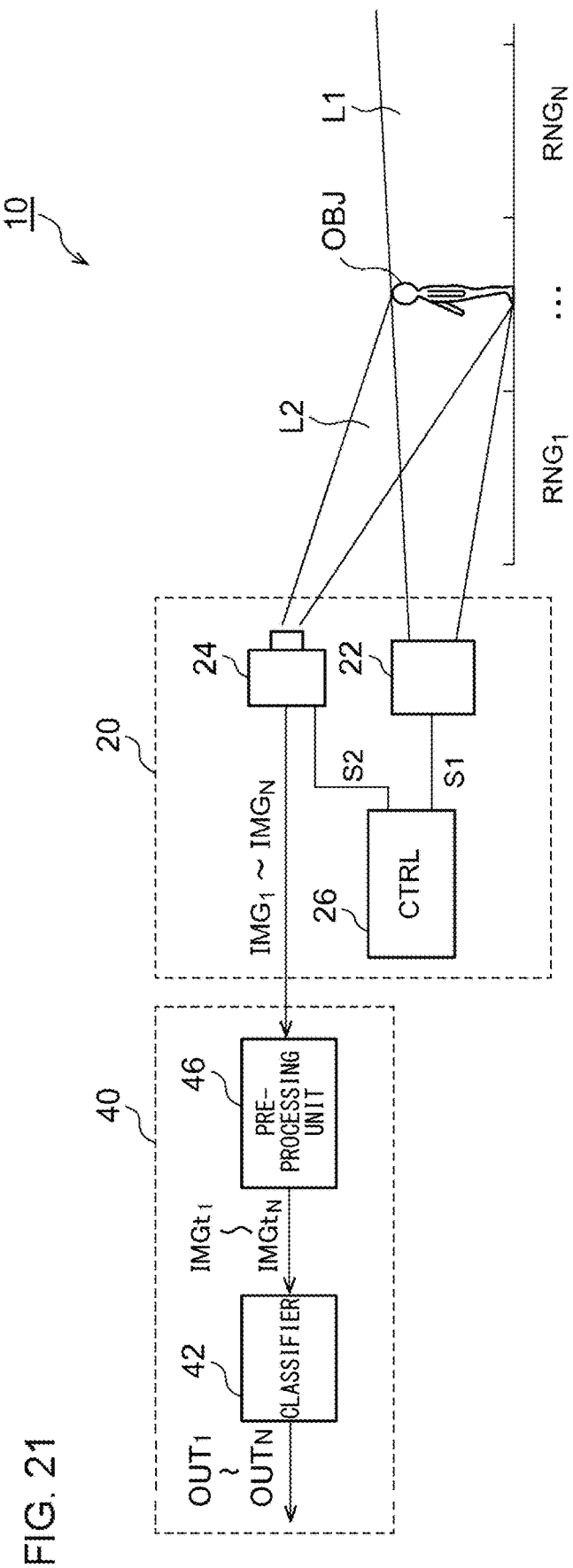
FIG. 21 is a block diagram showing an object identification system according to an embodiment 4-1.

FIG. 21 is a block diagram showing an object identification system 10 according to an embodiment 4-1. The object identification system 10 is mounted on a vehicle such as an automobile, motorcycle, or the like. The object identification system 10 judges the kind (which is also referred to as the "category" or "class") of an object OBJ that exists in the vicinity of the vehicle.

The object identification system 10 mainly includes the gating camera 20 and the processing device 40. The gating camera 20 includes a light projector 22, an image sensor 24, and a controller 26. The gating camera 20 captures images for a plurality of N (N≥2) ranges $RNG_1$ through $RNG_N$ divided in the depth direction. The ranges may be designed such that adjacent ranges overlap at their boundaries in the depth direction.

The light projector 22 irradiates probe light L1 in front of the vehicle in synchronization with a light projection timing signal S1 supplied from the controller 26. As the probe light L1, infrared light is preferably employed. However, the present invention is not restricted to such an arrangement. Also, as the probe light L1, visible light having a predetermined wavelength may be employed.

The image sensor 24 is configured to support exposure control in synchronization with an image capture timing signal S2 supplied from the controller 26, and to be capable of generating an image IMG. The image sensor 24 is sensitive to the same wavelength as that of the probe light L1. The image sensor 24 captures an image of reflected light (returned light) L2 reflected by the object OBJ.

The controller 26 changes the light projection timing signal S1 and the image capture timing signal S2 for each range RNG, so as to change the time difference between the light projection by the light projector 22 and the exposure of the image sensor 24. The gating camera 20 generates multiple images $IMG_1$ through $IMG_N$ that correspond to the multiple ranges $RNG_1$ through $RNG_N$. As the i-th image $IMG_i$, only an image of an object included in the corresponding range $RNG_i$ is acquired.

Figure 22:
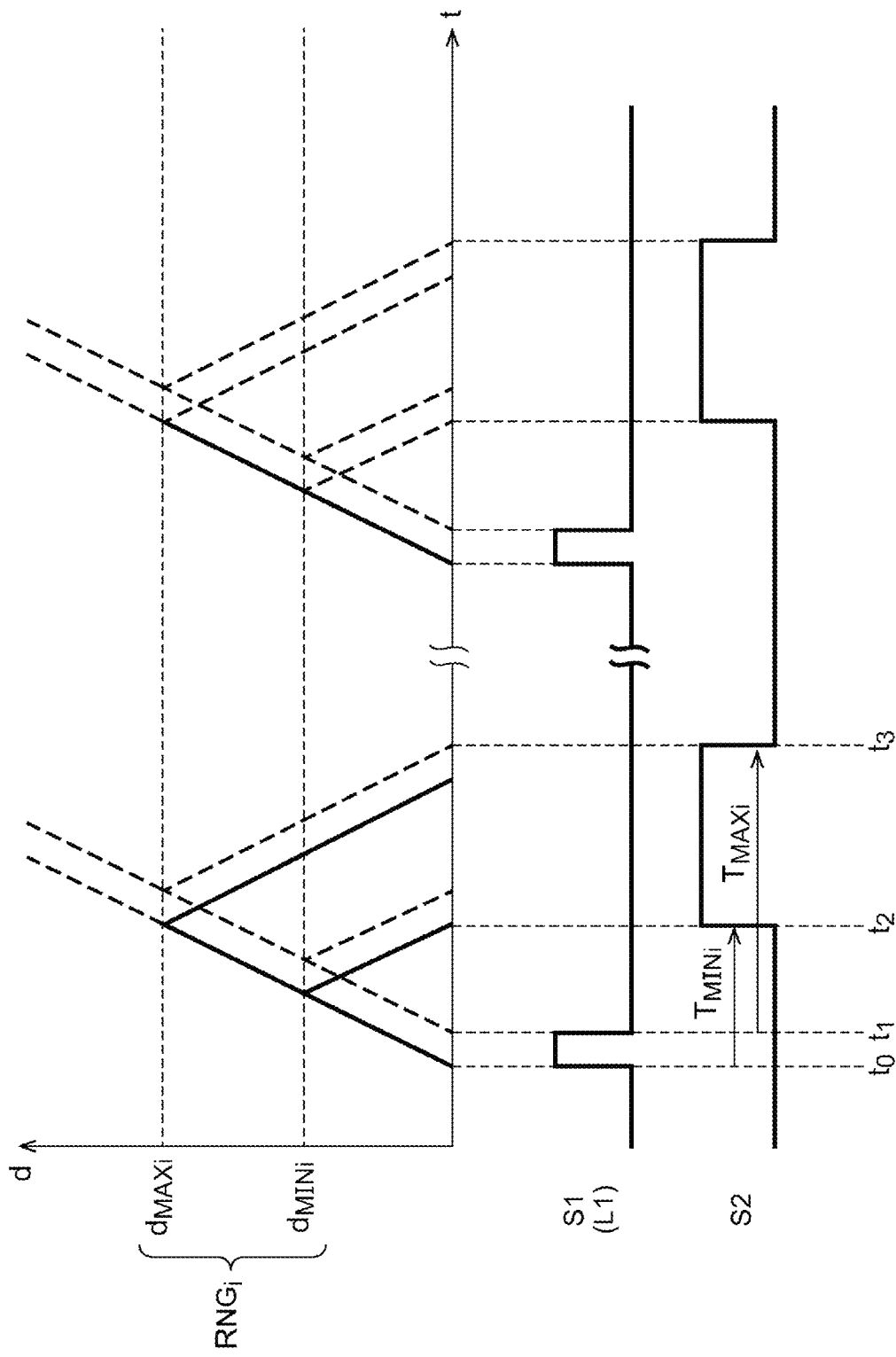
FIG. 22 is a diagram for explaining the operation of the gating camera.

FIG. 22 is a diagram for explaining the operation of the gating camera 20. FIG. 22 shows the operation when the i-th range $RNG_i$ is measured. The light projector 22 emits light during a light projection period $\tau_1$ between the time points $t_0$ and $t_1$ in synchronization with the light projection timing signal S1. In the upper diagram, a light beam diagram is shown with the horizontal axis as time and with the vertical axis as distance. The distance between the gating camera 20 and the near-distance boundary of the range $RNG_i$ is represented by $d_{MINi}$. The distance between the gating camera 20 and the far-distance boundary of the range $RNG_i$ is represented by $d_{MAXi}$.

The round-trip time $T_{MINi}$, which is a period from the departure of light from the light projector 22 at a given time point, to the arrival of the light at the distance $d_{MINi}$, up to the return of the reflected light to the image sensor 24, is represented by $T_{MINi}=2\times d_{MINi}/C$. Here, c represents the speed of light.

Similarly, the round-trip time $T_{MAXi}$, which is a period from the departure of light from the light projector 22 at a given time point, to the arrival of the light at the distance $d_{MAXi}$, up to the return of the reflected light to the image sensor 24, is represented by $T_{MAXi}=2\times d_{MAXi}/C$.

When only an image of an object OBJ included in the range $RNG_i$ is to be captured, the controller 26 generates the image capture timing signal S2 so as to start the exposure at the time point $\tau_2=t_0+T_{MINi}$, and so as to end the exposure at the time point $t_3=t_1+T_{MAXi}$. This is a single exposure operation.

When an image is captured for the i-th range $RNG_i$, the exposure may be executed multiple times. In this case, preferably, the controller 26 may repeatedly execute the above-described exposure operation multiple times with a predetermined period $\tau_2$.

FIGS. 23A and 23B are diagrams for explaining an image generated by the gating camera 20. FIG. 23A shows an example in which an object (pedestrian) $OBJ_2$ exists in the range $RNG_2$, and an object (vehicle) $OBJ_3$ exists in the range $RNG_3$. FIG. 23B shows multiple images $IMG_1$ through $IMG_3$ acquired in the situation shown in FIG. 23A. When the image $IMG_1$ is captured, the image sensor is exposed by only the reflected light from the range $RNG_1$. Accordingly, the image $IMG_1$ includes no object image.

When the image $IMG_2$ is captured, the image sensor is exposed by only the reflected light from the range $RNG_2$. Accordingly, the image $IMG_2$ includes only the object $OBJ_2$. Similarly, when the image $IMG_3$ is captured, the image sensor is exposed by only the reflected light from the range $RNG_3$. Accordingly, the image $IMG_3$ includes only the object $OBJ_3$. As described above, with the gating camera 20, this arrangement is capable of capturing object images in the form of separate images for the respective ranges.

Returning to FIG. 21, the processing device 40 is configured to identify the kind of an object based on multiple images $IMG_1$ through $IMG_N$ that correspond to the multiple range $RNG_1$ through $RNG_N$ generated by the gating camera 20. The processing device 40 is provided with a classifier 42 implemented based on a learned model generated by machine learning. The algorithm employed by the classifier 42 is not restricted in particular. Examples of the algorithms that can be employed include You Only Look Once (YOLO), Single Shot MultiBox Detector (SSD), Region-based Convolutional Neural Network (R-CNN), Spatial Pyramid Pooling (SPPnet), Faster R-CNN, Deconvolution-SSD (DSSD), Mask R-CNN, etc. Also, other algorithms that will be developed in the future may be employed.

The processing device 40 may be configured as a combination of a processor (hardware component) such as a Central Processing Unit (CPU), Micro Processing Unit (MPU), microcontroller, or the like, and a software program to be executed by the processor (hardware component). Also, the processing device 40 may be configured as a combination of multiple processors. Alternatively, the processing device 40 may be configured as a hardware component alone.

A unique region of interest (ROI) is determined for each range. As the ROI, a region where an object can exist is selected. The ROI that corresponds to the i-th (i represents 1, 2, . . . , N) image will be represented by "$ROI_i$". The classifier 42 identifies the kind of the object included in the image $IMG_i$ under a constraint that the position at which the object $OBJ$ can exits is limited to within the unique $ROI_i$ set for the image $IMG_i$.

For example, the output (which will be referred to as "detection data") OUT (i=1, 2, . . . , N) includes the position information with respect to each object included in the i-th image data $IMG_i$ and the kind (category) information thereof. The kind information may indicate the possibility (probability) of the object matching each of multiple kinds. Also, the kind information may include an identifier that indicates the kind that matches a possible object with a highest probability.

Figure 24A:
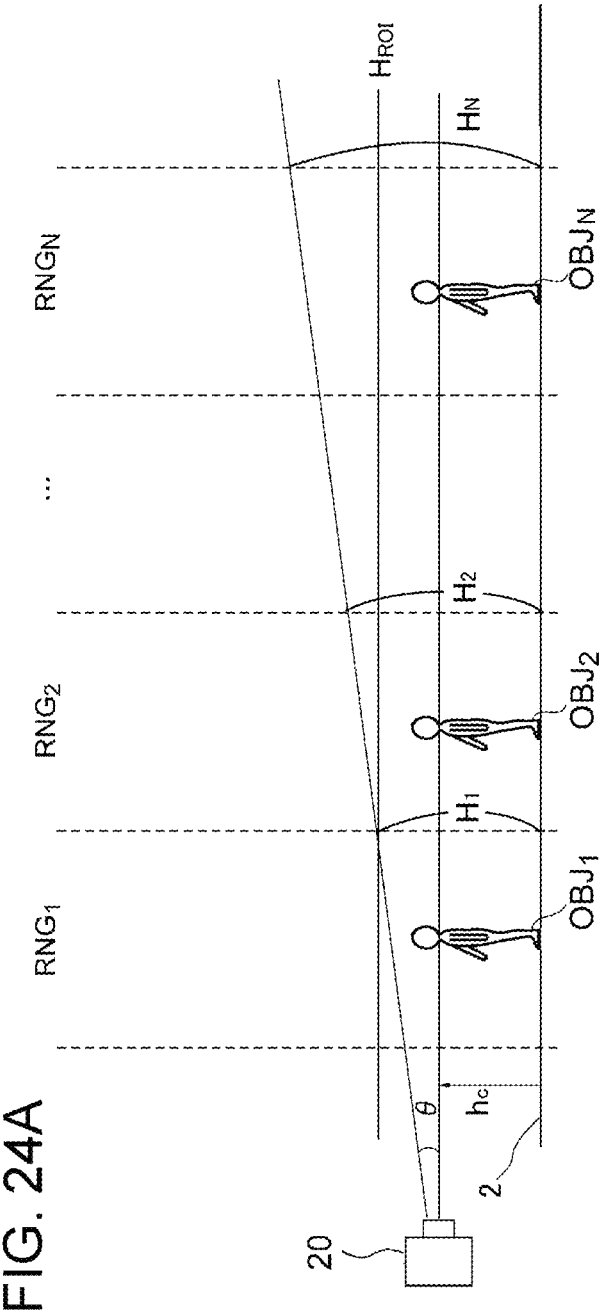
FIGS. 24A and 24B are diagrams for explaining a ROI.
Figure 24B:
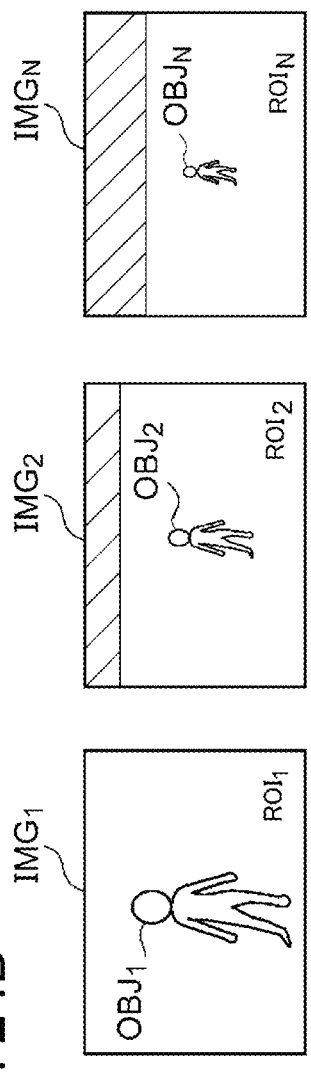

FIGS. 24A and 24B are diagrams for explaining the ROI. FIG. 24A is a diagram as viewed from the side. FIG. 24B shows images captured by the gating camera 20. As shown in FIG. 24B, description will be made assuming that the gating camera 20 has an image capture range in an angle of view of $\pm\theta$ in the upper-lower direction with the horizontal axis as the center. With the height of the ground 2 as zero, the image $IMG_i$ in the i-th range $RNG_i$ includes an image of an object positioned at a height that is lower than the height $H_i$.

On the other hand, the range where a pedestrian or a bicycle can exist is limited to a predetermined range (0 to $H_{ROI}$). In this case, it can be assumed that there is no object to be detected in a range of $H_{ROI}$ to $H_i$. Accordingly, as shown in FIG. 24B, the region that is lower than $H_{ROI}$ can be set to $ROI_i$. Conversely, the region that is higher than $H_{ROI}$ can be set to an exclusion region (indicated by the hatched region). Specifically, with respect to the i-th image $IMG_i$, the $ROI_i$ may be set to a range with a ratio of $H_{ROI}/H_i$ from the lower end. As the range becomes nearer, the ROI becomes larger. Conversely, the range becomes farther, the ROI becomes smaller.

With the ground height at which the image sensor 24 of the gating camera 20 is arranged as hc, and with the distance from the image sensor 24 to the far-distance boundary defined by the i-th range $RNG_i$ as $d_{MAXi}$, $H_i$ is represented by $H_i = hc + d_{MAXi} \times \tan\theta$.

Returning to FIG. 21, in the present embodiment, a pre-processing unit 46 is provided as an upstream stage of the classifier 42. The pre-processing unit 46 trims the image included in the ROI from each image $IMG_i$. The classifier 42 processes the trimmed images $IMGt_1$ through $IMGt_N$ each of which is an output of the pre-processing unit 46.

Figure 25A:
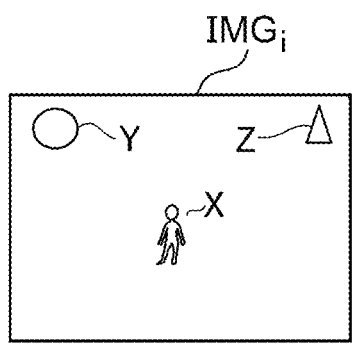
FIGS. 25A and 25B are diagrams for explaining the operation of the object identification system shown in FIG. 21.
Figure 25B:
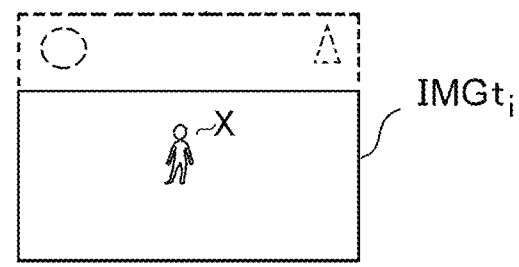

The above is the configuration of the object identification system 10. Next, description will be made regarding the operation thereof. FIGS. 25A and 25B are diagrams for explaining the operation of the object identification system 10 shown in FIG. 21. FIG. 25A shows the image $IMG_i$ acquired for the i-th range. FIG. 25B shows the trimmed image $IMGt_i$.

The image $IMG_i$ shown in FIG. 25A includes three images of figures X, Y, and Z. From among the figures, the figure X is included in the $ROI_i$. In contrast, the figures Y and Z are positioned outside the $ROI_i$. Accordingly, there is a low probability that the figure Y or Z matches either a pedestrian or an automobile.

As shown in FIG. 25B, the image $IMGt_i$ trimmed by the pre-processing unit 46 includes only the figure X. With such an arrangement in which the classifier 42 processes an image after it is subjected to trimming, the figures Y and Z are eliminated from the calculation processing targets. That is to say, only the figure X is selected as the identification processing target. This allows the calculation amount of the processing device 40 to be reduced.

In addition, with such an arrangement in which the figures Y and Z are eliminated from the processing targets, such an arrangement is capable of preventing the figures Y and Z from being erroneously identified as an automobile or a pedestrian. That is to say, this provides the object identification system 10 with an improved identification rate.

Embodiment 4-2

Description has been made in the embodiment 4-1 regarding an arrangement in which, as pre-processing before the operation of the classifier 42, the target to be processed is limited to within the ROI. However, the present invention is not restricted to such an arrangement. Description will be made in an embodiment 4-2 regarding an arrangement in which, as post-processing after the operation of the classifier 42 or internal processing by the classifier 42, a constraint is imposed that the position at which an object OBJ can exist is limited to within a unique region of interest for each of multiple images.

Figure 26:
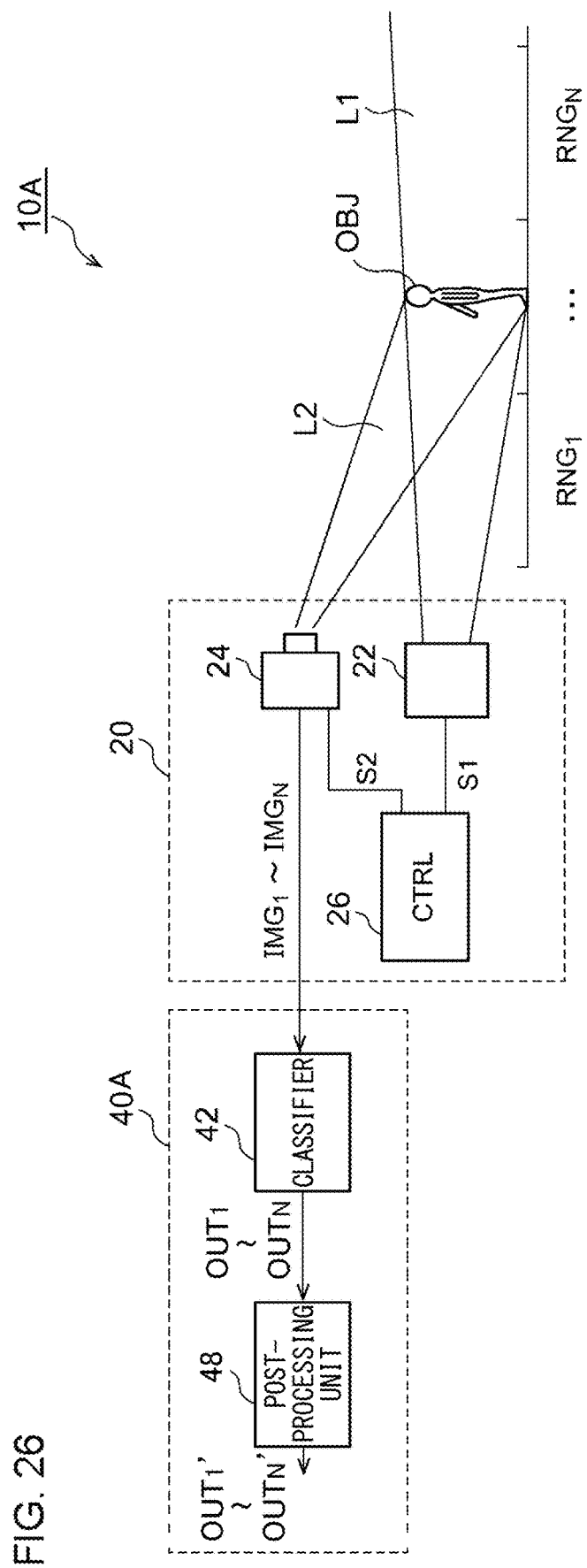
FIG. 26 is a block diagram showing an object identification system according to an embodiment 4-2.

FIG. 26 is a block diagram showing an object identification system 10A according to the embodiment 4-2. A processing device 40A includes a post-processing unit 48 configured as a downstream stage of the classifier 42. The classifier 42 generates detection data $OUT_1$ through $OUT_N$ each indicating the position and the kind of an object included in the corresponding image of the multiple images $IMG_1$ through $IMG_N$ generated by the gating camera 20. The post-processing unit 48 judges whether or not the position of an object included in each of the detection data $OUT_i$ (i=1 to N) is included in the unique $ROI_i$ defined for the original image $IMG_i$. With this, when the object position is outside the $ROI_i$, the object is eliminated.

Figure 27A:
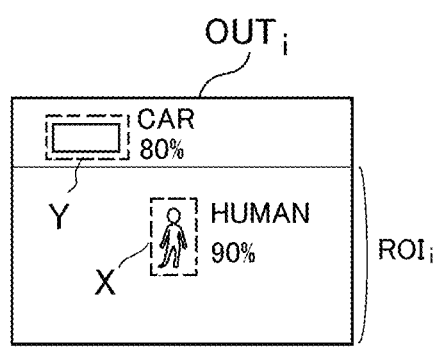
FIGS. 27A and 27B are diagrams for explaining the operation of the object identification system shown in FIG. 26.
Figure 27B:
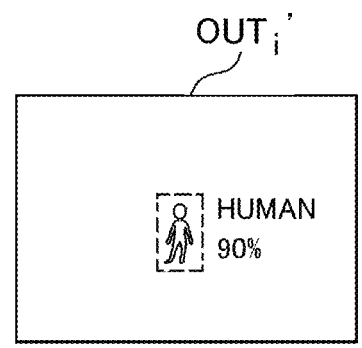

FIGS. 27A and 27B are diagrams for explaining the operation of the object identification system 10A shown in FIG. 26. FIG. 27A is a schematic diagram showing the detection data $OUT_i$ with respect to the i-th range as image data. The detection data $OUT_i$ includes two bounding boxes X and Y. Judgment is made that the object included in the bounding box X, which is one from among the two bounding boxes, has a 90% probability of matching a pedestrian (Human). On the other hand, judgment is made that the object included in the other bounding box Y has an 80% probability of matching an automobile (Car).

As described above, there is a low probability that an automobile exists in a region outside the ROI. Accordingly, it can be said that there is a low probability that an object included in the bounding box Y positioned outside the ROI matches an automobile. Accordingly, the post-processing unit 48 eliminates the object detected outside the ROI. Subsequently, the post-processing unit 48 outputs the detection data $OUT_i'$ thus subjected to the object elimination.

With the embodiment 4-2, such an arrangement is not capable of reducing a processing amount of the classifier 42. However, this provides an improved object identification rate.

Next, description will be made regarding modifications relating to the embodiments 4-1 and 4-2.

Modification 1

Figure 28A:
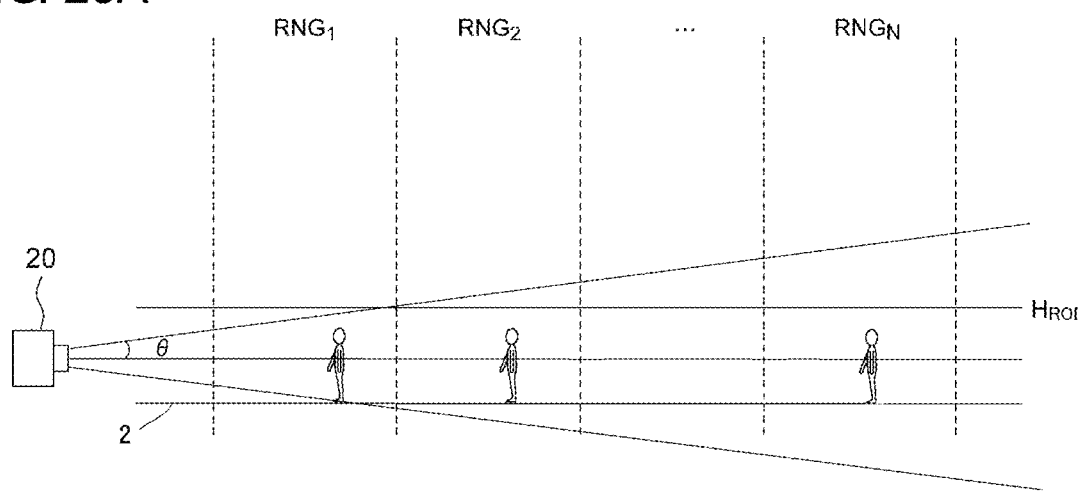
FIGS. 28A and 28B are diagrams for explaining a modification of the ROI.
Figure 28B:
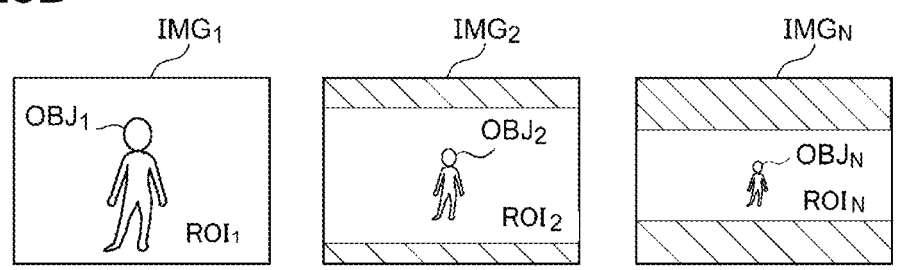

FIGS. 28A and 28B are diagrams for explaining a modification of the ROI. As shown in FIG. 28A, in some cases, each image includes an image on the lower side of the ground line. In this case, as shown in FIG. 28B, in addition to the upper-side range ($H_{ROI}$ to $H_i$) set for each image, a range on the lower side of the ground line 2 (<0) may be handled as a region where no object exists. This allows the amount of processing by the processing device 40 to be further reduced.

Modification 2

Figure 29A:
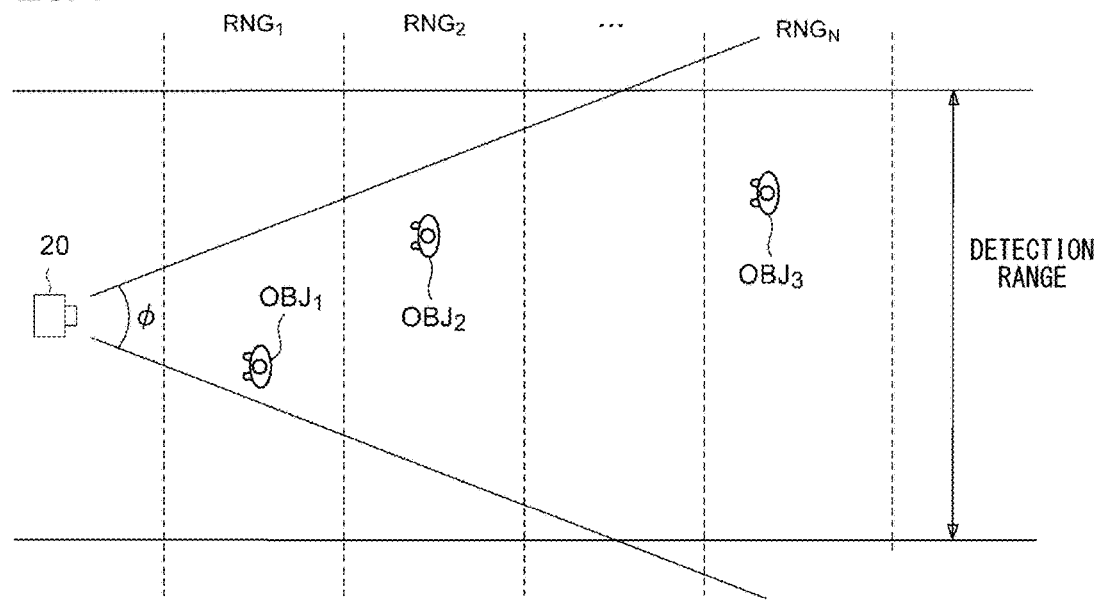
FIGS. 29A and 29B are diagrams for explaining a modification of the ROI.
Figure 29B:
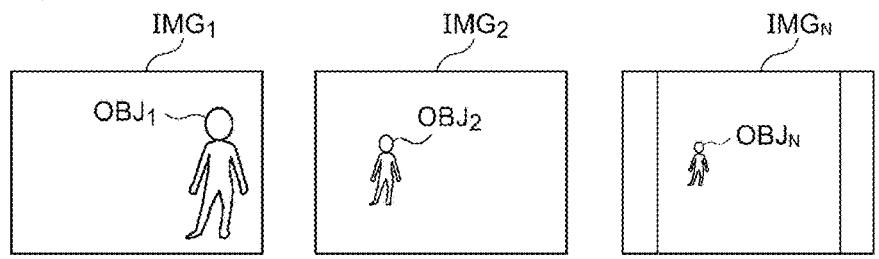

Description has been made above regarding an arrangement in which a region where no object can exist is eliminated. However, the present invention is not restricted in particular. Also, a region to be eliminated from the detection target may be set regardless of the presence or absence of an object. FIGS. 29A and 20B are diagrams for explaining a modification of the ROI. FIG. 29A is a diagram as viewed from the upper side. FIG. 28B shows an image captured by the gating camera 20.

In a case in which the object identification system is employed as an in-vehicle system, the range where an object is to be detected may also be restricted in the left-right direction. For example, it can be said that there is no need to immediately detect a pedestrian several dozen meters or more away from the user's vehicle in the horizontal direction. Accordingly, the detection range may be determined in the horizontal direction with the user's vehicle as the center. A region that corresponds to the detection range may beset as the $ROI_i$ for each image $IMG_i$. This allows the amount of processing to be further reduced.

It is needless to say that a combination of the trimming in the upper-lower direction and the trimming in the left-right direction may be employed.

Modification 3

Figure 30A:
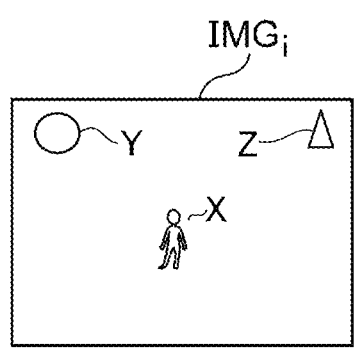
FIGS. 30A and 30B are diagrams for explaining the operation of an object identification system according to a modification 3.
Figure 30B:
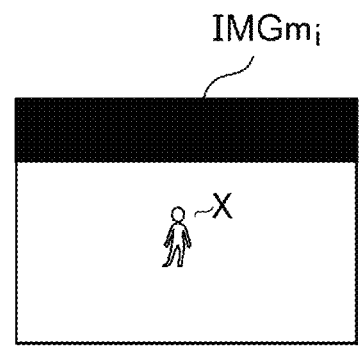

In the embodiment 4-1, the processing by the pre-processing unit 46 is not restricted to such an arrangement described above. The pre-processing unit 46 may mask an image outside the ROI for each image $IMG_i$. For example, the pre-processing unit 46 may fill a region outside the ROI with a single color (e.g., black or white). The classifier 42 sets the masked image $IMGm_i$ to the processing target. FIGS. 30A and 30B are diagrams for explaining the operation of the object identification system 10 according to a modification 3.

The image $IMG_i$ shown in FIG. 30A includes three figures X, Y, and Z. From among the three figures, the figure X is included in the ROI. On the other hand, the figures Y and Z are positioned outside the ROI. Accordingly, there is a low probability that the figure Y or Z matches a pedestrian or an automobile.

As shown in FIG. 30B, the pre-processing unit 46 masks the region outside the ROI, thereby eliminating the figures Y and Z from the image $IMGm_i$ thus subjected to the masking. Subsequently, the classifier 42 processes the post-masking image $IMGm_i$. Accordingly, the figures Y and Z are eliminated from the processing targets. That is to say, only the object X is selected as the identification processing target. This allows a processing amount of the processing device 40 to be reduced.

Modification 4

Description has been made in the embodiment regarding an arrangement in which images acquired in different ranges are processed by the same classifier 42. However, the present invention is not restricted to such an arrangement. Also, a different classifier may be used for each range.

Usage

Figure 31:
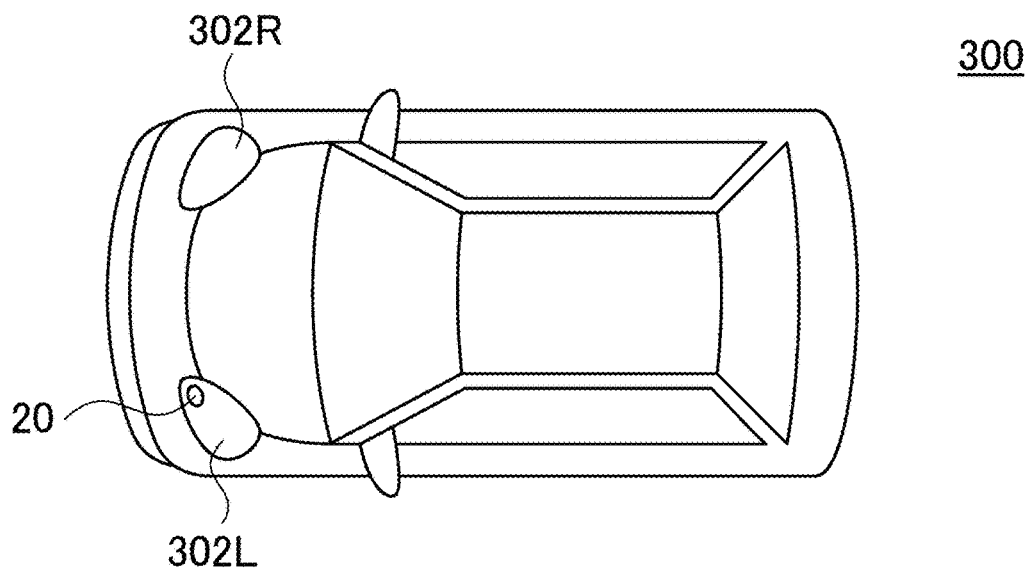
FIG. 31 is a block diagram showing an automobile including the object identification system.

FIG. 31 is a block diagram showing an automobile provided with the object identification system 10. An automobile 300 is provided with headlamps 302L and 302R. The object identification system 10 is built into at least one from among the headlamps 302L and 302R. Each headlamp 302 is positioned at a frontmost end of the vehicle body, which is most advantageous as a position where the gating camera 20 is to be installed for detecting an object in the vicinity.

Figure 32:
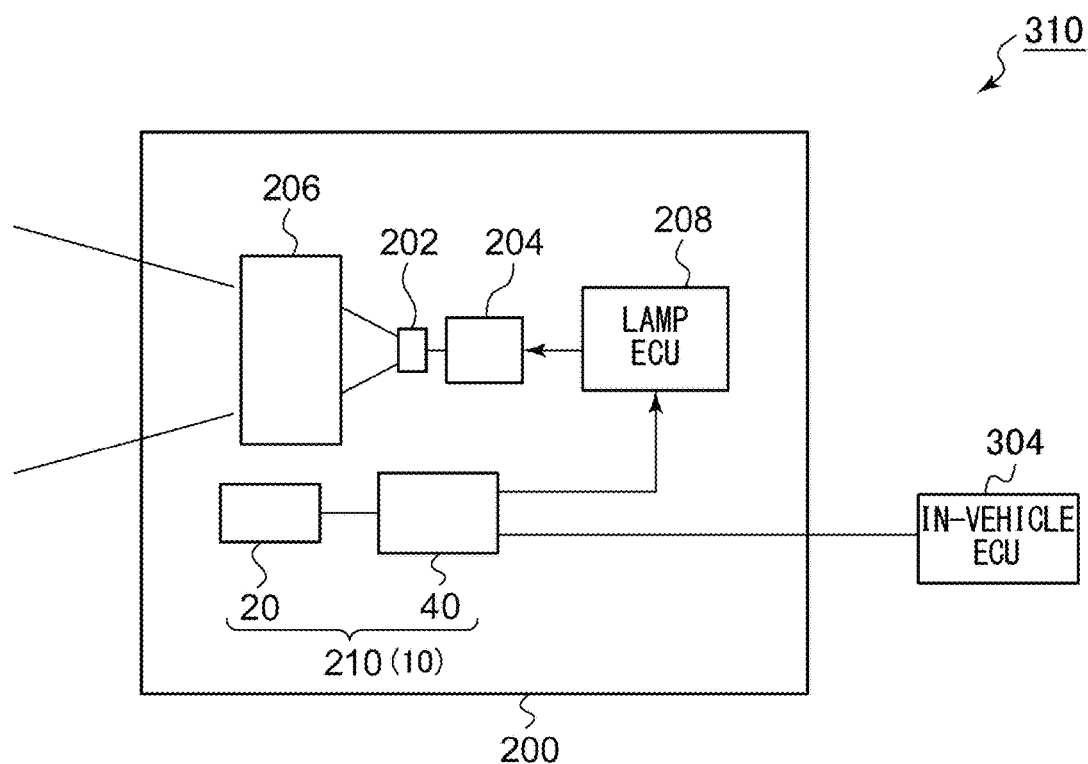
FIG. 32 is a block diagram showing an automotive lamp including the object identification system.

FIG. 32 is a block diagram showing an automotive lamp 200 provided with an object detection system 210. The automotive lamp 200 forms a lamp system 310 together with an in-vehicle ECU 304. The automotive lamp 200 includes a light source 202, a lighting circuit 204, and an optical system 206. Furthermore, the automotive lamp 200 includes the object detection system 210. The object detection system 210 corresponds to the object identification system 10. The object detection system 210 includes the gating camera 20 and the processing device 40.

Also, the information with respect to the object OBJ detected by the processing device 40 may be used to support the light distribution control operation of the automotive lamp 200. Specifically, a lamp ECU 208 generates a suitable light distribution pattern based on the information with respect to the kind of the object OBJ and the position thereof generated by the processing device 40. The lighting circuit 204 and the optical system 206 operate so as to provide the light distribution pattern generated by the lamp ECU 208.

Also, the information with respect to the object OBJ detected by the processing device 40 may be transmitted to the in-vehicle ECU 304. The in-vehicle ECU may support autonomous driving based on the information thus transmitted.

V Fifth Aspect of the Present Disclosure

V-1. Overview

An embodiment relating to the fifth aspect of the present disclosure relates to an object identification system. The object identification system includes: a gating camera structured to divide a field of view in the depth direction into multiple ranges, and to capture an image while changing the time difference between light projection and exposure for each range, so as to generate multiple images that correspond to the multiple ranges; and a processing device structured to be capable of identifying the kind of an object image included in each of the multiple images based on an allowable range determined for each range with respect to the size of the object image included in the corresponding image.

The size of an object image included in an image changes according to the distance to the object. In a case of employing a gating camera as an image acquisition device, the distance to an object included in a single image can be generated based on the information with respect to the depth direction of the corresponding range. That is to say, when an image of a given object positioned in a given range is captured, the object image included in the image has the size that is limited to a particular range. Accordingly, by determining the limited range to be the allowable range, this provides an improved object identification rate or allows the amount of processing to be reduced.

Also, the processing device may include: a classifier structured to detect the kind and the size of an object image included in each of the multiple images, and to generate multiple items of detection data that correspond to the multiple images; and a post-processing unit structured to receive the multiple items of detection data, and to judge whether or not the size of the object image included in each item of detection data is included within the allowable range.

Also, the processing device may include: a pre-processing unit structured to divide each of the multiple images into sub-images defined for each included object image thereof; and a classifier structured to judge the kind of an object image included in a sub-image when the sub-image thus divided by the pre-processing unit has the size included within the allowable range.

Also, the allowable range may be defined in the vertical direction. Also, the allowable range may be defined in the horizontal direction.

Also, the allowable range may be defined as a unique range for each kind of object. This provides a further improved object identification rate.

As the range becomes nearer, the allowable range may be determined to have a larger size. Conversely, as the range becomes farther, the allowable range may be determined to have a smaller size. Also, as the range becomes farther, the allowable range may be determined to have a smaller height. Also, as the range becomes farther, the allowable range may be determined to have a smaller width.

V-2. Detailed Description

Description will be made with reference to the drawings regarding a fifth aspect of the present disclosure based on a preferred embodiment.

Embodiment 5-1

Figure 33:
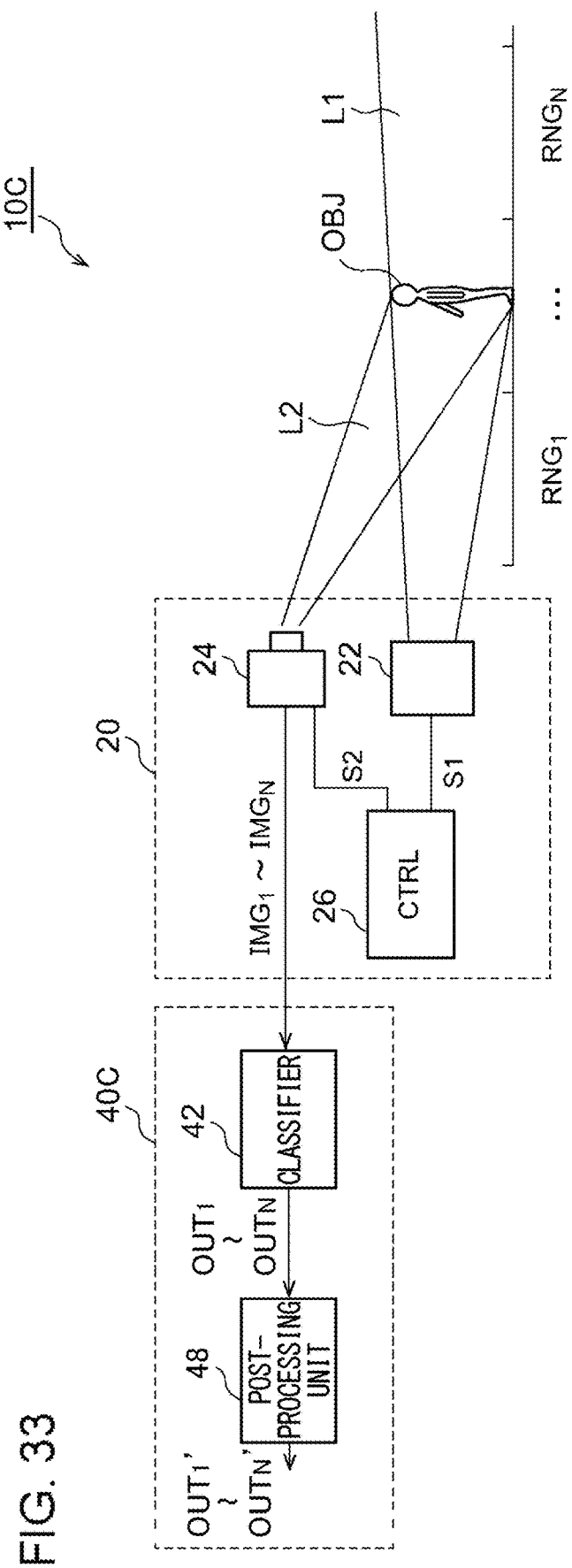
FIG. 33 is a block diagram sowing an object identification system according to an embodiment 5-1.

FIG. 33 is a block diagram showing an object identification system 10C according to an embodiment 5-1. The object identification system 10C is mounted on a vehicle such as an automobile, motorcycle, or the like. The object identification system 10C judges the kind (which is also referred to as the "category" or "class") of an object OBJ that exists in the vicinity of the vehicle.

The object identification system 10C mainly includes the gating camera 20 and the processing device 40C. The gating camera 20 includes a light projector 22, an image sensor 24, and a controller 26. The gating camera 20 captures images for a plurality of N (N≥2) ranges $RNG_1$ through $RNG_N$ divided in the depth direction. The ranges may be designed such that adjacent ranges overlap at their boundaries in the depth direction.

The light projector 22 irradiates probe light L1 in front of the vehicle in synchronization with a light projection timing signal S1 supplied from the controller 26. As the probe light L1, infrared light is preferably employed. However, the present disclosure is not restricted to such an arrangement. Also, as the probe light L1, visible light having a predetermined wavelength may be employed.

The image sensor 24 is configured to support exposure control in synchronization with an image capture timing signal S2 supplied from the controller 26, and to be capable of generating an image IMG. The image sensor 24 is sensitive to the same wavelength as that of the probe light L1. The image sensor 24 captures an image of reflected light (returned light) L2 reflected by the object OBJ.

The controller 26 changes the light projection timing signal S1 and the image capture timing signal S2 for each range RNG, so as to change the time difference between the light projection by the light projector 22 and the exposure of the image sensor 24. The gating camera 20 generates multiple images $IMG_1$ through $IMG_N$ that correspond to the multiple ranges $RNG_1$ through $RNG_N$. As the i-th image $IMG_i$, only an image of an object included in the corresponding range $RNG_i$ is acquired.

Figure 34:
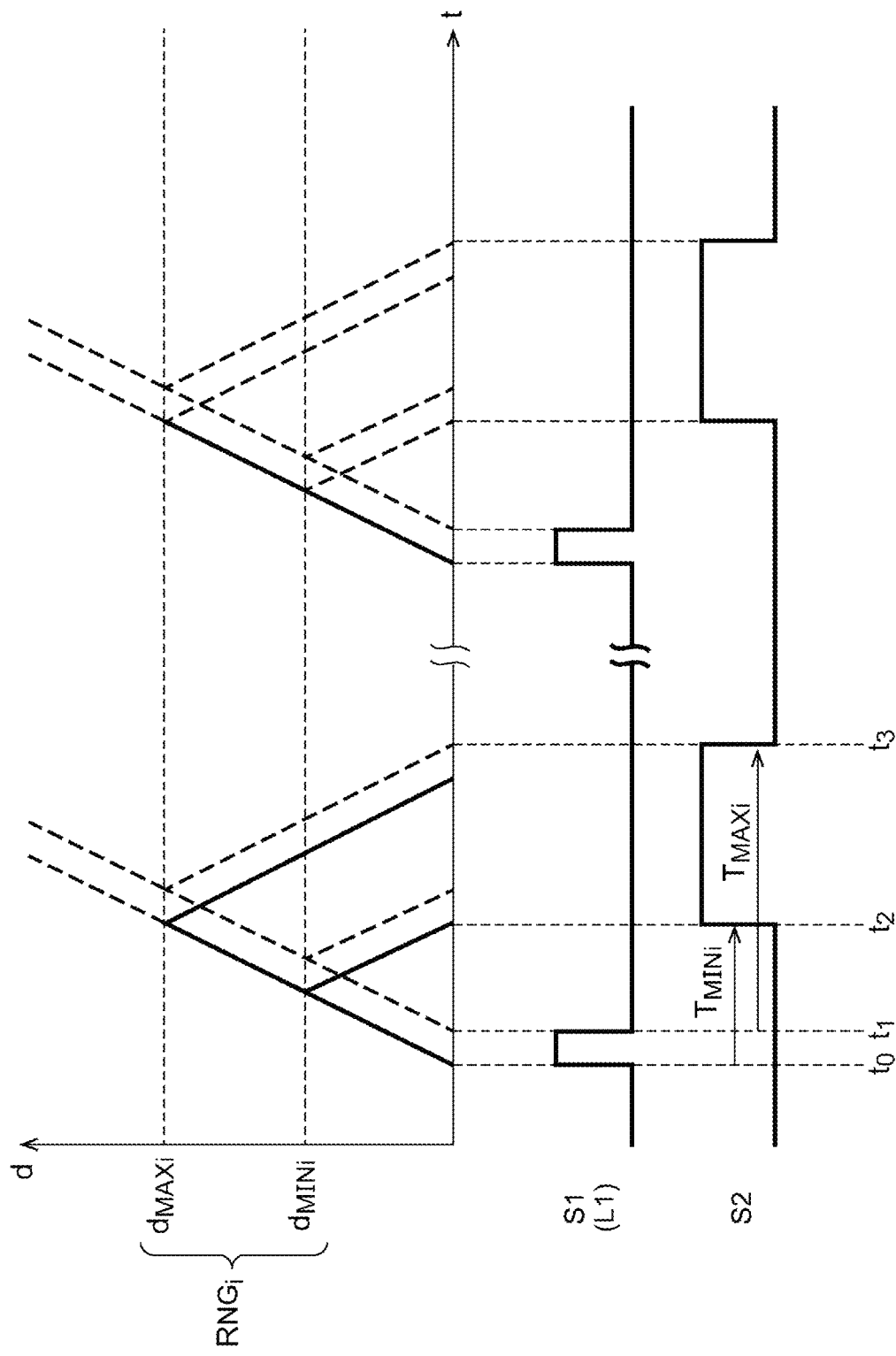
FIG. 34 is a diagram for explaining the operation of the gating camera.

FIG. 34 is a diagram for explaining the operation of the gating camera 20. FIG. 34 shows the operation when the i-th range $RNG_i$ is measured. The light projector 22 emits light during a light projection period $\tau_1$ between the time points $t_0$ and $t_1$ in synchronization with the light projection timing signal S1. In the upper diagram, a light beam diagram is shown with the horizontal axis as time and with the vertical axis as distance. The distance between the gating camera 20 and the near-distance boundary of the range $RNG_i$ is represented by $d_{MINi}$. The distance between the gating camera 20 and the far-distance boundary of the range $RNG_i$ is represented by $d_{MAXi}$.

The round-trip time $T_{MINi}$, which is a period from the departure of light from the light projector 22 at a given time point, to the arrival of the light at the distance $d_{MINi}$, up to the return of the reflected light to the image sensor 24, is represented by $T_{MINi}=2\times d_{MINi}/C$. Here, c represents the speed of light.

Similarly, the round-trip time $T_{MAXi}$, which is a period from the departure of light from the light projector 22 at a given time point, to the arrival of the light at the distance $d_{MAXi}$, up to the return of the reflected light to the image sensor 24, is represented by $T_{MAXi}=2\times d_{MAXi}/C$.

When only an image of an object OBJ included in the range $RNG_i$ is to be captured, the controller 26 generates the image capture timing signal S2 so as to start the exposure at the time point $t_2=t_0+T_{MINi}$, and so as to end the exposure at the time point $t_3=t_1+T_{MAXi}$. This is a single exposure operation.

When an image is captured for the i-th range $RNG_i$, the exposure may be executed multiple times. In this case, preferably, the controller 26 may repeatedly execute the above-described exposure operation multiple times with a predetermined period $\tau_2$.

FIGS. 35A and 35B are diagrams for explaining an image generated by the gating camera 20. FIG. 35A shows an example in which an object (pedestrian) $OBJ_2$ exists in the range $RNG_2$, and an object (vehicle) $OBJ_3$ exists in the range $RNG_3$. FIG. 35B shows multiple images $IMG_1$ through $IMG_3$ acquired in the situation shown in FIG. 35A. When the image $IMG_1$ is captured, the image sensor is exposed by only the reflected light from the range $RNG_1$. Accordingly, the image $IMG_1$ includes no object image.

When the image $IMG_2$ is captured, the image sensor is exposed by only the reflected light from the range $RNG_2$. Accordingly, the image $IMG_2$ includes only the object image $OBJ_2$. Similarly, when the image $IMG_3$ is captured, the image sensor is exposed by only the reflected light from the range $RNG_3$. Accordingly, the image $IMG_3$ includes only the object image $OBJ_3$. As described above, with the gating camera 20, this arrangement is capable of capturing object images in the form of separate images for the respective ranges.

Returning to FIG. 33, the processing device 40C is configured to identify the kind of an object based on multiple images $IMG_1$ through $IMG_N$ that correspond to the multiple range $RNG_1$ through $RNG_N$ generated by the gating camera 20. The processing device 40C is provided with a classifier 42 implemented based on a learned model generated by machine learning. The algorithm employed by the classifier 42 is not restricted in particular. Examples of the algorithms that can be employed include You Only Look Once (YOLO), Single Shot MultiBox Detector (SSD), Region-based Convolutional Neural Network (R-CNN), Spatial Pyramid Pooling (SPPnet), Faster R-CNN, Deconvolution-SSD (DSSD), Mask R-CNN, etc. Also, other algorithms that will be developed in the future may be employed.

The processing device 40C may be configured as a combination of a processor (hardware component) such as a Central Processing Unit (CPU), Micro Processing Unit (MPU), microcontroller, or the like, and a software program to be executed by the processor (hardware component). Also, the processing device 40 may be configured as a combination of multiple processors. Alternatively, the processing device 40C may be configured as a hardware component alone.

The range (which will be referred to as an "allowable range") of the size of an object image included in the corresponding image is determined for each of the multiple ranges. The classifier 42 identifies the kind of the object image included in each of the multiple images IMG under the assumption (constraint) that the size of the object image to be detected is within the allowable range.

For example, the output (which will be referred to as "detection data") $OUT_i$ (i=1, 2, . . . , N) of the classifier 42 includes the size information with respect to each object image included in the i-th image data $IMG_i$ and the information with respect to the kind (category) thereof. In a case in which the detection data OUT includes the information with respect to the bounding box for each object, the height and the width of the bounding box may be employed as the size information with respect to the object. The kind information may indicate the possibility (matching probability) of the object matching each of multiple kinds. Also, the kind information may include an identifier that indicates the kind that matches a possible object with the highest matching probability.

Figure 36A:
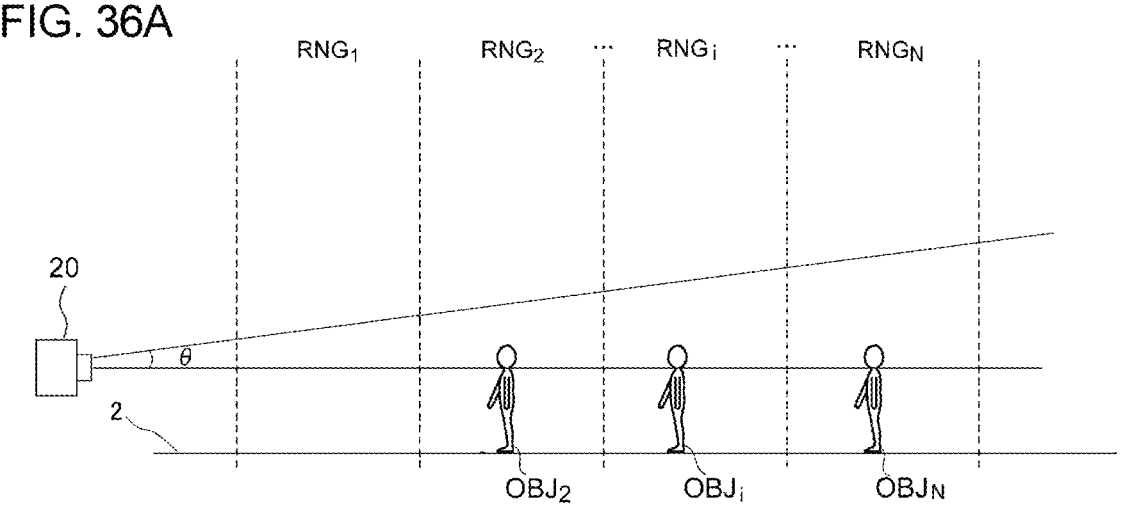
FIGS. 36A and 36B are diagrams for explaining images each captured in the corresponding range.
Figure 36B:
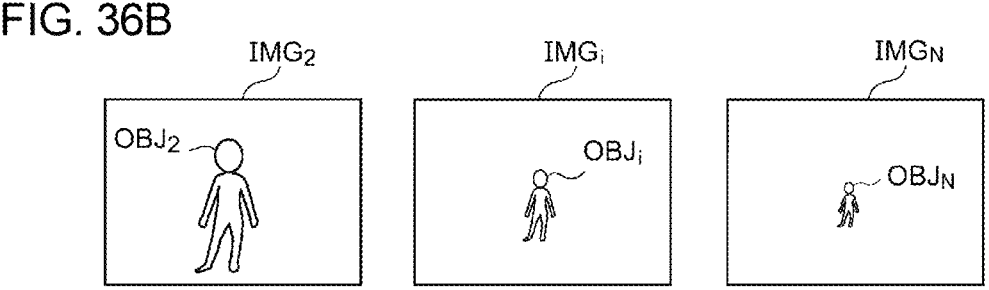

FIGS. 36A and 36B are diagrams for explaining images captured for each range. FIG. 36A is a diagram as viewed from the side. FIG. 36B shows images captured by the gating camera 20. As shown in FIG. 36A, description will be made assuming that the gating camera 20 has an image capture range in an angle of view of #0 in the upper-lower direction with the horizontal axis as the center. As shown in FIG. 36B, as the range becomes farther, the size of an object image included in each image becomes smaller.

Figure 37:
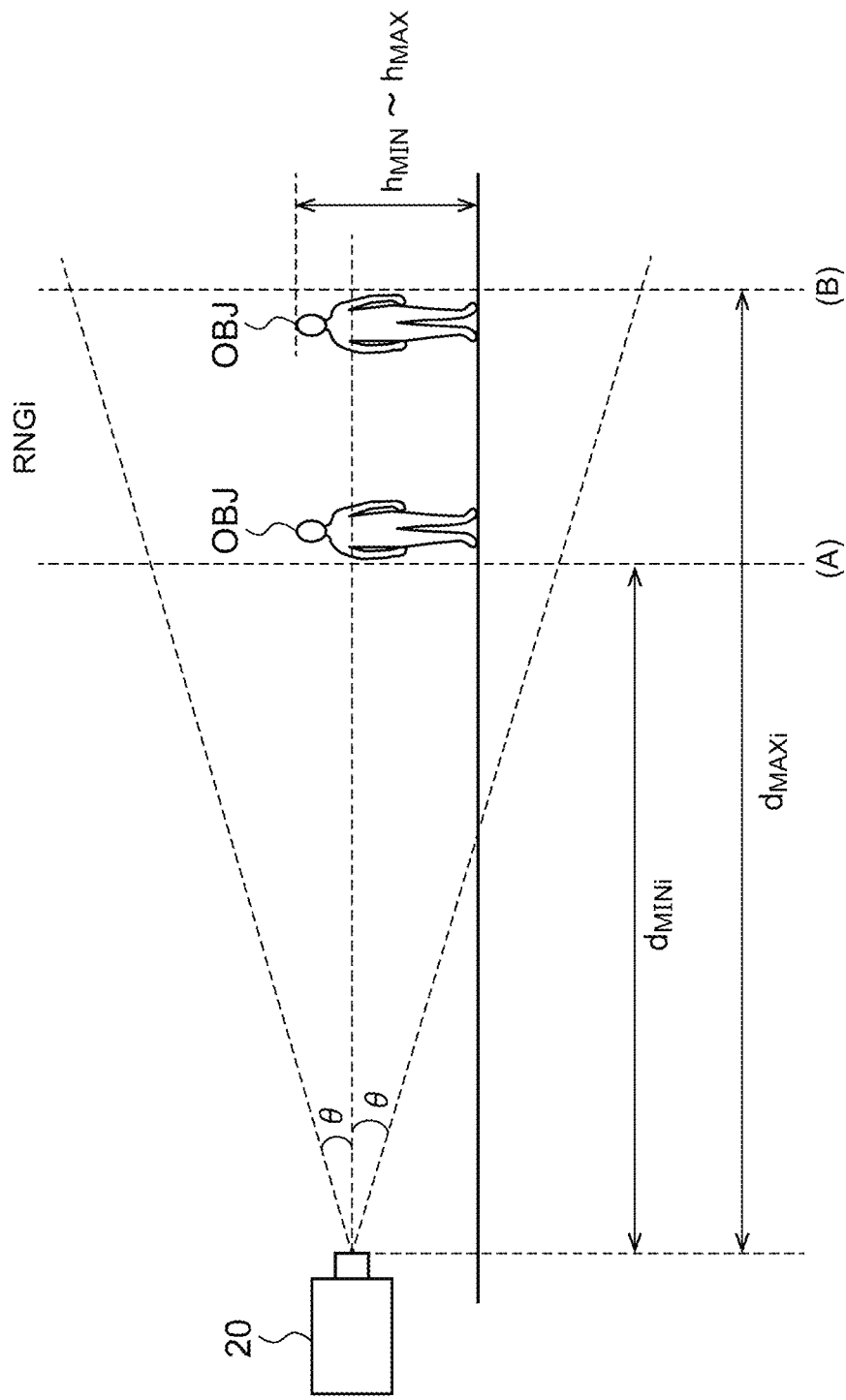
FIG. 37 is a diagram for explaining an allowable range of the size.

FIG. 37 is a diagram for explaining the allowable range. Here, description will be made regarding an arrangement in which the allowable range is determined in the vertical direction. Description will be made directing attention to the i-th range $RNG_i$. When the object OBJ is positioned at the near-distance boundary (A), the object image is captured with a largest size. When the object OBJ is positioned at the far-distance boundary (B), the object image is captured with a smallest size.

Description will be made with the minimum value of the height of the object OBJ as $h_{MIN}$, and with the maximum value thereof as $h_{MAX}$. Let us consider a case in which the object OBJ having a height that is equal to the maximum value $h_{MAX}$ is positioned at the position (A). With the number of pixels of the image $IMG_i$ in the vertical direction as Y, the number of pixels y of the object in the image in the vertical direction is represented by $y_{MAXi}=Y\times h_{MAX}/(d_{MINi}\times \tan\theta\times 2)$.

The value $y_{MAXi}$ represents the maximum value of the allowable range in the range $RNG_i$.

On the other hand, let us consider a case in which the object OBJ having a height that is equal to the maximum value $h_{MIN}$ is positioned at the position (B). In this case, the number of pixels $y_{MINi}$ of the object in the image in the vertical direction is represented by $y_{MINi}=Y\times h_{MIN}/(d_{MINi}\times \tan\theta\times 2)$.

The value $y_{MINi}$ represents the minimum value of the allowable range in the range $RNG_i$.

That is to say, the allowable range (the number of pixel values in the vertical direction) of $y_{MINi}$ to $y_{MAXi}$ is determined. It should be noted that the determining method for determining the allowable range is not restricted to such an arrangement described above.

Returning to FIG. 33, when the size of the object image thus detected is outside the allowable range, the processing device 40C may eliminate the object image from the processing target. Alternatively, the kind (class/category) matching probability may reflect the relation between the size of the object image thus detected and the allowable range.

In the present embodiment, the post-processing device 48 is provided as a downstream stage of the classifier 42. The classifier 42 detects the kind and the size of the object image included in each of the multiple images $IMG_1$ through $IMG_N$, so as to generate multiple items of detection data $OUT_1$ through $OUT_N$ that correspond to the multiple images.

The post-processing unit 48 receives the output data $OUT_1$ through $OUT_N$ generated by the classifying unit 42. The post-processing unit 48 judges whether or not the size of the object image included in each detection data $OUT_i$ (i=1 to N) is included within the allowable range determined for the range $RNG_i$. Subsequently, the post-processing unit 48 corrects the detection data $OUT_i$ based on the judgment result.

For example, when the size of a given object image size is outside the allowable range, the post-processing unit 48 may eliminate the information with respect to the object from the detection data $OUT_i'$. Also, when the size of a given object image size is outside the allowable range, the post-processing unit 48 may reduce the probability that the object thus detected matches a predetermined kind (category, class).

Figure 38A:
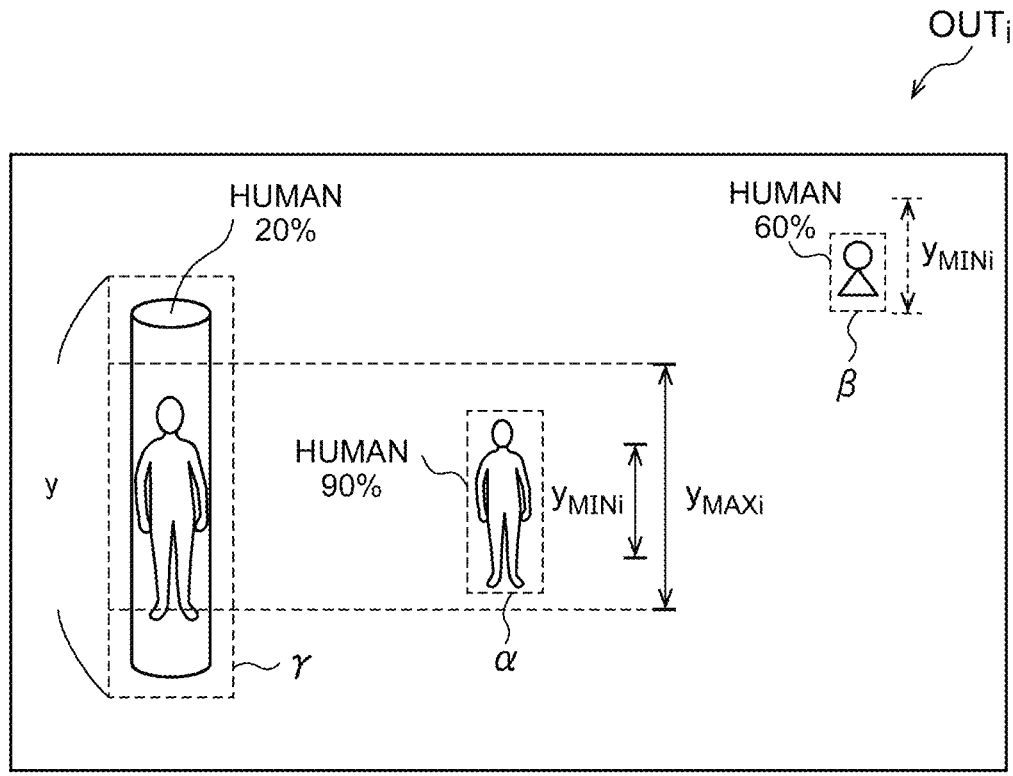
FIGS. 38A and 38B are diagrams for explaining the operation of the object identification system shown in FIG. 33.
Figure 38B:
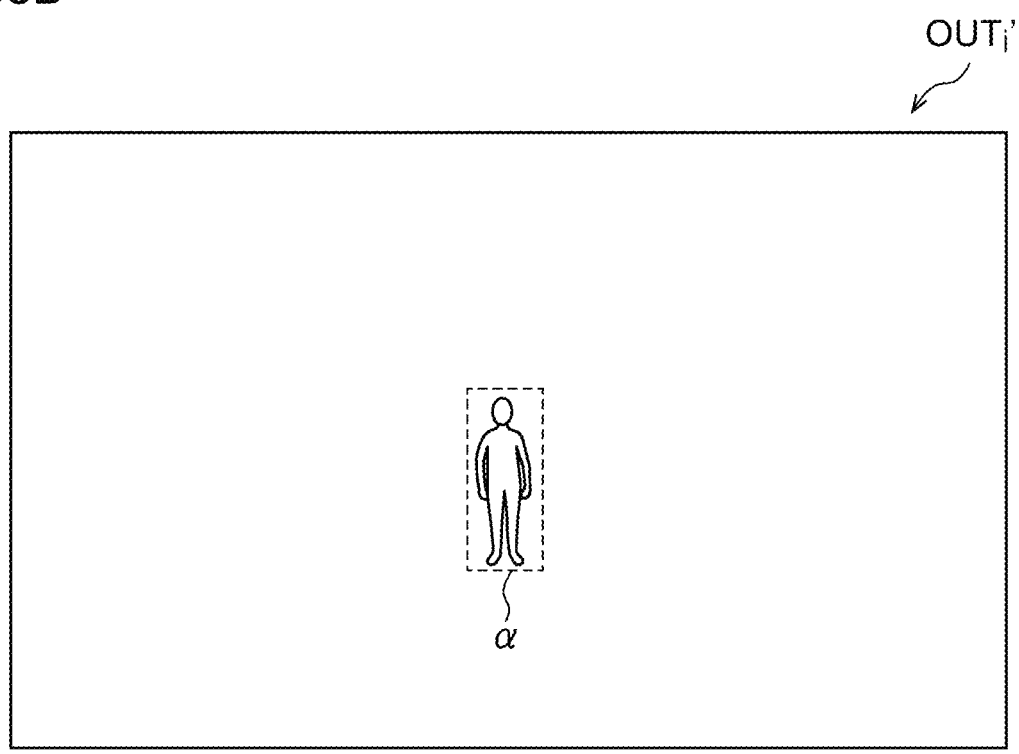

The above is the configuration of the object identification system 10C. Next, description will be made regarding the operation thereof. FIGS. 38A and 38B are diagrams for explaining the operation of the object identification system 10C shown in FIG. 33. FIG. 38A is a schematic diagram showing the detection data $OUT_i$ with respect to the i-th range $RNG_i$ as image data. FIG. 38B is a schematic diagram showing the corrected detection data $OUT_i'$ as image data.

As shown in FIG. 38A, the detection data $OUT_i$ before the correction includes three bounding boxes α, β, and γ. Judgement is made that the object included in the bounding box α has a 90% probability of matching a pedestrian (Human). Judgement is made that the object included in the bounding box β has a 60% probability of matching a pedestrian (Human). The bounding box γ includes an object with a poster depicting an image of a human arranged on a utility pole or a building. Judgement is made that this object has a 20% probability of matching a pedestrian (Human).

The height h of the object included in the bounding box α satisfies the relation $y_{MINi} < h_x < y_{MAXi}$. Accordingly, it can be said that the object included in the bounding box α has a high probability of matching the detection target (a Human). Accordingly, the corrected detection data $OUT_i$ includes the object included in the bounding box α.

With respect to the height h of the object included in the bounding box β, the relation $h < y_{MINi}$ holds true. This means that the height h is outside the allowable range. Accordingly, it can be said that the object has a low probability of matching the detection target. With respect to the height h of the object included in the bounding box γ, the relation $y_{MAXi} < h$ holds true. This means that the height h is outside the allowable range. Accordingly, it can be said based on the corrected detection data $OUT_i'$ that each of the objects included in the bounding boxes β and γ have a low probability of matching the corresponding detection target. Accordingly, the bounding boxes β and γ may be eliminated from the corrected detection data $OUT_i'$.

The above is the operation of the object identification system 10C. With the object identification system 10C, the object identification rate can be improved.

Embodiment 5-2

Figure 39:
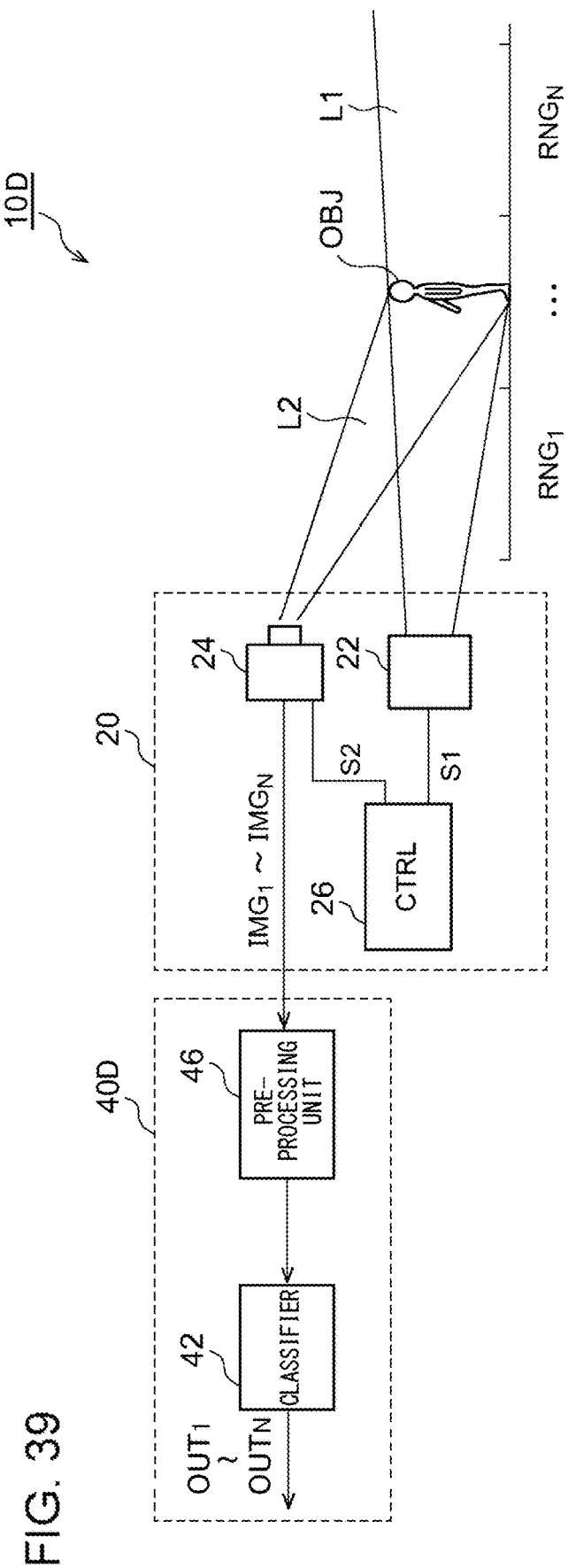
FIG. 39 is a block diagram showing an object identification system according to an embodiment 5-2.

FIG. 39 is a block diagram showing an object identification system 10D according to an embodiment 5-2. A processing device 40D includes the classifier 42 and the pre-processing unit 46 provided as an upstream stage thereof.

The pre-processing unit 46 divides each of the multiple images $IMG_1$ through $IMG_N$ into sub-images defined for each included object image.

As in the embodiment 5-1, the allowable range of the size of the object image included in the corresponding image is determined for each of the multiple ranges $RNG_1$ through $RNG_N$.

The classifier 42 is configured to be capable of judging the kind of the included object image for each sub-image SUB. When the size of the sub-image SUB divided by the pre-processing unit 46 is included within the allowable range, the classifier 42 judges the kind of the object image included in the sub-image SUB.

Figure 40A:
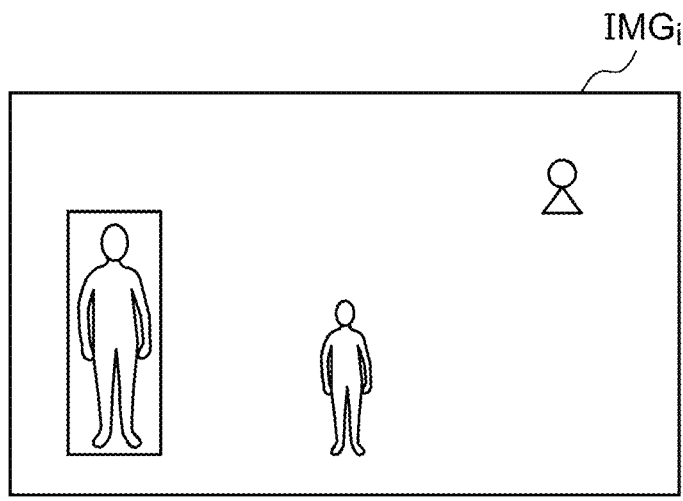
FIGS. 40A and 40B are diagrams for explaining the operation of the object identification system shown in FIG. 39.
Figure 40B:
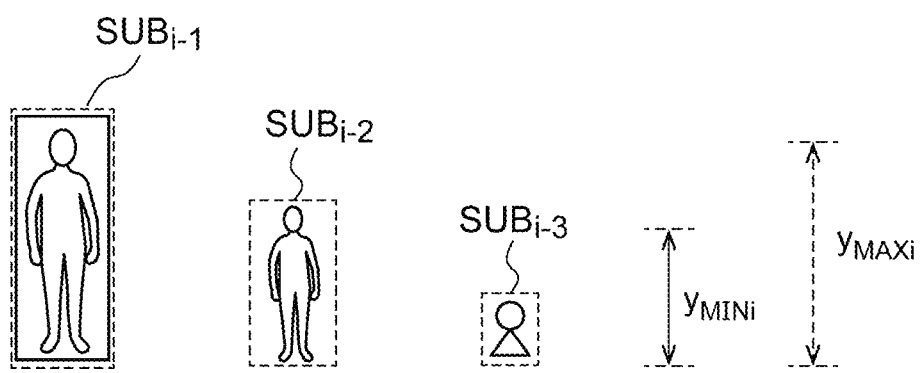

FIGS. 40A and 40B are diagrams for explaining the operation of the object identification system 10D shown in FIG. 39. FIG. 40A shows an image $IMG_i$ acquired relating to the i-th range $RNG_i$. FIG. 40B shows multiple sub-images $SUB_{i-1}$ through $SUB_{i-3}$ selected and extracted from the image $IMG_1$. In this example, the original image $IMG_i$ includes three objects.

The height (the number of pixels) of the sub-image $SUB_{i-1}$ is larger than the maximum value $y_{Maxi}$ of the allowable range. Conversely, the height (the number of pixels) of the sub-image $SUB_{i-3}$ is smaller than the minimum value $y_{MINi}$ of the allowable range. Accordingly, the sub-images $SUB_{i-1}$ and $SUB_{i-3}$ are eliminated before the classifier 42 executes the object identification processing. In contrast, the height (the number of pixels) of the sub-image $SUB_{i-2}$ is included within the allowable range. Accordingly, the sub-image $SUB_{i-2}$ is set as the target to be subjected to the identification processing by the classifier 42.

The above is the operation of the object identification system 10D. The sub-images to be subjected to the identification processing by the classifier 42 are selected by the object identification system 10D based on the size. This allows an amount of processing by the processing deice 40D to be reduced.

In addition, with such an arrangement in which the sub-images $SUB_{i-1}$ and $SUB_{i-3}$ are eliminated from the processing targets, such an arrangement is able to prevent the sub-images $SUB_{i-1}$ and $SUB_{i-3}$ from being erroneously identified as a pedestrian. That is to say, such an arrangement provides the object identification system 10D with an improved identification rate.

Description has been made above regarding the present disclosure with reference to the embodiments. The above-described embodiments have been described for exemplary purposes only, and are by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

Modification 1

The allowable range may also be set in the horizontal direction. Description will be made assuming that the image capture range of the gating camera 20 is an angle of view of ±φ in the left-right direction. With the minimum value of the width of the object in the horizontal direction as $W_{MIN}$, and with the maximum value thereof as $W_{MAX}$, the minimum value $X_{MINi}$ and the maximum value $X_{MAXi}$ Of the allowable range in a given range $RNG_i$ can be represented by the following Expressions.

$$x_{MAX} = X \times W_{MAX}/(d_{MINi} \times \tan \phi \times 2)$$

$$x_{MIN} = X \times W_{MIN}/(d_{MAXi} \times \tan \phi \times 2)$$

The processing device may judge whether or not the size of the detected object image is included within the allowable range determined for the vertical direction alone, the horizontal direction alone, or both directions.

Modification 2

Description has been made in the embodiment regarding an arrangement in which images acquired in different ranges are processed by the same classifier 42. However, the present invention is not restricted to such an arrangement. Also, a different classifier may be used for each range.

Modification 3

The allowable range may be set for each kind of the object. For example, in a case in which a pedestrian and an automobile are employed as the detection targets, different allowable ranges may be set for the width of the pedestrian and the width of the automobile.

Modification 4

Description has been made in the embodiments 5-1 and 5-2 regarding an arrangement in which both the upper limit and the lower limit are defined as the allowable range. Also, only one from among them may be defined as the allowable range.

Figure 41:
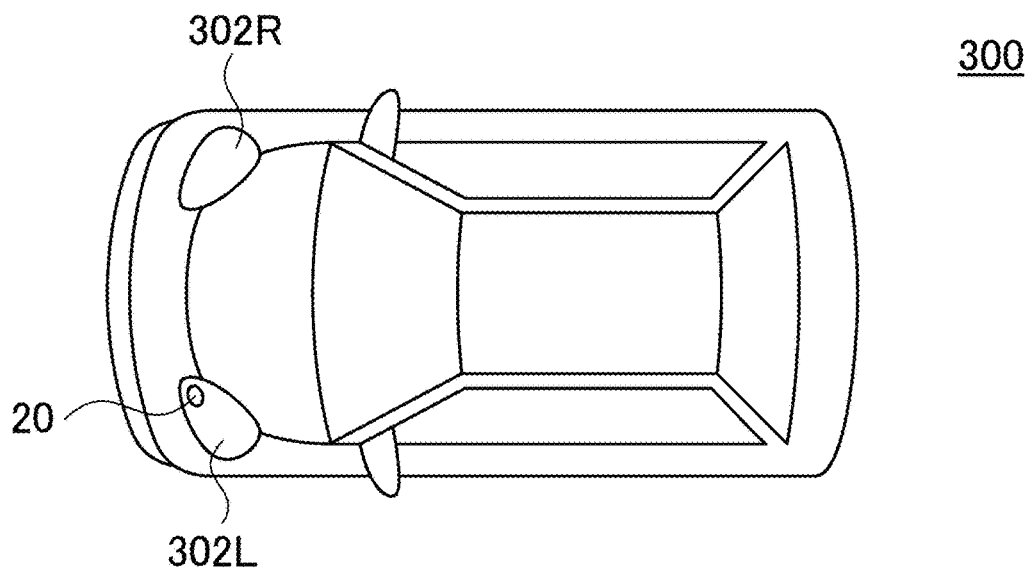
FIG. 41 is a block diagram showing an automobile including the object identification system.

FIG. 41 is a block diagram showing an automobile provided with the object identification system 10. An automobile 300 is provided with headlamps 302L and 302R. The object identification system 10 is built into at least one from among the headlamps 302L and 302R. Each headlamp 302 is positioned at a frontmost end of the vehicle body, which is most advantageous as a position where the gating camera 20 is to be installed for detecting an object in the vicinity.

Figure 42:
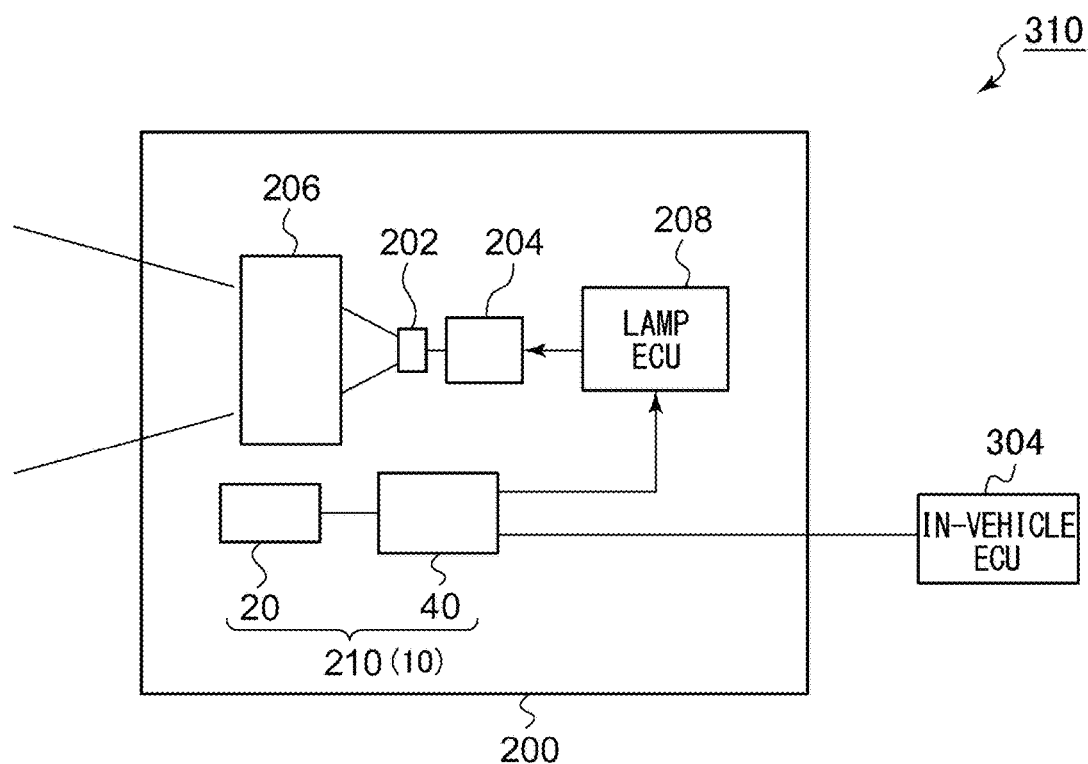
FIG. 42 is a block diagram showing an automotive lamp including the object identification system.

FIG. 42 is a block diagram showing an automotive lamp 200 provided with an object detection system 210. The automotive lamp 200 forms a lamp system 310 together with an in-vehicle ECU 304. The automotive lamp 200 includes a light source 202, a lighting circuit 204, and an optical system 206. Furthermore, the automotive lamp 200 includes the object detection system 210. The object detection system 210 corresponds to the object identification system 10 described above. The object detection system 210 includes the gating camera 20 and the processing device 40.

Also, the information with respect to the object OBJ detected by the processing device 40 may be used to support the light distribution control operation of the automotive lamp 200. Specifically, a lamp ECU 208 generates a suitable light distribution pattern based on the information with respect to the kind of the object OBJ and the position thereof generated by the processing device 40. The lighting circuit 204 and the optical system 206 operate so as to provide the light distribution pattern generated by the lamp ECU 208.

Also, the information with respect to the object OBJ detected by the processing device 40 may be transmitted to the in-vehicle ECU 304. The in-vehicle ECU may support autonomous driving based on the information thus transmitted. Description has been made regarding the present disclosure with reference to the embodiments using specific terms. However, the above-described embodiments show only an aspect of the mechanisms and applications of the present disclosure. Rather, various modifications and various changes in the layout can be made without departing from the spirit and scope of the present invention defined in appended claims.

What is claimed is:

1. An object identification system comprising:
   a camera; and
   one or more processors comprising a classifier subjected to machine learning so as to be capable of identifying one or more objects, which are separate from each other, based on an output image of the camera,
   wherein the classifier is subjected to machine learning based on learning data configured as a plurality of images generated by a gating camera structured to divide a field of view in a depth direction into a plurality of ranges, and to capture an image while changing a time difference between light projection and exposure for each range, and
   wherein the plurality of images generated by the gating camera includes the one or more objects and the plurality of images is input into the classifier as separate items of learning data,
   wherein the learning data is the plurality of images being generated as separate images in a state in which the one or more objects overlap each other in the depth direction and are positioned in different ranges.

2. The object identification system according to claim 1, wherein the camera is structured as a monocular camera.

3. The object identification system according to claim 1, wherein the camera is structured as a gating camera.

4. An automotive lamp comprising the object identification system according to claim 1.

5. An automobile comprising the object identification system according to claim 1.

6. One or more processors comprising:
   a classifier subjected to machine learning so as to be capable of identifying one or more objects, which are separable from each other, based on an output image of a camera,
   wherein the classifier is subjected to machine learning based on learning data configured as a plurality of images generated by a gating camera structured to divide a field of view in a depth direction into a plurality of ranges, and to capture an image while changing a time difference between light projection and exposure for each range, and
   wherein the plurality of images generated by the gating camera includes the one or more objects and the plurality of images is input into the classifier as separate items of learning data,
   wherein the learning data is the plurality of images being generated as separate images in a state in which the one or more objects overlap each other in the depth direction and are positioned in different ranges.

7. A learning method for a classifier structured to identify one or more objects, which are separate from each other, based on an output image of a camera, the learning method comprising:
   dividing a depth direction into a plurality of ranges, and acquiring a plurality of images using a gating camera while changing a time difference between light projection and exposure for each range; and
   applying machine learning to the classifier using learning data configured as a plurality of images generated by the gating camera,
   wherein the plurality of images generated by the gating camera includes the one or more objects and the plurality of images is input into the classifier as separate items of learning data,
   wherein the learning data is the plurality of images being generated as separate images in a state in which the one or more objects overlap each other in the depth direction and are positioned in different ranges.

8. An object identification system comprising:
   a gating camera structured to divide a field of view in a depth direction into a plurality of ranges, and to capture an image while changing a time difference between light projection and exposure for each range; and
   one or more processors configured to be capable of identifying a kind of one or more objects, which are separate from each other, based on a plurality of images that correspond to a plurality of ranges generated by the gating camera, wherein the one or more processors comprises a plurality of classifiers structured to have different algorithms used for the separate objects of the one or more objects, and to select the classifier that corresponds to the range so as to identify the one or more objects, wherein the one or more processors employs a classifier with a You Only Look Once (YOLO) algorithm for image processing in a first-distance range, wherein the one or more processors employs a classifier with a Single Shot MultiBox Detector (SSD) algorithm for image processing in a second-distance range, wherein the first-distance range is one or more distance ranges closer to the gating camera than the second-distance range, and wherein the first-distance range and the second-distance range overlap at each respective boundaries in the depth direction.

9. An automobile comprising the object identification system according to claim 8.

10. An automotive lamp comprising the object identification system according to claim 8.

11. One or more processors that forms an object identification system together with a gating camera, wherein the gating camera is structured to divide a field of view in a depth direction into a plurality of ranges, and to capture an image while changing a time difference between light projection and exposure for each range, wherein the one or more processors is structured to be capable of identifying a kind of one or more objects, which are separate from each other, based on a plurality of images that correspond to a plurality of ranges generated by the gating camera, wherein the one or more processors comprises a plurality of classifiers structured to have different algorithms used for the separate objects of the one or more objects, and to select a classifier that corresponds to the range so as to identify the one or more objects, wherein the one or more processors employs a classifier with a You Only Look Once (YOLO) algorithm for image processing in a first-distance range, and wherein the one or more processors employs a classifier with a Single Shot MultiBox Detector (SSD) algorithm for image processing in a second-distance range, wherein the first-distance range is one or more distance ranges closer to the gating camera than the second-distance range, and wherein the first-distance range and the second-distance range overlap at each respective boundaries in the depth direction.

* * * * *